US012395617B2

(12) United States Patent
Makinen

(10) Patent No.: US 12,395,617 B2
(45) Date of Patent: Aug. 19, 2025

(54) OPTICAL METHOD AND SYSTEM FOR LIGHT FIELD (LF) DISPLAYS BASED ON TUNABLE LIQUID CRYSTAL (LC) DIFFUSERS

(71) Applicant: InterDigital Madison Patent Holdings, SAS, Paris (FR)

(72) Inventor: Jukka-Tapani Makinen, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 18/414,038

(22) Filed: Jan. 16, 2024

(65) Prior Publication Data

US 2024/0244176 A1    Jul. 18, 2024

Related U.S. Application Data

(63) Continuation of application No. 17/622,564, filed as application No. PCT/US2020/039334 on Jun. 24, 2020, now Pat. No. 11,917,121.

(Continued)

(51) Int. Cl.
*H04N 13/307* (2018.01)
*G02F 1/1335* (2006.01)
*H04N 13/315* (2018.01)

(52) U.S. Cl.
CPC ..... *H04N 13/307* (2018.05); *G02F 1/133538* (2021.01); *H04N 13/315* (2018.05)

(58) Field of Classification Search
CPC .......... G02F 1/133538; G02B 30/26; H04N 13/307; H04N 13/315; H04N 13/356

(Continued)

(56) References Cited

U.S. PATENT DOCUMENTS 2,588,373 A    3/1952    Erban
4,210,391 A    7/1980    Cohen
(Continued)

FOREIGN PATENT DOCUMENTS

CA    2905147 A1    9/2014
CN    1352751 A    6/2002
(Continued)

OTHER PUBLICATIONS

An, "Wavelength-Selective Device Using a Phase Delay Layer and Two Polarization-Sensitive Gratings", IEEE Photonics Techology Letters, vol. 19, No. 6, Mar. 15, 2007, pp. 369-371.

(Continued)

*Primary Examiner* — Behrooz M Senfi
(74) *Attorney, Agent, or Firm* — Smadar Gefen

(57) ABSTRACT

Some embodiments of an example apparatus may include a display, a first controllable diffuser overlaying the display, the first controllable diffuser being selectively operable to diffuse light in a first diffusion direction, and a second controllable diffuser overlaying the display, the second controllable diffuser being selectively operable to diffuse light in a second diffusion direction substantially perpendicular to the first diffusion direction. In some embodiments, an example method may include emitting a light beam from a light emitting device; linearly polarizing the light beam; passing the light beam through LC and birefringent materials; and applying a voltage to alter polarization of the LC material, from a first state causing the light to diffuse in a first direction upon passing through the birefringent material, to a second state causing the light beam to diffuse in a second direction upon passing through the birefringent material.

16 Claims, 29 Drawing Sheets

Related U.S. Application Data

(60) Provisional application No. 62/868,687, filed on Jun. 28, 2019.

(58) Field of Classification Search
USPC .......................................................... 348/51
See application file for complete search history.

(56) References Cited

U.S. PATENT DOCUMENTS

| | | |
|---|---|---|
| 4,452,509 A | 6/1984 | Vanbreemen |
| 5,083,854 A | 1/1992 | Zampolin et al. |
| 5,132,839 A | 7/1992 | Travis |
| 5,392,140 A | 2/1995 | Ezra et al. |
| 5,465,175 A | 11/1995 | Woodgate et al. |
| 5,742,262 A | 4/1998 | Tabata et al. |
| 6,064,424 A | 5/2000 | Van et al. |
| 6,118,584 A | 9/2000 | Van et al. |
| 6,201,565 B1 | 3/2001 | Balogh |
| 6,369,954 B1 | 4/2002 | Berge et al. |
| 6,554,430 B2 | 4/2003 | Dorval et al. |
| 6,642,969 B2 | 11/2003 | Tew |
| 6,665,100 B1 | 12/2003 | Klug et al. |
| 6,919,900 B2 | 7/2005 | Wilt |
| 6,999,071 B2 | 2/2006 | Balogh |
| 7,161,729 B2 | 1/2007 | Kim et al. |
| 7,408,601 B1 | 8/2008 | Huang et al. |
| 7,446,733 B1 | 11/2008 | Hirimai |
| 7,518,149 B2 | 4/2009 | Maaskant et al. |
| 7,573,491 B2 | 8/2009 | Hartkop et al. |
| 7,607,780 B2 | 10/2009 | Kim et al. |
| 7,701,637 B2 | 4/2010 | Redert |
| 7,782,523 B2 | 8/2010 | Ishii |
| 7,891,815 B2 | 2/2011 | Nayar et al. |
| 7,936,392 B2 | 5/2011 | Ng et al. |
| 7,961,182 B2 | 6/2011 | Tachi et al. |
| 7,962,033 B2 | 6/2011 | Georgiev et al. |
| 7,994,527 B2 | 8/2011 | Denbaars et al. |
| 8,047,660 B2 | 11/2011 | Penn et al. |
| 8,077,195 B2 | 12/2011 | Grossmann et al. |
| 8,287,127 B2 | 10/2012 | Gao et al. |
| 8,328,360 B2 | 12/2012 | Gao et al. |
| 8,432,436 B2 | 4/2013 | Debevec et al. |
| 8,587,498 B2 | 11/2013 | Connor |
| 8,823,702 B2 | 9/2014 | Smithwick et al. |
| 8,836,769 B2 | 9/2014 | Tsubaki et al. |
| 8,848,006 B2 | 9/2014 | Wetzstein et al. |
| 8,872,085 B2 | 10/2014 | Gruhlke et al. |
| 8,958,137 B2 | 2/2015 | Haussler |
| 9,250,446 B2 | 2/2016 | Krijn et al. |
| 9,298,168 B2 | 3/2016 | Taff et al. |
| 9,304,387 B2 | 4/2016 | Park et al. |
| 9,383,562 B2 | 7/2016 | Hartell et al. |
| 9,383,587 B2 | 7/2016 | Balogh |
| 9,405,124 B2 | 8/2016 | Hirsch et al. |
| 9,462,261 B2 | 10/2016 | Sung et al. |
| 9,523,797 B2 | 12/2016 | Yun et al. |
| 9,560,342 B2 | 1/2017 | Cho et al. |
| 9,568,885 B2 | 2/2017 | Ang et al. |
| 9,664,914 B2 | 5/2017 | Gu |
| 9,709,829 B2 | 7/2017 | Stephen et al. |
| 9,709,851 B2 | 7/2017 | Seo et al. |
| 10,154,252 B2 | 12/2018 | Yamagishi et al. |
| 10,394,036 B2 | 8/2019 | Hua et al. |
| 2002/0034012 A1 | 3/2002 | Santoro et al. |
| 2003/0112507 A1 | 6/2003 | Divelbiss et al. |
| 2003/0156077 A1 | 8/2003 | Balogh |
| 2003/0176214 A1 | 9/2003 | Burak et al. |
| 2004/0135973 A1 | 7/2004 | Gustafsson et al. |
| 2005/0086766 A1 | 4/2005 | Fawcett et al. |
| 2005/0094483 A1 | 5/2005 | Demers et al. |
| 2005/0180019 A1 | 8/2005 | Cho et al. |
| 2005/0190140 A1 | 9/2005 | Asahi et al. |
| 2006/0061846 A1 | 3/2006 | Sprague et al. |
| 2006/0226562 A1 | 10/2006 | Johnson et al. |
| 2006/0290253 A1 | 12/2006 | Yeo et al. |
| 2007/0014127 A1 | 1/2007 | Hara et al. |
| 2007/0139624 A1 | 6/2007 | Decusatis et al. |
| 2007/0171521 A1 | 7/2007 | Sugawara et al. |
| 2007/0247598 A1 | 10/2007 | Refai et al. |
| 2008/0007671 A1 | 1/2008 | Klenke |
| 2008/0037120 A1 | 2/2008 | Koo et al. |
| 2008/0055724 A1 | 3/2008 | Bluem et al. |
| 2008/0157412 A1 | 7/2008 | Kihara et al. |
| 2008/0204847 A1 | 8/2008 | Kamm et al. |
| 2008/0253265 A1 | 10/2008 | Murata et al. |
| 2008/0297593 A1 | 12/2008 | Debevec et al. |
| 2009/0225244 A1* | 9/2009 | Wang ..................... G02B 30/33 349/35 |
| 2010/0033788 A1 | 2/2010 | Xie et al. |
| 2010/0079584 A1 | 4/2010 | Sung et al. |
| 2010/0103486 A1 | 4/2010 | Kroll et al. |
| 2010/0157026 A1 | 6/2010 | Reichelt |
| 2010/0214659 A1 | 8/2010 | Levola |
| 2010/0232000 A1 | 9/2010 | Futterer et al. |
| 2011/0037953 A1 | 2/2011 | Nizani et al. |
| 2011/0128555 A1 | 6/2011 | Rotschild et al. |
| 2011/0234770 A1 | 9/2011 | Zerrouk et al. |
| 2011/0242150 A1 | 10/2011 | Song et al. |
| 2011/0248987 A1 | 10/2011 | Mitchell |
| 2012/0062991 A1 | 3/2012 | Krijn et al. |
| 2012/0105929 A1 | 5/2012 | Sung et al. |
| 2012/0140131 A1 | 6/2012 | Lanman et al. |
| 2012/0188467 A1 | 7/2012 | Escuti et al. |
| 2013/0093762 A1* | 4/2013 | Sugiyama ............ H04N 13/398 345/419 |
| 2013/0128087 A1 | 5/2013 | Georgiev et al. |
| 2013/0222384 A1 | 8/2013 | Futterer |
| 2014/0028663 A1 | 1/2014 | Smithwick et al. |
| 2014/0043460 A1 | 2/2014 | Hartell et al. |
| 2014/0063077 A1 | 3/2014 | Wetzstein et al. |
| 2014/0071255 A1 | 3/2014 | Okuyama et al. |
| 2014/0253843 A1 | 9/2014 | Kanno et al. |
| 2014/0347361 A1 | 11/2014 | Alpaslan et al. |
| 2015/0033539 A1 | 2/2015 | El-Ghoroury et al. |
| 2015/0056561 A1 | 2/2015 | Ang et al. |
| 2015/0097756 A1 | 4/2015 | Ziarati et al. |
| 2016/0014398 A1 | 1/2016 | Kroon et al. |
| 2016/0116752 A1 | 4/2016 | Wu |
| 2016/0150225 A1 | 5/2016 | Kurashige |
| 2016/0161752 A1 | 6/2016 | Negoita et al. |
| 2016/0313556 A1 | 10/2016 | Futterer |
| 2016/0370695 A1 | 12/2016 | Miyasaka |
| 2017/0010473 A1 | 1/2017 | Ide |
| 2017/0045764 A1 | 2/2017 | Gere et al. |
| 2017/0102545 A1 | 4/2017 | Hua et al. |
| 2017/0108704 A1 | 4/2017 | Ishida et al. |
| 2017/0129272 A1 | 5/2017 | Rich et al. |
| 2017/0276957 A1 | 9/2017 | Matsuki et al. |
| 2017/0315371 A1 | 11/2017 | Johnson et al. |
| 2017/0371076 A1 | 12/2017 | Hua et al. |
| 2018/0003364 A1* | 1/2018 | Wheatley .......... G02F 1/133504 |
| 2018/0308401 A1 | 10/2018 | French et al. |
| 2019/0086706 A1* | 3/2019 | Robinson .......... G02F 1/133536 |
| 2020/0045302 A1* | 2/2020 | Osmanis ............ G02B 27/0955 |
| 2020/0371378 A1 | 11/2020 | Makinen et al. |
| 2021/0041718 A1 | 2/2021 | Balogh |
| 2021/0223568 A1 | 7/2021 | Makinen et al. |

FOREIGN PATENT DOCUMENTS

| | | |
|---|---|---|
| CN | 1366192 A | 8/2002 |
| CN | 1797175 A | 7/2006 |
| CN | 1833450 A | 9/2006 |
| CN | 101123735 A | 2/2008 |
| CN | 101209583 A | 7/2008 |
| CN | 201199726 Y | 2/2009 |
| CN | 101432645 A | 5/2009 |
| CN | 101855902 A | 10/2010 |
| CN | 102098522 A | 6/2011 |
| CN | 102667618 A | 9/2012 |
| CN | 102687043 A | 9/2012 |
| CN | 102768410 A | 11/2012 |
| CN | 102854630 A | 1/2013 |
| CN | 103529554 A | 1/2014 |

(56) References Cited

FOREIGN PATENT DOCUMENTS

| | | | | |
|---|---|---|---|---|
| CN | 104756494 A | 7/2015 | | |
| CN | 104769485 A | 7/2015 | | |
| CN | 105929547 A | 9/2016 | | |
| CN | 106164748 A | 11/2016 | | |
| CN | 106569381 A | 4/2017 | | |
| CN | 106773589 A | 5/2017 | | |
| CN | 106940483 A | 7/2017 | | |
| CN | 108139803 A | 6/2018 | | |
| CN | 109164618 A | 1/2019 | | |
| CN | 111065957 A | 4/2020 | | |
| DE | 102019003383 A1 | 11/2019 | | |
| EP | 0797784 A1 | 10/1997 | | |
| EP | 0635138 B1 | 12/1997 | | |
| EP | 0961502 A2 | 12/1999 | | |
| EP | 1069454 A1 | 1/2001 | | |
| EP | 1447703 A1 | 8/2004 | | |
| EP | 2045648 B1 | 4/2009 | | |
| GB | 2403815 A | * | 1/2005 | ......... G02B 27/2214 |
| JP | H08166556 A | 6/1996 | | |
| JP | 2000075405 A | 3/2000 | | |
| JP | 2000221309 A | 8/2000 | | |
| JP | 2003005129 A | 1/2003 | | |
| JP | 2004004700 A | 1/2004 | | |
| JP | 3623265 B2 | 2/2005 | | |
| JP | 2005078000 A | 3/2005 | | |
| JP | 2005292159 A | 10/2005 | | |
| JP | 2007017536 A | 1/2007 | | |
| JP | 2009294601 A | 12/2009 | | |
| JP | 4560906 B2 | 10/2010 | | |
| JP | 2011002663 A | 1/2011 | | |
| JP | 2011128633 A | 6/2011 | | |
| JP | 2014130305 A | 7/2014 | | |
| JP | 2015079194 A | 4/2015 | | |
| JP | 2016024289 A | 2/2016 | | |
| JP | 2017173486 A | 9/2017 | | |
| JP | 2019508726 A | 3/2019 | | |
| TW | 201333555 A | 8/2013 | | |
| WO | WO993021548 A1 | 10/1993 | | |
| WO | WO19939321548 A1 | 10/1993 | | |
| WO | WO9618925 A1 | 6/1996 | | |
| WO | WO144858 A | 6/2001 | | |
| WO | WO0144858 A2 | 6/2001 | | |
| WO | WO02059691 A2 | 8/2002 | | |
| WO | WO2004106983 A2 | 12/2004 | | |
| WO | WO2005011292 A1 | 2/2005 | | |
| WO | WO2005086766 A2 | 9/2005 | | |
| WO | WO2005094483 A2 | 10/2005 | | |
| WO | WO2007069125 A2 | 6/2007 | | |
| WO | WO2008142156 A2 | 11/2008 | | |
| WO | WO-2008152436 A1 | * | 12/2008 | ............ G02B 6/0036 |
| WO | WO2011014743 A2 | 2/2011 | | |
| WO | WO-2011075148 A1 | * | 6/2011 | ............ G02B 5/0242 |
| WO | WO2011149641 A2 | 12/2011 | | |
| WO | WO2012025786 A1 | 3/2012 | | |
| WO | WO2012062681 A1 | 5/2012 | | |
| WO | WO2013163468 A1 | 10/2013 | | |
| WO | WO2014033484 A1 | 3/2014 | | |
| WO | WO2015077718 A9 | 6/2016 | | |
| WO | WO2016135434 A1 | 9/2016 | | |
| WO | WO2016140851 A1 | 9/2016 | | |
| WO | WO2017005614 A1 | 1/2017 | | |
| WO | WO2017046372 A1 | 3/2017 | | |
| WO | WO2017055894 A1 | 4/2017 | | |
| WO | WO2017062289 A1 | 4/2017 | | |
| WO | WO2018014048 A2 | 1/2018 | | |
| WO | WO2019040484 A1 | 2/2019 | | |
| WO | WO2019089283 A1 | 5/2019 | | |
| WO | WO2019122295 A2 | 6/2019 | | |
| WO | WO2020210361 A1 | 10/2020 | | |

OTHER PUBLICATIONS

Moheghi, A., et al., "PSCT for switchable transparent liquid crystal displays" In SID Symposium Digest of Technical Papers, 54.3, 2015, pp. 817-820 (4 pages).
Jasper Display Corporation, "2014 NAB JDC Announced 4K2K LCoS with Associated Controller for Future Home Solutions", Jasper Display Corporation Press Release, Apr. 3, 2014, 3 pages.
International Preliminary Report on Patentability for PCT/US2018/047313 issued on Feb. 25, 2020, 7 pages.
SeeFront "true 3D no glasses" Apr. 2018 (6 pages).
Bimber, Oliver, et al., "The Visual Computing of Projector-Camera Systems", Eurographics, STAR—State of The Art Report, (2007), 25 pages.
Marrella, Alessandro et al., "Privacy-Preserving Outsourcing of Pattern Mining of Event-Log Data—An Use-Case from Process Industry", IEEE International Conference on Cloud Computing Technology and Science (CloudCom), (2016), pp. 545-551.
Yan, Jun, et al., "Autostereoscopic Three-Dimensional Display Based on a Micromirror Array", Applied Optics, vol. 43, Issue 18, (2004), pp. 3686-3696.
Xia, Xinxing, et al., "A 360-degree floating 3D display based on light field regeneration", Optical Society of America, vol. 21, No. 9, May 2013, 11 pages.
Sullivan, Alan, "A solid-state multi-planar volumetric display", SID Symposium Digest of Technical Papers vol. 34, Issue 1, (2003), pp. 1531-1533.
Invitation to Pay Additional Fees and, Where Applicable, Protest Fee, for PCT/US2020/039334 mailed Oct. 9, 2020, 9 pages.
Kololuoma, Terho K., et. al., "Fabrication and Characterization of Hybrid-Glass-Based Axicons", Optical Engineering, vol. 41, No. 12, (2002), pp. 3136-3141.
Business Wire, "Kopin Debuts Lightning OLED Microdisplay With 2k x 2k Resolution for Mobile VR at 2017 CES", Business Wire Press Release, available at: https://www.businesswire.com/news/home/20170104005430/en/, Jan. 4, 2017, 6 pages.
Nam Kim et al., "Advances in the light fielddisplays based on integralimaging and holographictechniques".
Maimone, Andrew, et al., "Focus 3D: Compressive Accommodation Display", ACM Transactions on Graphics, vol. 32, No. 5, Article 153, September (2013, pp. 1-13.
Jia, Kemiao, et al., "High-Fill-Factor Micromirror Array with Hidden Bimorph Actuators and Tip-Tilt-Piston Capability" Journal of Microelectromechanical Systems, vol. 20, Issue 3, (2011), pp. 573-582.
International Preliminary Report on Patentability for PCT/US2019/047761 issued on Mar. 2, 2021, 9 pages.
"Highly Flexible OLED Light Source Has 10 Micron Bend Radius", Laser Focus World, Web Article available at: http://www.laserfocusworld.com/articles/2013/07/highly-flexible-oled-light-source-has-10-micron-bend- radius.html, Jul. 31, 2013, 2 pages.
Findl, Oliver, "Intraocular Lens Materials and Design", Chapter 12 in Achieving Excellence in Cataract Surgery, A Step-by-Step Approach (edited by Michael Colvard, MD, FACS), (2009), pp. 95-108.
Wikipedia, "Volumetric Display", Wikipedia web article, updated on Jul. 17, 2017, available at: https://en.wikipedia.org/w/index.php?title=Volumetric, display&oldid=790957389.
Braga-Mele, Rosa, et al., "Multifocal Intraocular Lenses: Relative Indications and Contraindications for Implantation", Journal of Cataract & Refractive Surgery, vol. 40, No. 2, (2014), pp. 313-322.
Katal, Goldy et al., "Digital Light Processing and its Future Applications", International Journal of Scientific and Research Publications, vol. 3 Issue 4, Apr. 2013, pp. 1-8.
Zhang, Xiangyu, et al., "A Novel Spatio-Temporal Multiplexing Multi-View 3D Display", Conference on Lasers and Electro-Optics, Pacific Rim, Optical Society of America, 2017 (4 pages).
Waldis, Severin, et al., "Uniform Tilt-Angle Micromirror Array for Multi Object Spectroscopy", Proceedings of SPIE, MOEMS and Miniaturized Systems VI, vol. 6466, p. 646603, (2007), 12 pages.
Yamaguchi, R., et al., "Normal and Reverse Mode Light Scattering Properties in Nematic Liquid Crystal Cell Using Polymer Stabilized Effect", Journal of Photopolymer Science and Technology vol. 28, No. 3 (2015): 319-323 (5 pages).

(56) References Cited

OTHER PUBLICATIONS

International Search Report and Written Opinion of the International Searching Authority for PCT/US2020/036341, mailed Sep. 18, 2020, 10 pages.
International Search Report and Written Opinion of the International Searching Authority for PCT/US2018/028949 mailed Jul. 4, 2018.
Batbayar, Densmaa, et. al., "Point Light Source Display With a Large Viewing Angle Using Multiple Illumination Sources", Optical Engineering, vol. 56, No. 5, Article 053113, May 2017, pp. 1-5.
Wacyk, Ihor, et. al., "Ultra-High Resolution and High-Brightness AMOLED", Proceedings of SPIE vol. 8383, (2012), pp. 1-14.
Ma, J. et al., "Bistable polymer stabilized cholesteric texture light shutter", Applied Physics Express 3, No. 2 (2010): 021702 (3 pages).
Commander, L. G., S. E. Day, and D. R. Selviah, "Variable focal length microlenses", Optics communications 177, Apr. 2000, pp. 157-170 (14 pages).
Chen, H., et al., "A Low Voltage Liquid Crystal Phase Grating With Switchable Diffraction Angles," Scientific Reports vol. 7, Article 39923, Jan. 2017 (8 pages).
International Preliminary Report on Patentability for PCT/US2018/028949 issued on Oct. 29, 2019, 7 pages.
International Preliminary Report on Patentability for PCT/US2020/036341 mailed Dec. 16, 2021 (8 pages).
Jones, Andrew, et al., "Rendering for an Interactive 360° Light Field Display", In SIGGRAPH papers, Article No. 40, (2007), 10 pages.
Smith, Neil R., et al., "Agile wide-angle beam steering with electrowetting microprisms", Optics Express, vol. 14, No. 14, pp. 6557-6563, Jul. 10, 2006 (7 pages).
Akeley, Kurt, et al., "A Stereo Display Prototype with Multiple Focal Distances", ACM transactions on graphics (TOG), 23(3), (2004) pp. 804-813.
Hassanein, G. N., "Optical tuning of polymer stabilized liquid crystals refractive index", J. Laser Opt. Photonics vol. 5, No. 2, 2018 (5 pages).
Jia, J. et al., "A scalable diffraction-based scanning 3D colour video display as demonstrated by using tiled gratings and a vertical diffuser", Scientific reports 7, No. 1, 2017 (9 pages).
Reichelt, Stephan, et. al., "Holographic 3-D Displays—Electro-Holography Within the Grasp of Commercialization", Advances in Lasers and Electro Optics, book edited by Nelson Costa and Adolfo Cartaxo, Apr. 2010, pp. 683-710.
Zhang, Yan, et. al., "Multi-View Autostereoscopic 3D Display", International Conference on Optics, Photonics and Energy Engineering (OPEE), IEEE, vol. 1, (2010) pp. 58-61.
Texas Instruments, "DLP7000 DLP 0.7 XGA 2x LVDS Type A DMD", DLP7000 product description, DLPS026E, May 2017, 51 pages.
Traub, Alan C., "Stereoscopic Display Using Rapid Varifocal Mirror Oscillations", Applied Optics vol. 6, Issue 6, Jun. 1967, pp. 1085-1087.
International Preliminary Report on Patentability for PCT/US2018/057147 issued May 5, 2020, 8 pages.
Matsuda, Nathan, et al., "Focal surface displays," ACM Transactions on Graphics (TOG), 2017, vol. 36, No. 4, pp. 1-14 (14 pages).
Balogh, Tibor., et al., "The Holovizio System-New Opportunity Offered by 3D Displays", Proceedings of the TMCE, Apr. 2008, pp. 1-11.
Takaki, Yasuhiro, et al., "High-Density Directional Display for Generating Natural Three-Dimensional Images", Proceedings of the IEEE, vol. 94, No. 3, Mar. 2006, pp. 654-663.
International Search Report and Written Opinion of the International Searching Authority for PCT/US2018/057147 mailed Feb. 1, 2019, 12 pages.
"Meet Holoflex, World's First Holographic Flexible Smartphone". Gadgets Now, Web Article available at: http://www.gadgetsnow.com/mobiles/Meet-HoloFlex-worlds-first-holographic-flexible-smartphone/articleshow/52185503.cms, May 9, 2016, 2 pages.
Wetzstein, Gordon, et. al., "Tensor Displays: Compressive Light Field Synthesis using Multilayer Displays with Directional Backlighting". ACM Transactions on Graphics, vol. 31, No. 4, Article 80, Jul. 2012, pp. 1-11.
Mishra, Kartikeya, et al., "Recent Developments in Optofluidic Lens Technology", Micromachines, vol. 7, 102, 2016 (24 pages).
Lee, Vincent W., et. al. "Micro-LED Technologies and Applications". Information Display, vol. 6, No. 16, (2016), pp. 16-23.
Templier, Franv0is, et. al. "A Novel Process for Fabricating High-Resolution and Very Small Pixel-pitch GaN LED Microdisplays", SID Symposium DigestofTechnical Papers, vol. 48, No. 1, (2017), pp. 268-271 (4 pages).
McManamon, Paul F., et al., "A review of phased array steering for narrow-band electrooptical systems" Proceedings of the IEEE, vol. 97, No. 6, 2009, pp. 1078-1096 (19 pages).
Wang Hongjuan, et al., "Large-aperture transparent beam steering screen based on LCMPA", Applied Optics, vol. 55, No. 28, pp. 7824-7829, Oct. 1, 2016.
Shang, Xiaobing, et al., "Fast switching cholesteric liquid crystal optical beam deflector with polarization independence", Scientific Reports, vol. 7, No. 1, 2017 (8 pages).
Huang, Yi-Pai, et al., "Autostereoscopic 3D Display with Scanning Multi-electrode Driven Liquid Crystal (MeD-LC) Lens", 3D Research, vol. 1, No. 1, pp. 39-42, 2010 (4 pages).
Xia, Xinxing, et al. "Time-multiplexed multi-view three-dimensional display with projector array and steering screen", Optics Express, vol. 26, No. 12, pp. 15528-15538, Jun. 11, 2018 (11 pages).
Love, Gordon D., et al., "High-Speed Switchable Lens Enables the Development of a Volumetric Stereoscopic Display", Optics Express, vol. 17, No. 18, Aug. 31, 2009, pp. 15716-15725.
Ma, Y., et al., "Fast switchable ferroelectric liquid crystal gratings with two electro—Optical modes." AIP Advances 6, No. 3, 035207, 2016 (11 pages).
Butt, H., et al., "Electrically tunable scattering from devitrite-liquid crystal hybrid devices." Advanced Optical Materials 5, No. 1 (2017): 1600414 (17 pages).
Geng, Jason, "Three-Dimensional Display Technologies". Advances in Optics and Photonics, vol. 5, No. 4, Nov. 22, 2013, p. 497.
Lee, Vincent W., el. al., "Micro-LED Technologies and Applications". Information Display, vol. 32, No. 6, (2016), pp. 16-23.
Templier, Francois el. al. "A Novel Process for Fabricating High-Resolution and Very Small Pixel-pitch GaN LED Microdisplays", SID Symposium Digest of Technical Papers, vol. 48, No. 1, (2017), pp. 268-271.
Traub, Alan C., "Stereoscopic Display Using Rapid Varifocal Mirror Oscillations", Applied Optics vol. 6, Issue 6, June 967, pp. 1085-1087.
Andrew Dalton, "The HoloFlex is a flexible, glasses-free 3D display", Gadgetry, May 5, 2016.
Wetzstein, Gordon, el. al., "Layered 3D: Tomographic Image Synthesis for Attenuation-Based Light Field and High lynamic Range Displays", ACM Transactions on Graphics, vol. 30, No. 4, Article 95, Jul. 2011, pp. 1-11.
Geng, Jason, "Design of a Single Projector Multiview 3D Display System". Emerging Digital Micromirror Device Based Systems and Applications VI, vol. 8979, 89790K, Mar. 7, 2014, 15 pages.
Erdenebat, Munkh-Uchral, et al., "Integral-Floating Display With 360 Degree Horizontal Viewing Angle", Journal of the Optical Society of Korea, vol. 16, Issue 4, Dec. 2012, pp. 365-371.
Huang, Fu-Chung, "The Light Field Stereoscope: Immersive Computer Graphics via Factored Near-Eye Light Field Displays with Focus Cues", ACM SIGGRAPH, Transactions on Graphics, vol. 33, No. 5, (2015).
Hoffman, David, M., el. al., Vergence-Accommodation Conflicts Hinder Visual Performance and Cause Visual Fatigue, Journal of Vision, vol. 8, No. 33., (2008), pp. 1-30.
Hirsch Matthew, et al., "A Compressive Light Field Projection System"., ACM Transactions on Graphics 33(4), 2014), pp. 1-12.
Smalley, D. E., el. al., "Anisotropic Leaky-Mode Modulator for Holographic Video Displays". Macmillan Publishers Limited, Nature, vol. 498, Jun. 20, 2013, pp. 313-317.

(56) References Cited

OTHER PUBLICATIONS

Zhou et al., "New Reflective Sold-state LC Light Shutter Film for Outdoor Giant Information Display Device", Television Technology No. 11, Nov. 17, 2005, 5 pages.

* cited by examiner

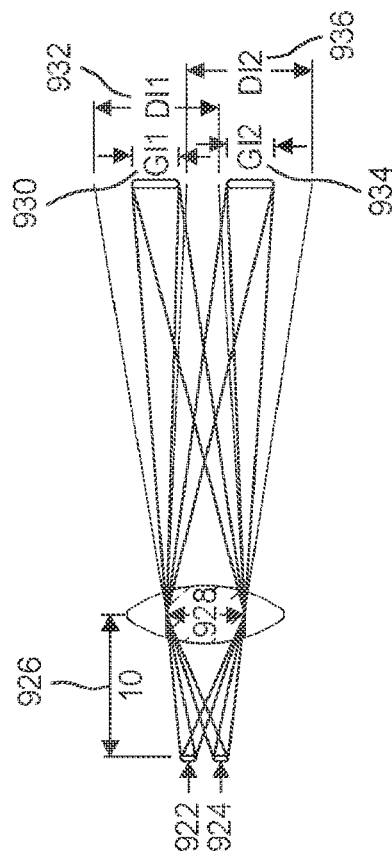
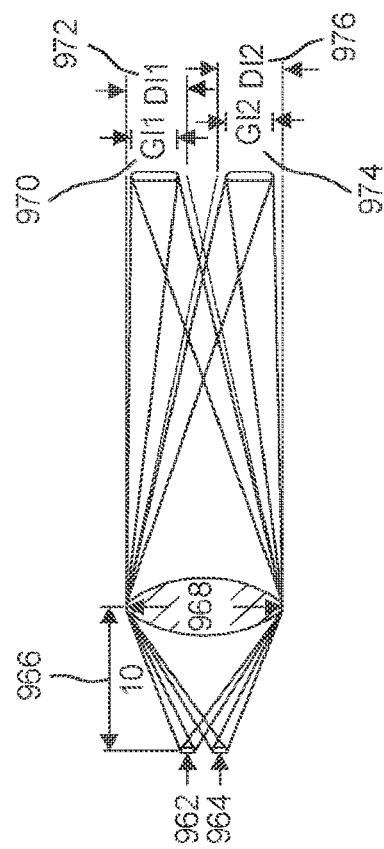
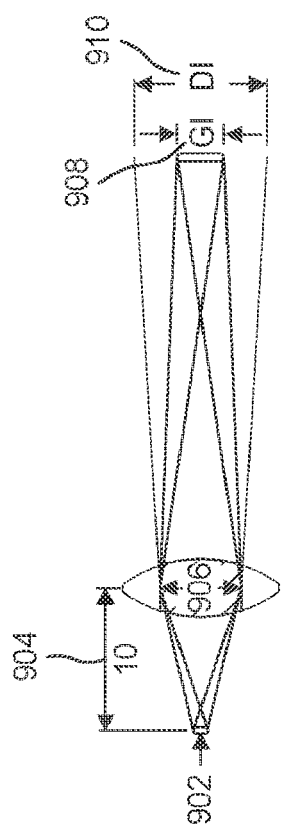
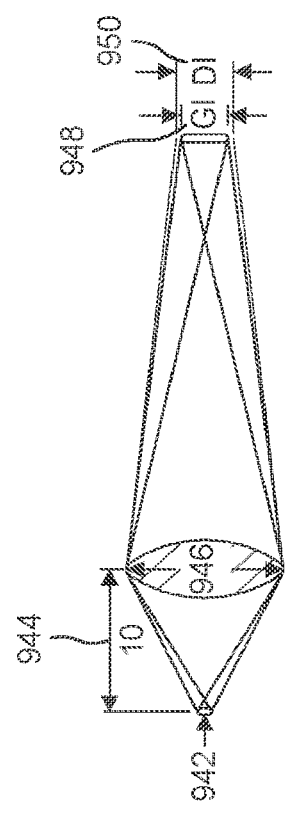
FIG. 9A
FIG. 9B
FIG. 9C
FIG. 9D

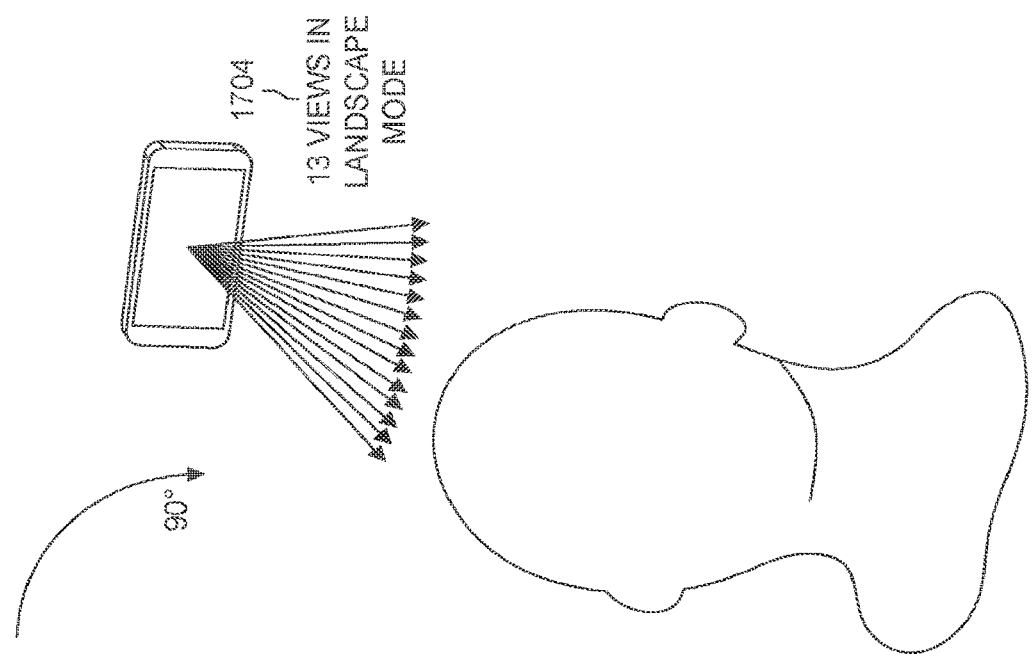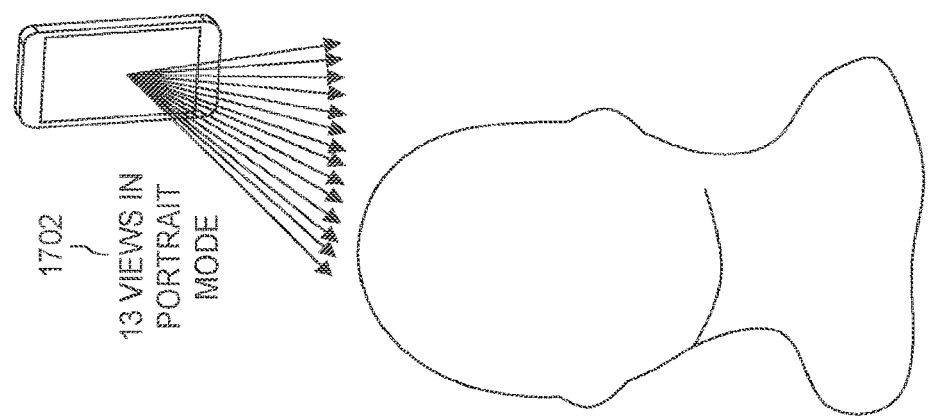
FIG. 17

OPTICAL METHOD AND SYSTEM FOR LIGHT FIELD (LF) DISPLAYS BASED ON TUNABLE LIQUID CRYSTAL (LC) DIFFUSERS

CROSS-REFERENCE TO RELATED APPLICATIONS

This application is a Continuation of U.S. application Ser. No. 17/622,564, Dec. 23, 2021, which is a National Phase entry under 35 U.S.C. § 371 of International Application No. PCT/US2020/039334, filed Jun. 24, 2020, which claims benefit under 35 U.S.C. § 119(e) from U.S. Provisional Patent Application Ser. No. 62/868,687, entitled "OPTICAL METHOD AND SYSTEM FOR LIGHT FIELD (LF) DISPLAYS BASED ON TUNABLE LIQUID CRYSTAL (LC) DIFFUSERS," filed Jun. 28, 2019, which is hereby incorporated by reference in its entirety.

BACKGROUND

The human mind perceives and determines depths of observed objects in part by receiving signals from muscles used to orient each eye. The brain associates the relative angular orientations of the eyes with the determined depths of focus. Correct focus cues give rise to a natural blur on objects outside of an observed focal plane and a natural dynamic parallax effect. One type of 3D display capable of providing correct focus cues uses volumetric display techniques that may produce 3D images in true 3D space. Each "voxel" of a 3D image is located physically at a spatial position and reflects or emits light from that position toward the observers to form a real image in the eyes of viewers. Some problems with many 3D volumetric displays are their low resolution, large physical size, and expensive manufacturing costs. These issues may make them too cumbersome to use outside of, e.g., product displays, museums, and shows.

SUMMARY

An example apparatus in accordance with some embodiments may include: a display; a first controllable diffuser overlaying the display, the first controllable diffuser being selectively operable to diffuse light in a first direction; and a second controllable diffuser overlaying the display, the second controllable diffuser being selectively operable to diffuse light in a second direction substantially perpendicular to the first direction.

For some embodiments of the example apparatus, the display may be a multiview display.

For some embodiments of the example apparatus, at least one of the first and second controllable diffusers may include a surface effect liquid crystal (SELC) diffuser.

For some embodiments of the example apparatus, the SELC diffuser may include a liquid crystal (LC) material layer sandwiched between a first substrate and a second substrate, and at least one of the LC material layer and the first and second substrates may be configured to perform an angularly-selective diffusion of the light.

For some embodiments of the example apparatus, the apparatus may include at least one liquid crystal (LC) grating.

For some embodiments of the example apparatus, at least one of the at least one LC grating and the first and second controllable diffusers may include a birefringent material.

Some embodiments of the example apparatus may further include: a sensor configured to detect an orientation of the display, and the apparatus may be configured to switch between selectively operating the first controllable diffuser to diffuse in the first direction to selectively operating the second controllable diffuser to diffuse in the second direction responsive to a detected change in the orientation of the display.

For some embodiments of the example apparatus, at least one of the first and second controllable diffusers may be configured to be selectively activated without mechanical movement.

For some embodiments of the example apparatus, at least one of the first and second controllable diffusers may be configured to diffuse light in response to an applied electric field.

An example optical element in accordance with some embodiments may include: a first layer comprising an electrically adjustable liquid crystal capable of altering a polarization state of light passing through the first layer depending upon the state of electrical adjustment; and a second layer comprising a birefringent material in a layer parallel to the first layer including surface structures designed to give alternate diffusion characteristics to beams, such that the second layer may be configured to scatter, according to a first angular pattern, light incident on the second layer when the polarization state of the light is in a first polarization state, and the second layer may be configured to scatter, according to a second angular pattern, light incident on the second layer when the polarization state of the light is in a second polarization state.

For some embodiments of the example optical element, the second layer may be configured to diffuse light in a horizontal direction when the polarization state of the light is in the first polarization state, and the second layer may be configured to diffuse in a vertical direction when the polarization state of the light is in the second polarization state.

Some embodiments of the example apparatus may further include: a plurality of light emitting elements and collimating microlenses capable of producing collimated beams of light; and a directionally controllable diffuser capable of switching between a first state wherein light is diffused in a first direction and a second state wherein light is diffused in a second direction.

For some embodiments of the example optical element, the directionally controllable diffuser may be configured to diffuse in the vertical direction and the apparatus may be configured so that only a single vertical view is generated if the apparatus is in a portrait orientation.

For some embodiments of the example optical element, at least a portion of the plurality of light emitting elements may be configured in a plus-shaped pattern.

For some embodiments of the example optical element, responsive to a rotation of the apparatus, the directionally controllable diffuser may be enabled to diffuse in a rotated direction and the apparatus may be configured so that only a single view is generated in the direction of diffusion if the display orientation changes from portrait to landscape.

Some embodiments of the example apparatus may further include a three-dimensional (3D) display, such that said directional controllability of said diffuser may be patterned across the 3D display allowing spatially varying diffusion directional characteristics.

An example method in accordance with some embodiments may include: emitting alight beam from one or more light emitting devices; polarizing the light beam into a linearly polarized light beam; passing the light beam through a liquid crystal (LC) material; passing the light beam through a birefringent material; and applying a voltage to the LC material to alter a light polarization configuration state of the LC material, such that altering the light polarization configuration state switches from a first polarization state to a second polarization state, and such that the first polarization state causes the light beam to diffuse in a first direction upon passing through the birefringent material and the second polarization state causes the light beam to diffuse in a second direction upon passing through the birefringent material.

Some embodiments of the example method may further include: rendering one or more images for a light field (LF) display device; and sending the one or more rendered images to the LF display device.

Some embodiments of the example method may further include receiving a field of view (FOV) selection for the LF display device.

Some embodiments of the example method may further include adjusting brightness of the emitted light beam based on the FOV selection.

An example apparatus in accordance with some embodiments may include: an array of light emitting devices; a polarizer layer; a microlens array (MLA); one or more diffusers; and one or more gratings.

For some embodiments of the example apparatus, the array of light emitting devices may include one or more sets of light emitting devices.

For some embodiments of the example apparatus, each of the one or more sets of light emitting devices may include a pixel.

Some embodiments of the example method may further include: a backboard; and one or more baffles, such that the array of one or more sets of light emitting devices is mounted to the backboard, such that each set of light emitting devices of the array corresponds to a respective baffle, and such that each baffle separates at least in part the respective set of light emitting devices from the rest of the array of one or more sets of light emitting devices.

For some embodiments of the example apparatus, at least one of the one or more diffusers may be configured to diffuse in a horizontal direction light emitted by at least one of the light emitting devices, and such that at least one of the one or more diffusers may be configured to diffuse in a vertical direction light emitted by at least one of the light emitting devices.

For some embodiments of the example apparatus, at least one of the one or more diffusers may be configured to switch between diffusing in a horizontal direction to diffusing in a vertical direction light emitted by at least one of the light emitting devices.

For some embodiments of the example apparatus, at least one of the one or more diffusers may be a surface effect liquid crystal (SELC) diffuser.

For some embodiments of the example apparatus, the SELC diffuser may include a liquid crystal (LC) material layer sandwiched between a first substrate and a second substrate, the LC material layer may be configured, in conjunction with the first and second substrates, to cause, responsive to an applied voltage, an angularly-selective diffusion of light.

For some embodiments of the example apparatus, the SELC diffuser may include a liquid crystal (LC) material layer sandwiched between a first substrate and a second substrate, and the LC material layer and the first and second substrates may have selected material and interface surface properties that work in conjunction to scatter a light beam.

For some embodiments of the example apparatus, at least one of the diffusers may be configured to switch between a 2D display mode and a 3D display mode.

For some embodiments of the example apparatus, a first SELC diffuser of the diffusers may be an SELC diffuser configured to scatter light displaying a first image with a first diffusion direction, a second SELC diffuser of the diffusers may be an SELC diffuser configured to scatter light displaying a second image with a second diffusion direction, and the first diffusion direction may be orthogonal to the second diffusion direction.

For some embodiments of the example apparatus, at least one of the diffusers may be an SELC diffuser configured to diffuse light to reduce glare for an image projected by the array of light emitting devices.

For some embodiments of the example apparatus, at least one of the gratings may include a liquid crystal material.

For some embodiments of the example apparatus, at least one of the gratings may include a birefringent material.

For some embodiments of the example apparatus, at least one of the one or more diffusers may be configured as a mosaic diffuser to diffuse together one or more neighboring light beams emitted by one or more of the light emitting devices.

BRIEF DESCRIPTION OF THE DRAWINGS

FIG. TA is a system diagram illustrating an example communications system according to some embodiments.

FIG. 9A is an illustration showing an example first light source and lens configuration according to some embodiments.

FIG. 9B is an illustration showing an example second light source and lens configuration according to some embodiments.

FIG. 9C is an illustration showing an example third light source and lens configuration according to some embodiments.

FIG. 9D is an illustration showing an example fourth light source and lens configuration according to some embodiments.

FIG. 17 is a schematic perspective view illustrating an example 3D display in portrait and landscape modes according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

DETAILED DESCRIPTION

A wireless transmit/receive unit (WTRU) may be used, e.g., as alight field display device in some embodiments described herein.

FIG. TA is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

Figure 1A:
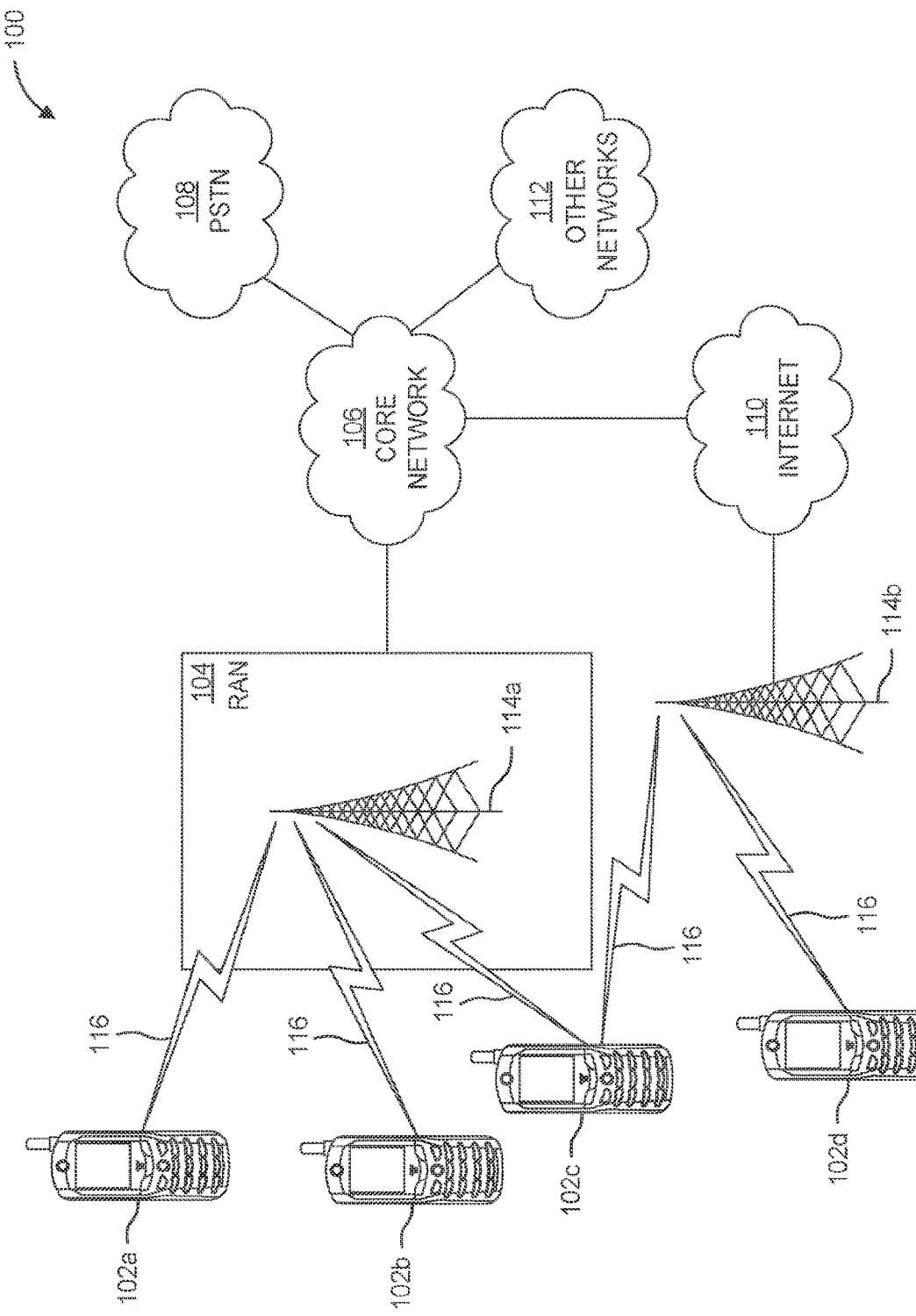
FIG. 1B is a system diagram illustrating an example wireless transmit/receive unit (WTRU) that may be used within the communications system illustrated in FIG. TA according to some embodiments.

As shown in FIG. 1A, the communications system 100 may include wireless transmit/receive units (WTRUs) 102a, 102b, 102c, 102d, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104/113 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
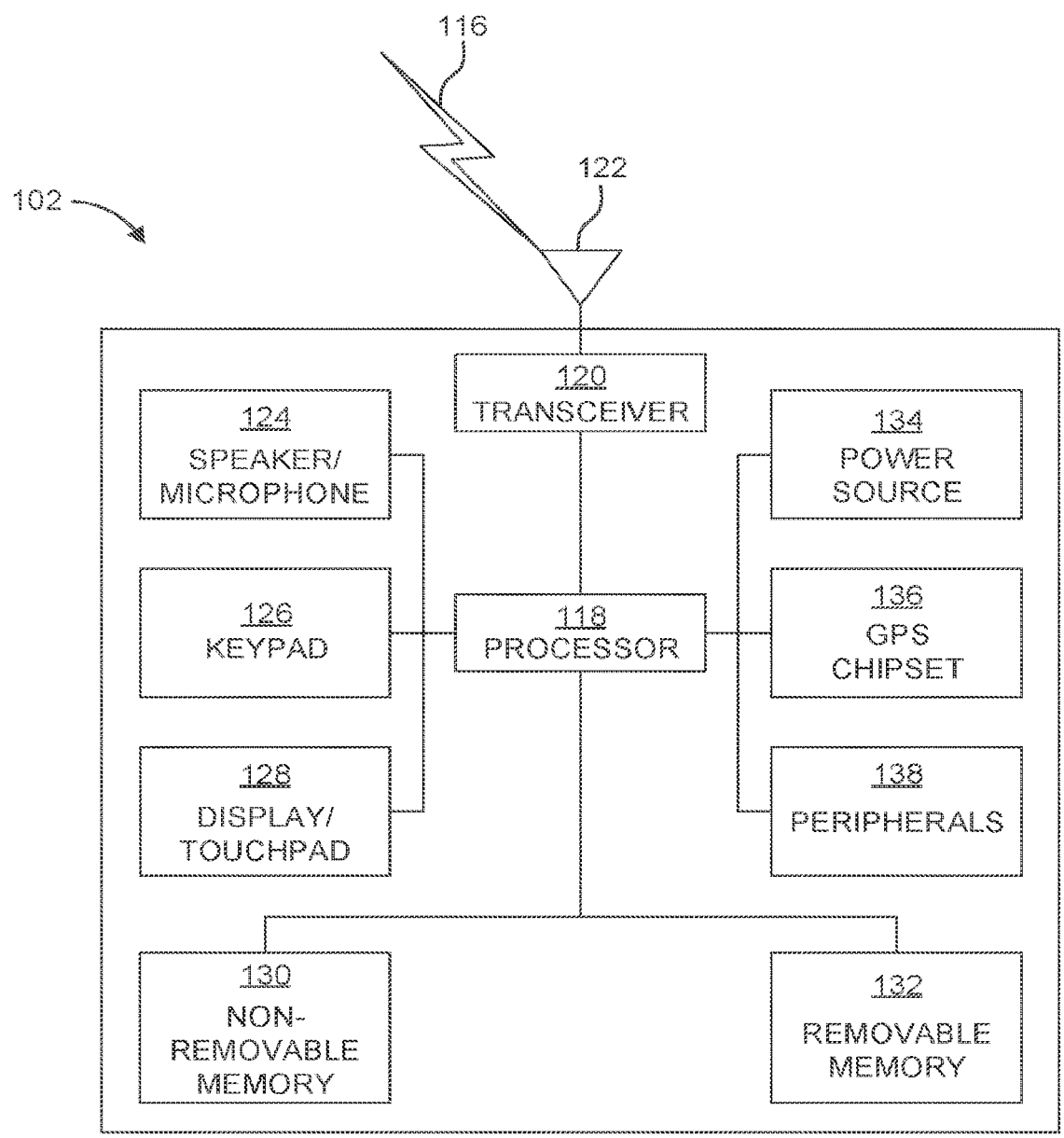

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Many previous 3D displays may be classified into four example categories on the basis of their form-factors: head-mounted displays/devices (HMDs), volumetric 3D displays, screen-based 3D displays, and holographic displays. The example categories are merely for explanation and, e.g., in some cases and examples may overlap.

Many head-mounted devices (HMD) occupy less space than goggleless devices and may be made with smaller components and less materials, which may translate into relatively low cost. However, as head mounted VR goggles and smart glasses are single user devices, such devices do not allow shared experiences as naturally as goggleless solutions.

Volumetric 3D displays take space from all three spatial directions and may require a lot of physical material making many such devices heavy, expensive to manufacture, and difficult to transport. Due to the heavy use of materials, volumetric displays also tend to have small "windows" and limited fields of view (FOVs).

Screen-based 3D displays typically have one large but flat screen and a device that projects image(s) over free space from a distance. These devices may be made more compact for transportation and have larger FOVs than, e.g., volumetric displays. Many of these devices are complex and expensive and require projector sub-assemblies. Many such devices, also require, e.g., accurate alignment between the different parts. Flat form-factor 3D displays may require a lot of space in two spatial directions, but because the third direction is only virtual, such devices may be relatively easy to transport to and assemble in different environments. Because the devices are flat, some of the optical components may be manufactured in sheet or roll format, making them relatively low cost in large volumes.

Another type of 3D display device capable of providing correct retinal focus cues is the holographic display. Holographic displays aim to reconstruct whole light wavefronts scattered from objects in natural settings. Many such devices lack a suitable Spatial Light Modulator (SLM) component that may be used in the creation of the extremely detailed wavefronts.

A further type of 3D display technology capable of providing natural retinal focus cues is called the Light Field (LF) display. LF display systems may generally be designed to create so-called light fields that represent light rays travelling in space to all directions. LF systems may generally aim to control light emissions both in spatial and angular domains with high resolution. A multiview 3D display that has very high angular resolution also may be called a LF display. HMDs, volumetric 3D displays, and screen-based displays may all be included as some examples of LF displays.

In many relatively low density multiview imaging displays, the views change in a coarse, stepwise fashion as the viewer moves in front of the device. This property lowers the quality of 3D experience and may even cause a complete breakdown of 3D perception. In order to mitigate this problem (together with vergence-accommodation conflict (VAC) type issues), some Super Multi View (SMV) techniques have been tested with as many as 512 views. An extremely large number of views are generated so as to make any transition between two viewpoints very smooth. If light from at least two images from slightly different viewpoints enters the eye pupil simultaneously, a much more realistic visual experience follows. In this case, motion parallax effects resemble the natural conditions better as the brain unconsciously predicts the image change due to motion. The SMV condition may be met by reducing the interval between two views at the correct viewing distance to a smaller value than the size of the eye pupil. At normal illumination conditions, the human pupil is generally estimated to be about 4 mm in diameter. If ambient light levels are high (e.g., in sunlight), the diameter may be as small as 1.5 mm and in dark conditions as large as 8 mm. The maximum angular density that may be achieved with SMV displays is limited by diffraction, and there is an inverse relationship between spatial resolution (pixel size) and angular resolution. Diffraction increases the angular spread of a light beam passing through an aperture, and this effect may often need to be taken into account in the design of very high density SMV displays.

For some embodiments, a tunable diffuser component capable of angularly selective light diffusion enables modification of light beam angular divergence properties without moving parts. Such a diffuser may have components that are based on the optical interface surface light scattering effect. For a particular field of view, some embodiments of a 3D optical display structure with a surface effect liquid crystal (SELC) tunable diffuser may have a lower number of light emitting components than other devices. For some embodiments, light is emitted from separately controllable small emitters and collimated with a microlens array. The SELC is used for selective diffusion of the emitted beams when the orientation of view directions is switched. For some embodiments, such a diffuser may be made with a lower quantity of emitters and at a lower cost than other devices.

So-called "smart windows" exist that can be transmissive and transparent in, e.g., a power on state, and non-transparent in, e.g., a power off state. Volume scattering-based LC diffusers have been used in display technology, such as polymer stabilized liquid crystals (PSLC) or polymer dispersed liquid crystals (PDLC) used in transparent displays or smart glass. Traditional methods are understood to be, in many cases, either totally transmissive or light diffusing without angular dependence.

Example static light directional controllers and static light shaping diffusers exist having fixed angular performance. Angular control of diffusing effects may be used with a display. For example, Luminit is understood to have produced direction turning films (DTF) and light shaping diffusers (LSD) that are static devices with fixed angular performance. The directional characteristic is fixed at manufacture time.

Figure 2:
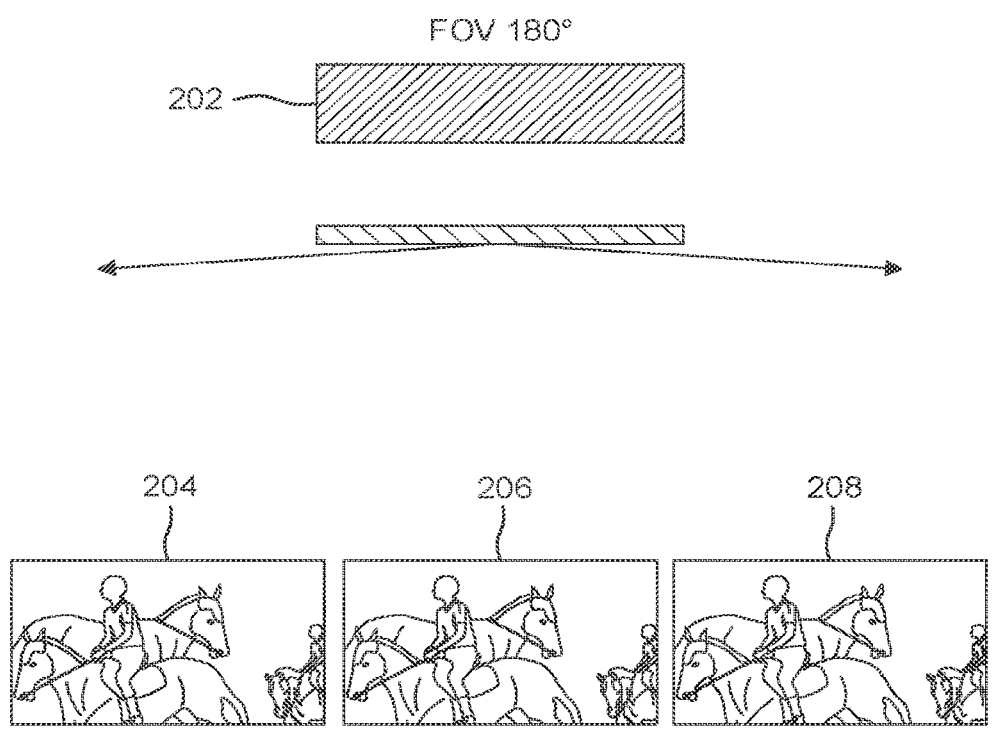
FIG. 2 is an illustration showing an example handset display in a first configuration according to some embodiments.

FIG. 2 is an illustration showing an example handset display in a first configuration according to some embodiments. FIG. 2 shows a handset display and the image seen by three viewers. A wide diffusion (e.g., 180 degrees) in all directions may be used for general multi-user viewing of an image at a first power level. The FOV 202 is, e.g., 180 degrees, and all of the viewers 204, 206, 208 see the image.

Figure 3A:
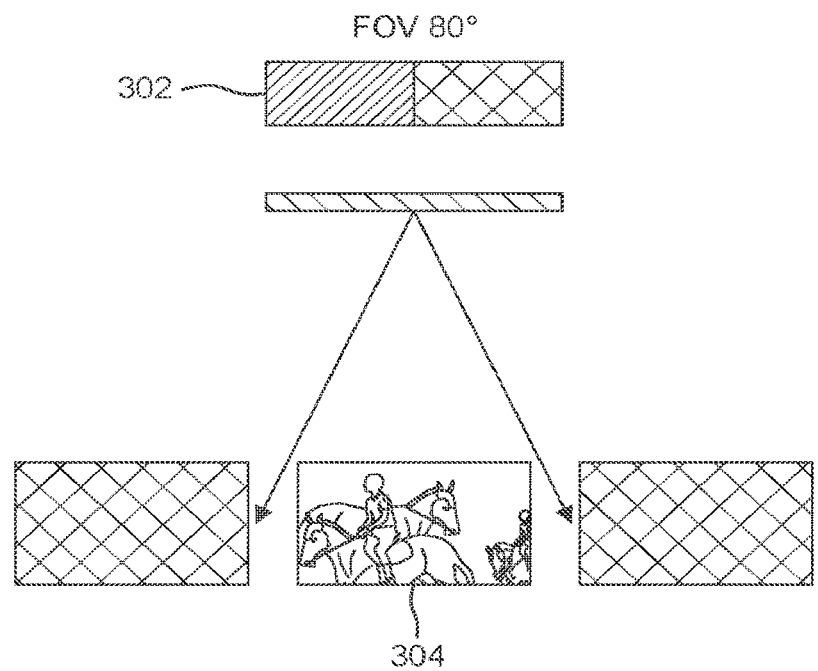
FIG. 3A is an illustration showing an example handset display in a second configuration according to some embodiments.

FIG. 3A is an illustration showing an example handset display in a second configuration according to some embodiments. FIG. 3A shows a reduced FOV 302 (e.g., 80 degrees) but brighter image in which the brighter image is seen only by a single viewer 304. For some embodiments, a handset display may use controllable FOV reduction to save power in exchange for a FOV reduction.

Figure 3B:
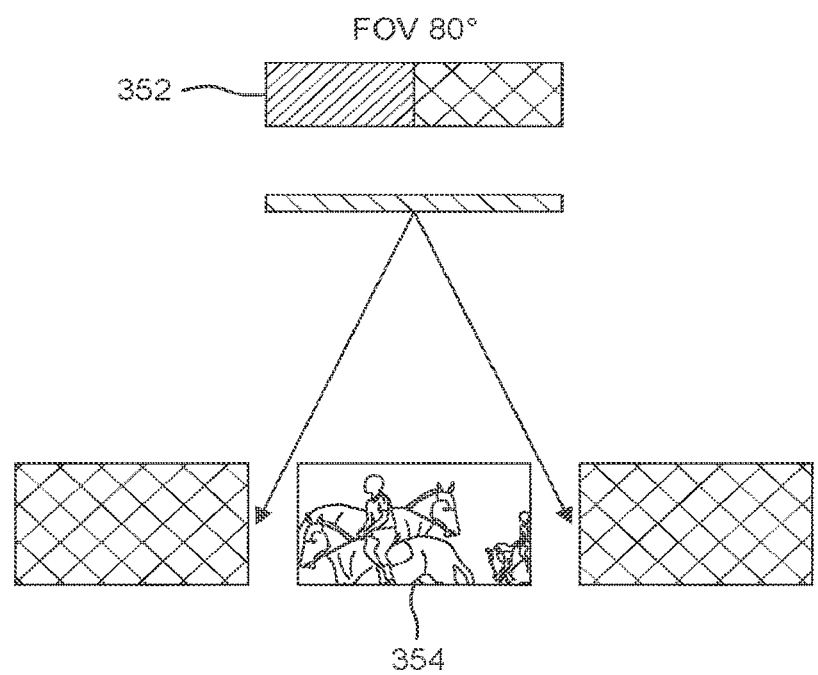
FIG. 3B is an illustration showing an example handset display in a third configuration according to some embodiments.

FIG. 3B is an illustration showing an example handset display in a third configuration according to some embodiments. FIG. 3B shows a reduced FOV 352 (e.g., 80 degrees) but lower brightness level compared to FIG. 3A. As in FIG. 3A, the image in FIG. 3B is seen by only one viewer 354. For some embodiments, a moderate level of diffusion may be used to provide a reduced field of view and to achieve power savings without reduction in brightness seen by the primary viewer, by reducing the emitted light in accordance with the FOV reduction.

A multiview LF display may be based on spatial multiplexing alone. A row or matrix of light emitting pixels (display sub-pixels) may be located behind a lenticular lens sheet or microlens array and each pixel may be projected to a unique view direction or to a limited set of view directions in front of the display structure. The more pixels on the light emitting layer behind each light beam collimating feature, the more views that may be generated. This phenomenon may lead to a trade-off between spatial resolution and the number of unique views generated. If the 3D display generates a smaller LF pixel size, the size of individual sub-pixels may be reduced, and/or a smaller number of viewing directions may be generated. Sub-pixel sizes may be limited to relatively large areas due to lack of suitable components. A high-quality LF display may have both high spatial and angular resolutions. High angular resolution may be needed to fulfill the Super Multi-View (SMV) condition and may be very difficult to achieve with currently available sources.

Figure 4A:
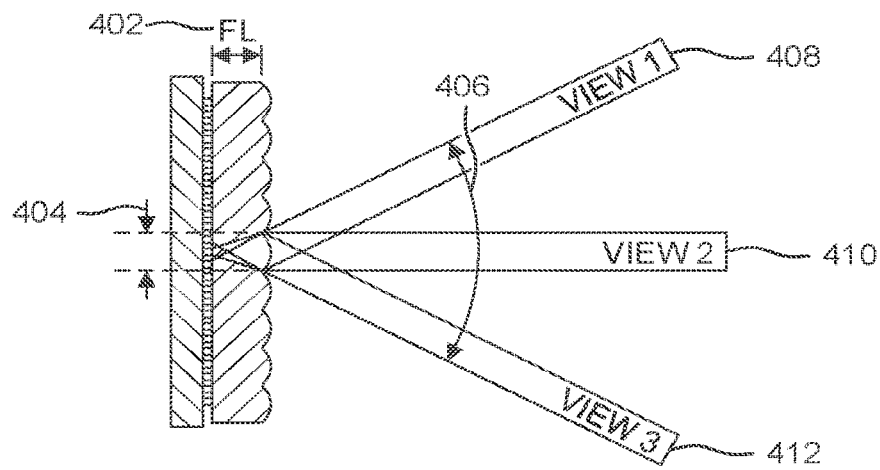
FIG. 4A is an illustration showing an example multiview 3D display in a first configuration according to some embodiments.
Figure 4B:
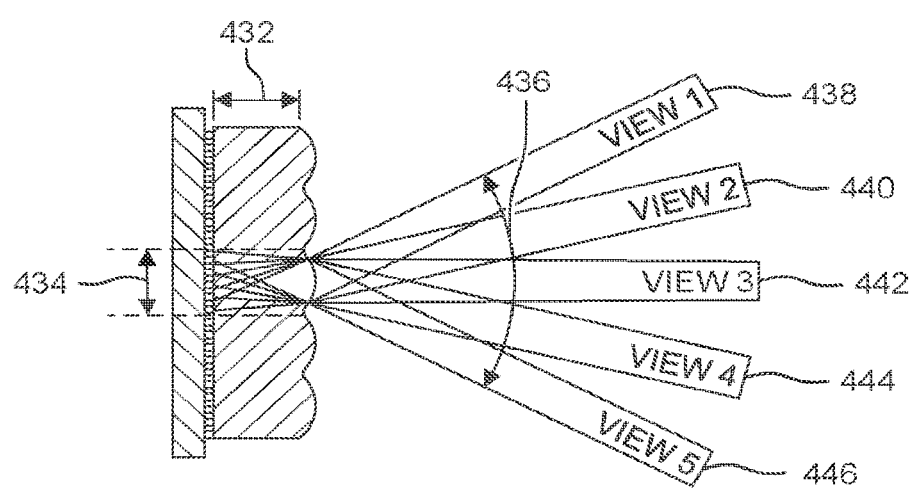
FIG. 4B is an illustration showing an example multiview 3D display in a second configuration according to some embodiments.
Figure 4C:
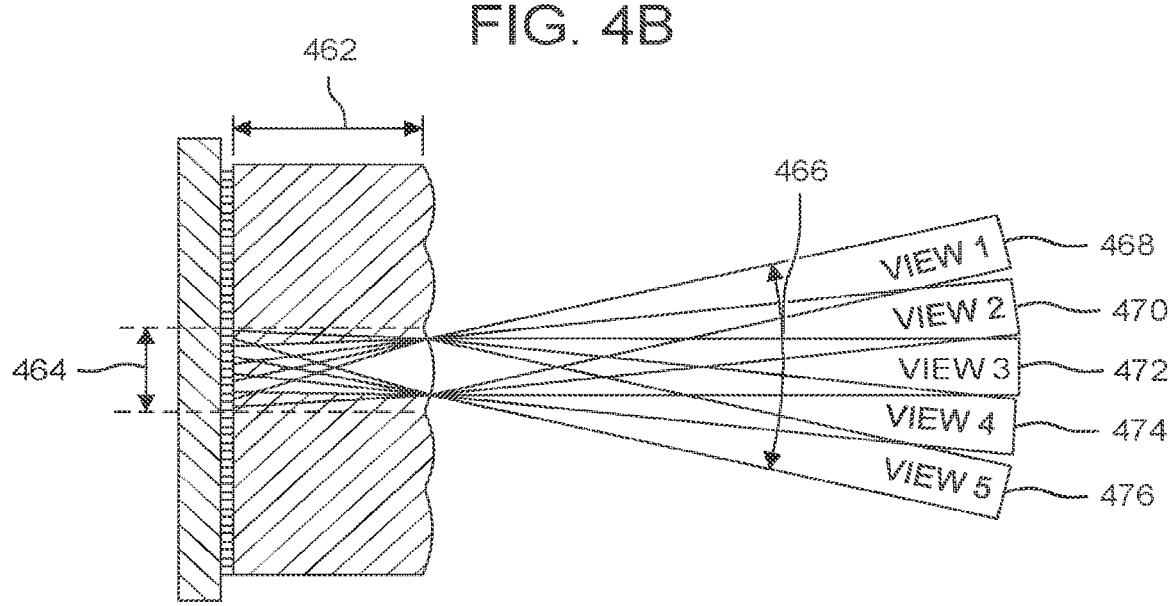
FIG. 4C is an illustration showing an example multiview 3D display in a third configuration according to some embodiments.

FIG. 4A is an illustration showing an example multiview 3D display structure with a first focal length according to some embodiments. FIG. 4B is an illustration showing an example multiview 3D display structure with a second focal length according to some embodiments. FIG. 4C is an illustration showing an example multiview 3D display structure with a third focal length according to some embodiments.

As an example of an optical design problem, FIGS. 4A and 4B show two integral imaging multiview display cases where a lenticular sheet is placed in front of a light emitter array. In the examples of FIGS. 4A and 4B, the quantity and size of emitters is the same. Lenticular lenses may be designed to have the same focal length (FL) 402, 432, which is the distance between lens surface and source. The optics of the lenticular lenses may be able to create multiple well-collimated individual beams of light that are used in showing the multiview images to different view directions. Both example cases have the same field-of-view (FOV) 406, 436, but as the structure of FIG. 4B has a larger lens aperture 434 that covers five sources with five shown views 438, 440, 442, 444, 446 instead of the lens aperture 404 of FIG. 4A that covers three sources with three shown views 408, 410, 412, the angular resolution is higher. However, as the aperture is larger, spatial resolution is lower.

A similar trade-off may be made with the angular view density and total angular range or FOV. By increasing the distance between microlenses and emitters and decreasing the optical power of the microlenses accordingly, the angular view density may be increased but the FOV is lowered. This trade-off is illustrated in the display optics cases pictured in FIGS. 4B and 4C. Both structures have the same lens aperture size 464, 434 and both structures are able to create five different view beams 438, 440, 442, 444, 446, 468, 470, 472, 474, 476 for each projector cell. But as the optics of the structure of FIG. 4C has a longer FL 462, the beams 468, 470, 472, 474, 476 are projected to a lower FOV 466 and angular density is increased.

Integral imaging based LF displays have spatial and angular domains where multiple interlaced beams are used together in creation of multiple different images. In order to fulfill the field-of-view and image uniformity requirements with the optical display structure, light diffusing surfaces are often needed. A diffuser structure may be utilized in, e.g., creation of volumetric images, improving single image uniformity, increasing the FOV and/or making the transition between neighboring views smoother. A problem associated with many optical diffusers that use material scattering or uniform surface microstructures is that such diffusers tend to diffuse light similarly in all directions. This property is often an undesirable feature if: (1) maintaining high angular resolution in one direction for creation of the stereoscopic effect; and (2) increasing the FOV with diffusion in the other direction to make the image visible from a larger viewing window. Some holographic gratings have been developed to handle this property, but many such gratings are static components that require very specialized manufacturing methods and that are difficult to adjust to different uses. For some embodiments disclosed herein, a tunable diffuser and/or tunable diffuser components may be used in a 3D display structure.

Many high-quality multiview displays classified as light field displays require a very large number of light sources in order to obtain an adequately good resolution (as, e.g., determined by a user) both in the spatial and angular domains. The sources often need to have very high dynamic range in order to compensate for the optical efficiency differences associated with optical devices projecting images in different angular directions. Many μLEDs developed especially for display applications often have such a dynamic range. One challenge with such μLEDs may be a requirement for extremely high density assembly of the micro-scale components. Also, because such components need to be individually-addressable, the electrical connections become very difficult to arrange in the small scale. This difficulty often leads to high costs because the number of components is very high, and the manufacturing of the source module often requires extreme accuracy.

Figure 5:
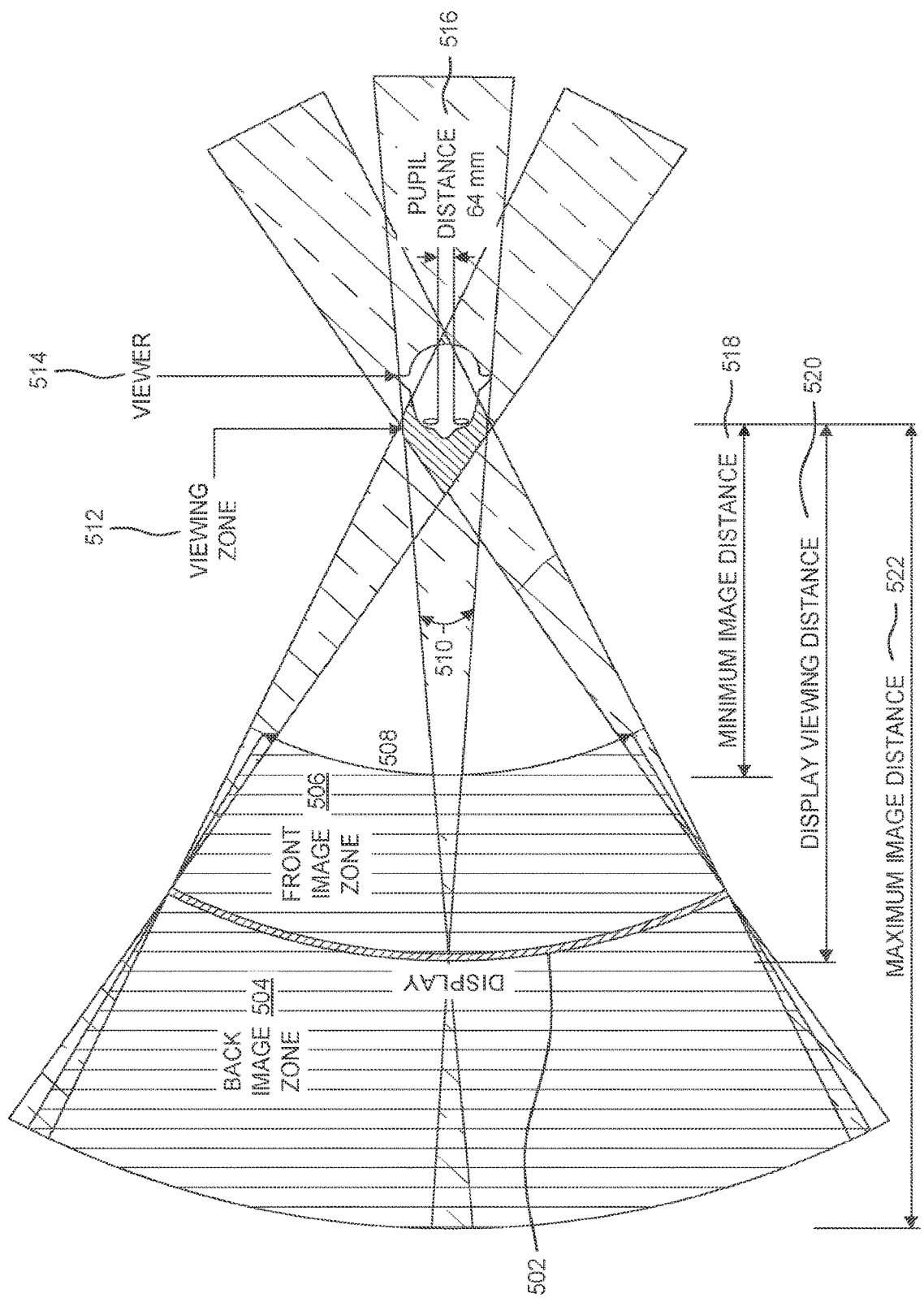
FIG. 5 is an illustration showing an example 3D light field display with image zones on both sides of the device according to some embodiments.

FIG. 5 is an illustration showing an example 3D light field display with image zones on both sides of the display according to some embodiments. Without any light scattering media between the 3D display and the viewer, all areas of the display project emitter images towards both eyes of the viewer. However, generally in order to create the stereoscopic image, one emitter inside the display should not be visible to both eyes simultaneously. This means that the emitted beam bundle field-of-view (FOV) from all parts of the display covers both eyes, but the single beams need to have FOVs that make them narrower than the distance between two eye pupils (~64 mm on average) at the viewing distance. The FOV of one display section and the FOVs of the single emitters are determined by the widths of the emitter row/emitter and magnification of the imaging optics.

In order to make beam bundle FOVs to overlap at specified viewing distance, the display may be, e.g., curved with a certain radius or the projected beams may be turned towards a specific point with, e.g., a flat Fresnel lens sheet. A simple multiview display based on emitters and microlenses also may use a technique where the emitter locations are slightly shifted in respect to the collimating lens central axis. If this shift is increased from the central display position towards the display edges, the projected beam bundles from display edges may be made to overlap with the central beam bundles. If the FOVs do not overlap, some parts of the 3D image may not be formed.

Due to the limited size of the device and practical limits for focal distances, an image zone is formed in front of and/or behind the display device where the 3D image is visible. FIG. 5 shows an example viewing geometry that may be achieved with a 3D LF display structure. In front of the curved display, there is a 3D image zone limited by the furthest focal distance from the display with reasonable spatial resolution and by the whole display FOV. There also may be another image zone behind the display, which is formed with the virtual extensions of the emitted beams. Larger voxels may be allowed behind the display as the viewer is positioned further away and eye resolution is lower. The maximum image distance may be selected on the basis of minimum acceptable resolution achievable with the expanding beam virtual extensions.

In FIG. 5, the display surface is curved with a radius that is the same as the designated viewing distance. The overlapping beam bundle FOVs form a viewing zone 512 around the facial area of the viewer 514. Size of this viewing zone 512 may determine the amount of movement allowed for the viewer head. Both eye pupils need to be inside the zone 512 simultaneously in order for a viewer 514 to see a stereoscopic image. For some embodiments, size of the viewing zone 512 may be adjusted by altering the beam bundle FOVs. A display 502 may generate a back image zone 504 behind the display 502 and a front image zone 506 in front of the display 502. The display may generate a display FOV 508 and an LF pixel FOV 510 for a viewer 514. An average pupil distance 516 between each eye is 64 mm. A minimum image distance 518 is the distance from a viewer's eyes to the center of the arc of the front of the front image zone 506. A display viewing distance 520 is the distance from the viewer's eyes to the center of the arc of the display 502. The maximum image distance 522 is the distance from the viewer's eyes to the center of the arc of the back of the back image zone 504.

For some embodiments, a light field display structure may execute a process that includes rendering one or more images for a light field (LF) display device; and sending the one or more rendered images to the LF display device. For example, the display 502 may receive data and information related to one or more rendered images. This rendered image data may be used to generate an image in the front image zone 506 and/or the back image zone 504.

Figure 6A:
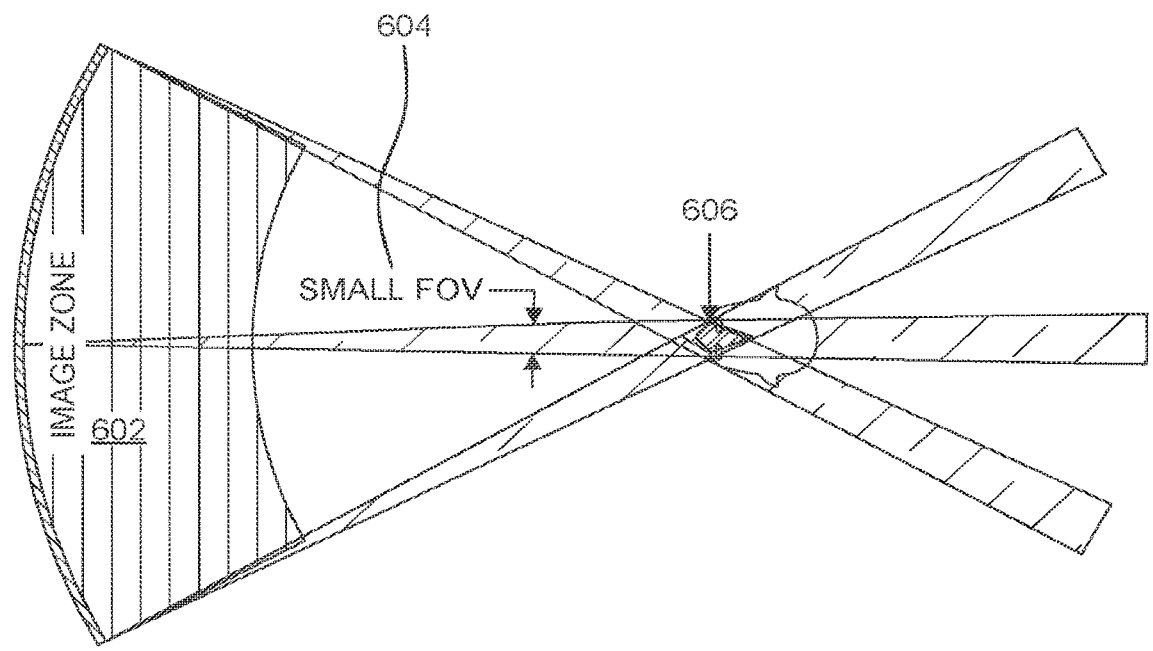
FIG. 6A is an illustration showing an example 3D light field display with an example small viewing zone according to some embodiments.
Figure 6B:
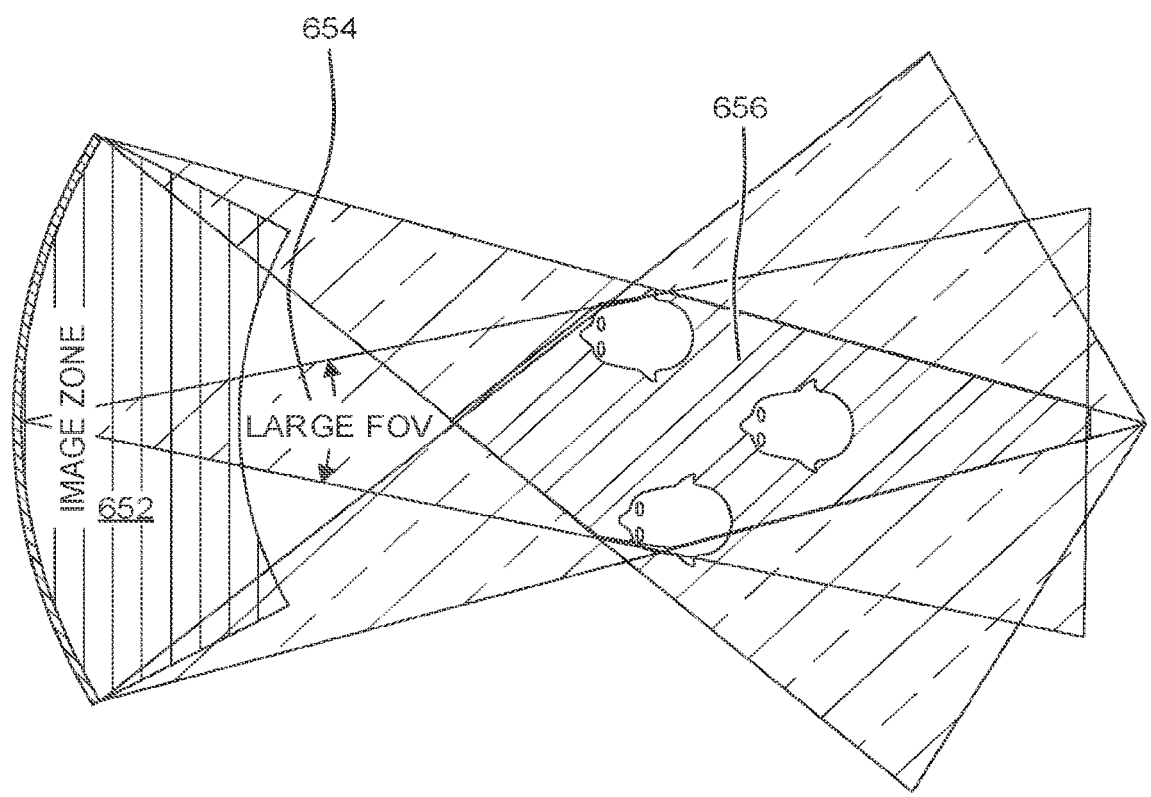
FIG. 6B is an illustration showing an example 3D light field display with an example large viewing zone according to some embodiments.

FIG. 6A is an illustration showing an example 3D light field display with an example small viewing zone according to some embodiments. FIG. 6B is an illustration showing an example 3D light field display with an example large viewing zone according to some embodiments. FIGS. 6A and 6B each show an example viewing geometry. In FIG. 6A, a single viewer is sitting in front of the display with an image zone 602 and both eye pupils are covered with a small viewing zone 606 achieved with narrow beam bundle FOVs 604. The minimum functional width of the zone is determined by the eye pupil distance (on average ~64 mm). A small width also means a small tolerance for viewing distance changes as the narrow FOVs start to separate from each other with small changes in viewing distance both in front of and behind the optimal viewing location. In the viewing geometry of FIG. 6B, the beam bundle FOVs 654 are quite wide for a display with the same size image zone 652, enabling multiple viewers to be inside the viewing zone 656 at different viewing distances. In the case shown in FIG. 6B, the positional tolerances are large.

The viewing zone may be increased by increasing the FOV of each display beam bundle. This change may be done by either increasing the width of the light emitter row or by changing the focal length of the beam collimating optics. Unfortunately, smaller focal lengths may result in larger voxels. Hence, the focal length may be increased for better resolution. This situation means generally that there is a trade-off between the optical design parameters and device size.

In some embodiments, in order to create good resolution 3D images, each projected view beam is very well collimated and has a narrow diameter. If the beam diameter and divergence are large, the voxel is perceived by the eye retina as a large spot. Voxels positioned behind the display surface are formed with virtual extensions of the emitted beams and may be allowed to be bigger as eye resolution becomes lower with longer distances.

For some embodiments, multiple viewers may view the display, such as a multiview display. For some embodiments, a light field (LF) display structure may include a three-dimensional (3D) display, such that the LF display structure includes a diffuser with directional controllability patterned across the 3D display to allow spatially varying diffusion directional characteristics.

Figure 7A:
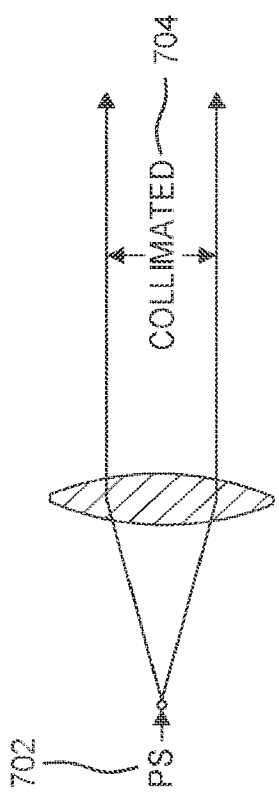
FIG. 7A is an illustration showing an example ideal case of a perfect collimation without any beam divergence caused by one or more geometric factors according to some embodiments.
Figure 7B:
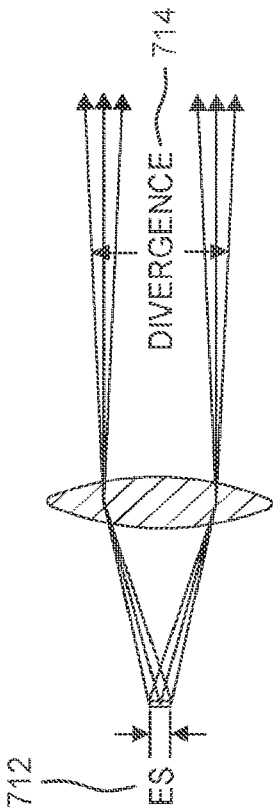
FIG. 7B is an illustration showing an example beam divergence caused by one or more geometric factors according to some embodiments.
Figure 7C:
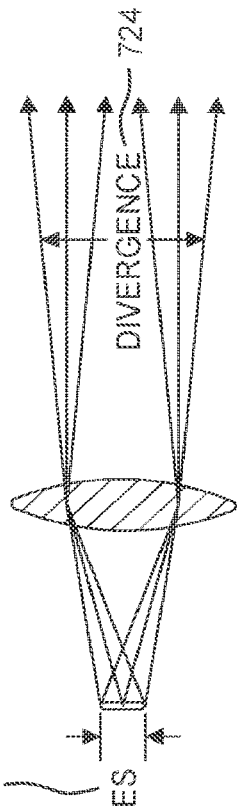
FIG. 7C is an illustration showing an example beam divergence caused by one of more geometric factors according to some embodiments.

FIG. 7A is an illustration showing an example ideal case of perfect collimation without any beam divergence caused by one or more geometric factors according to some embodiments. FIG. 7B is an illustration showing an example beam divergence caused by one or more geometric factors according to some embodiments. FIG. 7C is an illustration showing an example beam divergence caused by one or more geometric factors according to some embodiments. For the ideal lens of FIG. 7A, the achievable light beam collimation is dependent on two geometrical factors: size of the light source and focal length of the lens. Perfect collimation 704 without any beam divergence may only be achieved in the theoretical case in which a single color point source (PS) 702 is located exactly at focal length distance from an ideal positive lens. This case is pictured in FIG. 7A. Unfortunately, all real-life light sources have some surface area from which the light is emitted making them extended sources (ES). As each point of the source is separately imaged by the lens, the total beam ends up consisting from a group of collimated sub-beams that propagate to somewhat different directions after the lens. As shown in FIGS. 7A to 7C, as the source grows larger 712, 722, the total beam divergence 714, 724 increases. This geometrical factor generally cannot be avoided with any optical means and it is the dominating feature causing beam divergence with relatively large light sources.

Another, non-geometrical, feature causing beam divergence is diffraction. The term refers to various phenomena that occur when a wave (of light) encounters an obstacle or a slit. Diffraction is the bending of light around the corners of an aperture into the region of a geometrical shadow. Diffraction effects may occur in all imaging systems and cannot be removed, even with a perfect lens design that is able to balance out all optical aberrations. A lens that is able to reach the highest optical quality is often called "diffraction limited" because most of the blurring remaining in the image comes from diffraction. The angular resolution achievable with a diffraction limited lens may be calculated from the formula of Eq. 1:

$$\Theta = \arcsin\left(1.22 * \left(\frac{\lambda}{D}\right)\right) \qquad \text{Eq. 1}$$

where $\lambda$ is the wavelength of light, and D is the diameter of the lens aperture. It may be seen from the equation that the color (wavelength) of light and lens aperture size (diameter of light entering a viewer's pupil) are the only things that have an influence on the amount of diffraction.

Figure 7D:
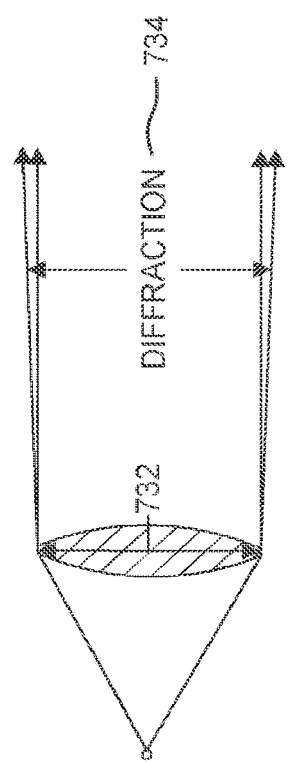
FIG. 7D is an illustration showing an example beam divergence caused by diffraction and a first aperture size according to some embodiments.
Figure 7E:
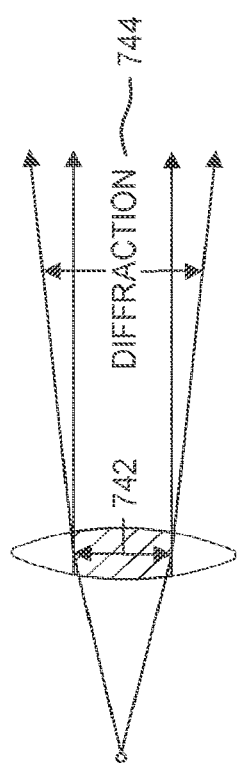
FIG. 7E is an illustration showing an example beam divergence caused by diffraction and a second aperture size according to some embodiments.
Figure 7F:
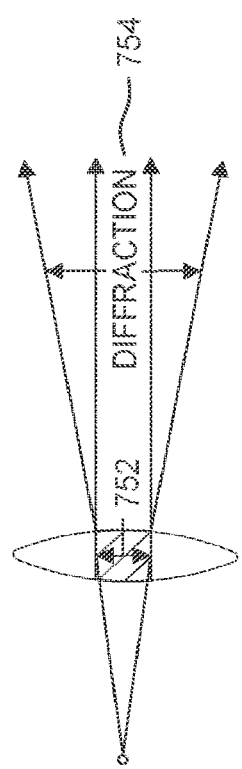
FIG. 7F is an illustration showing an example beam divergence caused by diffraction and a third aperture size according to some embodiments.

FIG. 7D is an illustration showing an example beam divergence caused by diffraction and a first aperture size according to some embodiments. FIG. 7E is an illustration showing an example beam divergence caused by diffraction and a second aperture size according to some embodiments. FIG. 7F is an illustration showing an example beam divergence caused by diffraction and a third aperture size according to some embodiments. FIGS. 7D to 7F show a schematic presentation of how the beam divergence 734, 744, 754 is increased when the lens aperture size 732, 742, 752 is reduced. This effect may actually be formulated into a general rule in imaging optics design: if the design is diffraction limited, the only way to improve resolution is to make the aperture larger. Diffraction is typically the dominating feature causing beam divergence with relatively small light sources.

As shown in FIGS. 7A-7C, the size of an extended source has a big effect on the achievable beam divergence. The source geometry or spatial distribution is actually mapped to the angular distribution of the beam, and this property may be seen in the resulting "far field pattern" of the source-lens system. In practice, this property means that if the collimating lens is positioned at the focal distance from the source, the source is actually imaged to a relatively large distance from the lens and the size of the image may be determined from the system "magnification ratio". In the case of a single imaging lens, this magnification ratio may be calculated by dividing the distance between lens and image with the distance between source and lens, as shown in Eq. 2:

$$\text{magnification ratio} = \frac{\text{distance between lens and image}}{\text{distance between source and lens}} \qquad \text{Eq. 2}$$

Figure 8A:
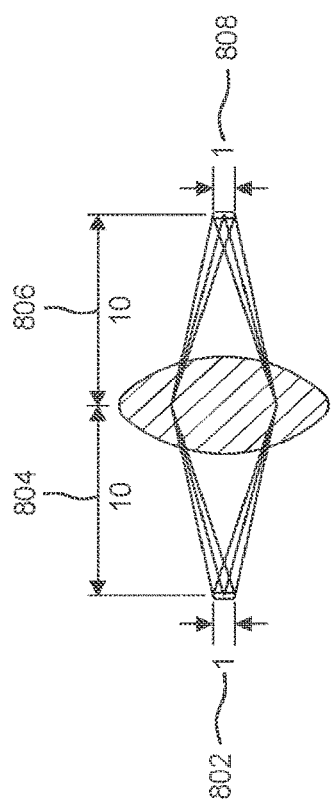
FIG. 8A is an illustration showing an example image magnification lens with a first optical power according to some embodiments.
Figure 8B:
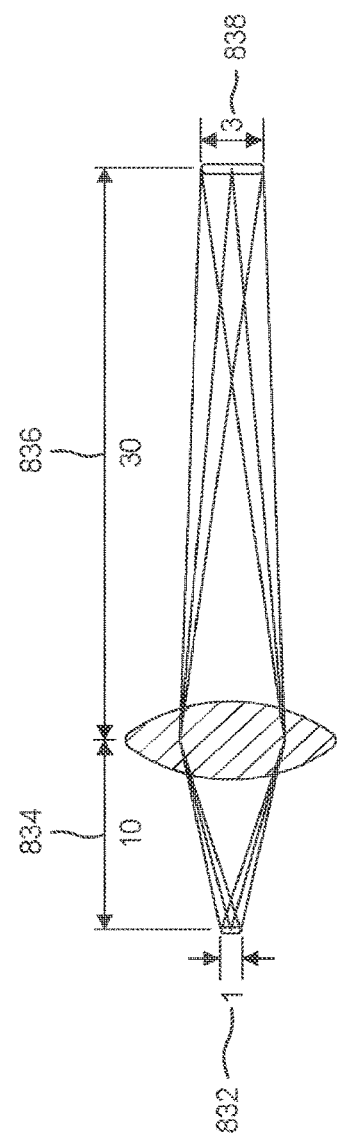
FIG. 8B is an illustration showing an example image magnification lens with a second optical power according to some embodiments.
Figure 8C:
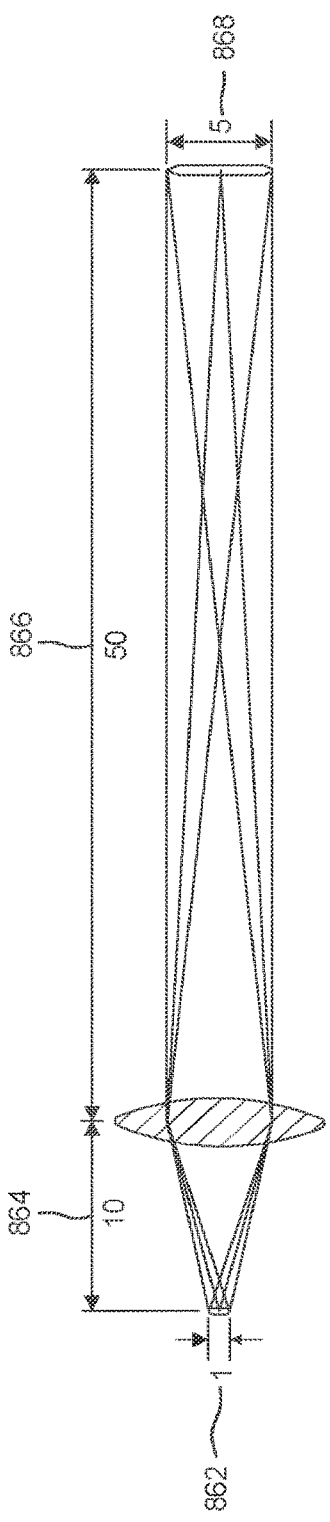
FIG. 8C is an illustration showing an example image magnification lens with a third optical power according to some embodiments.

FIG. 8A is an illustration showing an example image magnification lens with a first optical power according to some embodiments. FIG. 8B is an illustration showing an example image magnification lens with a second optical power according to some embodiments. FIG. 8C is an illustration showing an example image magnification lens with a third optical power according to some embodiments. FIGS. 8A to 8C illustrate Eq. 2 for three different distances 806, 836, 866 between the lens and the image, resulting in larger images 808, 838, 868 as the distance 806, 836, 866 is increased. If the distance 804, 834, 864 between the source (with a fixed height 802, 832, 862) and the lens is fixed, different image distances may be achieved by changing the optical power of the lens with the lens curvature. But when the image distance becomes larger and larger in comparison to the lens focal length, the changes in lens optical power become smaller and smaller, approaching the situation where the lens is effectively collimating the emitted light into a beam that has the spatial distribution of the source mapped into the angular distribution, and the source image is formed without focusing.

In flat form factor goggleless 3D displays, the display projection lenses typically have very small focal lengths in order to achieve the flat structure, and the beams from a single display optics cell are projected to a relatively large viewing distance. This means that the sources are effectively imaged with high magnification when the beams of light propagate to the viewer. For example, if the source size is 50 µm×50 µm, projection lens focal length is 1 mm, and viewing distance is 1 m, then the magnification ratio is 1000:1, and the source geometric image is 50 mm×50 mm. This means that the single light emitter may be seen only with one eye inside this 50 mm diameter eyebox.

For a lens with a magnification ratio of 1000:1, if the source has a diameter of 100 µm, the resulting image is 100 mm wide, and the same pixel may be visible to both eyes simultaneously because the average distance between eye pupils is only 64 mm. In this latter case, a stereoscopic 3D image is not be formed because both eyes see the same images. This example calculation shows how geometrical parameters, like light source size, lens focal length, and viewing distance, are tied to each other.

Both geometric and diffraction effects work in unison, and an LF display pixel design may balance geometric and diffraction effects to achieve a particular voxel resolution. This is emphasized with very small light sources as the optical system measurements become closer to the wavelength of light and diffraction effects start to dominate the performance. FIGS. 9A to 9D illustrate how the geometric and diffraction effects work together in cases where one and two extended sources are imaged to a fixed distance with a fixed magnification. FIGS. 9A to 9D show light source spot sizes for different geometric magnification and diffraction effects.

FIG. 9A is an illustration showing an example first light source and lens configuration according to some embodiments. For the example structure of FIG. 9A, an extended source (ES) 902 is located at a focal length 904 of 10 cm from the magnification lens. Light beams passing through an example lens aperture 906 are separated by 5 cm. The light beams have a geometric image indicated as GI 908. The light source has a diffracted image height indicated by DI 910. FIG. 9A shows a lens aperture size that is relatively small, and the geometric image (GI) 908 is surrounded by a blur that comes from diffraction in making the diffracted image (DI) 910 much larger.

FIG. 9B is an illustration showing an example second light source and lens configuration according to some embodiments. For the example structure of FIG. 9B, two extended sources 922, 924 are located at a focal distance 926 of 10 cm from the magnification lens. Light beams passing through an example lens aperture 928 are separated by 5 cm. The light beams generate respective image indicated with heights of GI1 (930) and GI2 (934), respectively. Each light source has a respective diffracted image height indicated by DI1 (932) and DI2 (936), respectively. FIG. 9B shows a case where two extended sources are placed side-by-side and imaged with the same small aperture lens. Even though the GIs of both sources are separated, the two source images cannot be resolved because the diffracted images overlap. In practice this would mean that reduction of light source size may not improve the achievable voxel resolution because the resulting source image size may be the same with two separate light sources as with one larger source that covers the area of both separate emitters. In order to resolve the two source images as separate pixels/voxels, the aperture size of the imaging lens may be increased.

FIG. 9C is an illustration showing an example third light source and lens configuration according to some embodiments. For the example structure of FIG. 9C, an extended source (ES) 942 is located at a focal distance 944 of 10 cm from the magnification lens. Light beams passing through an example lens aperture 946 are separated by 10 cm. The light beams generate an image indicated with a height of GI 948. The light source has a diffraction index indicated by DI 950. Compared with FIG. 9A, the distance GI 908, 948 is the same in both figures, but the diffracted image height 950 in FIG. 9C is smaller than the diffracted image height 950 in FIG. 9A. FIG. 9C shows the same focal length lens as FIGS. 9A and 9B, but a larger aperture 946 is used in imaging the extended source 942. Diffraction is reduced, and the diffracted image may be only slightly larger than the geometric image, which has remained the same size because magnification is fixed.

FIG. 9D is an illustration showing an example fourth light source and lens configuration according to some embodiments. For the example structure of FIG. 9D, two extended sources (962, 964) are located at a focal distance 966 of 10 cm from the magnification lens. Light beams passing through an example lens aperture 968 are separated by 10 cm. The light beams generate respective image indicated with heights of GI1 (970) and GI2 (974), respectively. Each light source has a respective diffracted image height indicated by DI1 (972) and DI2 (976), respectively. Compared with FIG. 9B, the distances GI1 (930, 970) and GI2 (934, 974) are the same in both figures, but the diffracted image heights (972, 976) in FIG. 9D are smaller than the diffracted heights (932, 936) in FIG. 9B. In FIG. 9D, the two spots may be resolved because the diffracted images are not overlapping, thereby enabling the use of two different sources and improvement of spatial resolution of the voxel grid.

The journal article Vincent W. Lee, Nancy Twu, & Ioannis Kymissis, *Micro-LED Technologies and Applications*, 6/16 INFORMATION DISPLAY 16-23 (2016) discusses an emerging display technology based on the use of so-called µLEDs. Micro LEDs are LED chips that are manufactured typically with the same techniques and from the same materials as other LED chips in use today. However, µLEDs are miniaturized versions of the commonly available components and µLEDs may be made as small as 1 µm-10 µm. One of the challenges with µLEDs is how to handle the very small components in display manufacturing. The journal article François Templier, et al., *A Novel Process for Fabricating High-Resolution and Very Small Pixel-pitch GaN LED Microdisplays*, SID 2017 DIGEST 268-271 (2017) discusses one of the densest matrices that has been manufactured so far, 2 µm×2 µm chips assembled with 3 µm pitch. The µLEDs have been used as backlight components in TVs, but µLEDs are expected to challenge OLEDs in the µ-display markets in the near future. Compared to OLEDs, many µLEDs are more stable components and are able to produce high light intensities, which enables µLEDs to be used in many applications, such as head mounted display systems, adaptive car headlamps (as an LED matrix), and TV backlights. The µLEDs also may be used in 3D displays, which use very dense matrices of individually addressable light emitters that may be switched on and off very fast.

A bare µLED chip may emit a specific color with a spectral width of ~20-30 nm. A white source may be created by coating the chip with a layer of phosphor, which converts the light emitted by blue or UV LEDs into a wider white light emission spectra. A full-color source may also be created by placing separate red, green, and blue LED chips side-by-side. The combination of these three primary colors may create the sensation of a full color pixel when the separate color emissions are combined by the human visual system. A very dense matrix may allow the manufacturing of self-emitting full-color pixels that have a total width below 10 µm (3×3 µm pitch).

Light extraction efficiency from the semiconductor chip is a parameter that indicates electricity-to-light efficiency of LED structures. There are several methods that aim to enhance the extraction efficiency and enable building of LED-based light sources that efficiently use electric energy, such as in mobile devices that have a limited power supply. One method presented in U.S. Pat. No. 7,994,527 is understood to be based on the use of a shaped plastic optical element that is integrated directly on top of a LED chip. Due to a lower refractive index difference, integration of a plastic shape extracts more light from chip material in comparison to a chip surrounded by air. The plastic shape also directs the light in a way that enhances light extraction from the plastic piece and makes the emission pattern more directional. Another method presented in U.S. Pat. No. 7,518,149 is understood to enhance light extraction from a µLED chip. This is done by shaping the chip to a form that favors light emission angles that are more perpendicular towards the front facet of the semiconductor chip and enable light to escape from the high refractive index material. These structures also direct the light emitted from the chip. In the latter case, the extraction efficiency is calculated to be twice as good in comparison with typical µLEDs, and more light is emitted to an emission cone of 30° in comparison with a typical chip with a Lambertian distribution of emitted light that is distributed evenly to the surrounding hemisphere.

Multiple components and systems based on liquid crystal (LC) materials have been developed for electrical control of light propagation, and such components are available at lower costs in large quantities. For some embodiments, LC-based tunable components may be used in 3D displays. Such LC components may be able to cause light beam adjustments without moving mechanical parts. LC-based components typically use linearly polarized light, which may lower optical efficiency and increase power consumption. Because LCDs are typically polarization-dependent devices, light propagation controlling components may be used in 3D displays without a high cost in efficiency. The journal article Shang, Xiaobing, et al., *Fast Switching Cholesteric Liquid Crystal Optical Beam Deflector with Polarization Independence*, SCIENTIFIC REPORTS July 26; 7(1):6492 (2017) ("Shang") describes using cholesteric LCs (instead of the more common nematic phase crystals) that may be used, e.g., for beam steering without polarization dependence, enabling increasing of the component transmittance for display panels based on OLEDs or µLEDs.

U.S. Pat. No. 9,664,914 is understood to describe using LC components in autostereoscopic 3D displays as electrically switchable parallax barriers. When the LC layer is activated, a black grating structure blocks some display pixel view directions and different images may be shown to the two eyes of the viewer. Without the activated grating, the display functions as a normal 2D display. U.S. Pat. No. 9,709,851 is understood to describe using the LC layer in forming a lenticular lens structure on top of a dense pixel matrix by reorienting some of the LC material molecules with electric current. An LC layer may use intricate electrode designs, but the LC layer may be used for switching between 2D and 3D modes such that the LC lenses project pixel images in different view directions. In the latter mode, multiple views may be obtained with the cost of spatial resolution because only spatial multiplexing is used to create a multiview image. The journal article Y-P. Huang, et al., *Autostereoscopic 3D Display with Scanning Multi-Electrode Driven Liquid Crystal (MeD-LC) Lens*, 1:1 3D RESEARCH 39-42 (2010) discusses a proposed system that scans electrically formed lenticular LC lenses through the display surface, adding the possibility for time multiplexing. In this case, the pixels synchronized to the scanning action may be activated several times inside a single scan timeframe, creating several additional views.

As highly birefringent material, the LC layers have different refractive indices in two orthogonal directions. This property may be used together with, e.g., polymer microprisms for switching between two beam steering states with a structure that contains two LC layers according to the journal article H. Wang, et al., *Large-aperture transparent beam steering screen based on LCMPA*, 55:28 APPLIED OPTICS (2016). The first, active LC layer, is located between, e.g., two glass sheets containing electrodes. The second, passive layer, is formed between glass or polymer substrate and a polymer microprism sheet. The active LC layer rotates incident beam linear polarization by 90° perpendicular to the propagation direction when voltage is applied. This rotation selects which of the refractive indices of the birefringent passive LC layer is used in the second part of a device. In the first state of a steering device, the refractive index difference between the passive LC layer and the microprism polymer material is so small that no light bending occurs. In the second state, the index difference causes light rays to bend to a predetermined angle at the interface. This angle is usually fairly small (~1°), but the angle may be increased, e.g., by adding holographic gratings after the LC layers (according to journal article P. McManamon, et al., *A Review of Phased Array Steering for Narrow-Band Electrooptical Systems*, 97:6 PROCEEDINGS OF THE IEEE 1078-96 (2009)) or by stacking several polarization based beam steering components, making it possible to reach angles as large as, e.g., ±15° as understood according to PCT Patent Application No. WO2011014743.

PCT Patent Application No. WO2012025786 is understood to describe a hybrid system where a light beam tuning LC element is used before a rigid polymer lenticular sheet structure, and journal article Xiangyu Zhang, et al., *A Novel Spatio-Temporal Multiplexing Multi-view 3D Display*, IEEE CONFERENCE ON LASERS AND ELECTRO-OPTICS PACIFIC RIM (CLEO-PR) (2017) uses the LC element after the rigid polymer lenticular sheet structure, making it possible to create additional angular view directions between the directions determined by pixel positions and lenticular optics. In these cases, temporal multiplexing is used together with spatial multiplexing in 3D multiview displays. The same LC based beam steering screen component also may be used in a similar manner with multiple projectors according to journal article X. Xia, et al., *Time-Multiplexed Multi-view*

*Three-Dimensional Display with Projector Array and Steering Screen,* 26:12 OPTICS EXPRESS 15528-38 (2018).

In addition to beam angular steering, the LC based components with hybrid structures (as understood to be described in U.S. Pat. Nos. 7,408,601 and 9,709,829 and PCT Patent Application No. WO2016135434) are understood to be capable of being used for adjusting beam focus without mechanical movement. This electronic focus adjustment may be utilized in head mounted devices where the stereoscopic 3D display virtual image may be moved to different focal distances from the eye making the images look more natural, according to journal article G. Love, et al., *High-Speed Switchable Lens Enables the Development of a Volumetric Stereoscopic Display,* 17(18) OPTICS EXPRESS 15716-25 (2009). Beam focus adjustment may also be utilized in goggleless 3D displays by adjusting the position or shape of the projected image focal surface according to journal article N. Matsuda, A. Fix, & D. Lanman, *Focal Surface Displays,* 36 (4) ACM TRANSACTIONS ON GRAPHICS 1-14 (2017). In many of the cases described in, e.g., example 3D/LF display patents or articles, focus adjustment directly alters the whole projected image. For example, journal article L. Commander, S. Day, & D. Selviah; *Variable Focal Length Microlenses,* 177:1-6 OPTICS COMMUNICATIONS 157-170 (2000) describes an example lens system that contains an array of focus adjustable microlenses.

Figure 10:
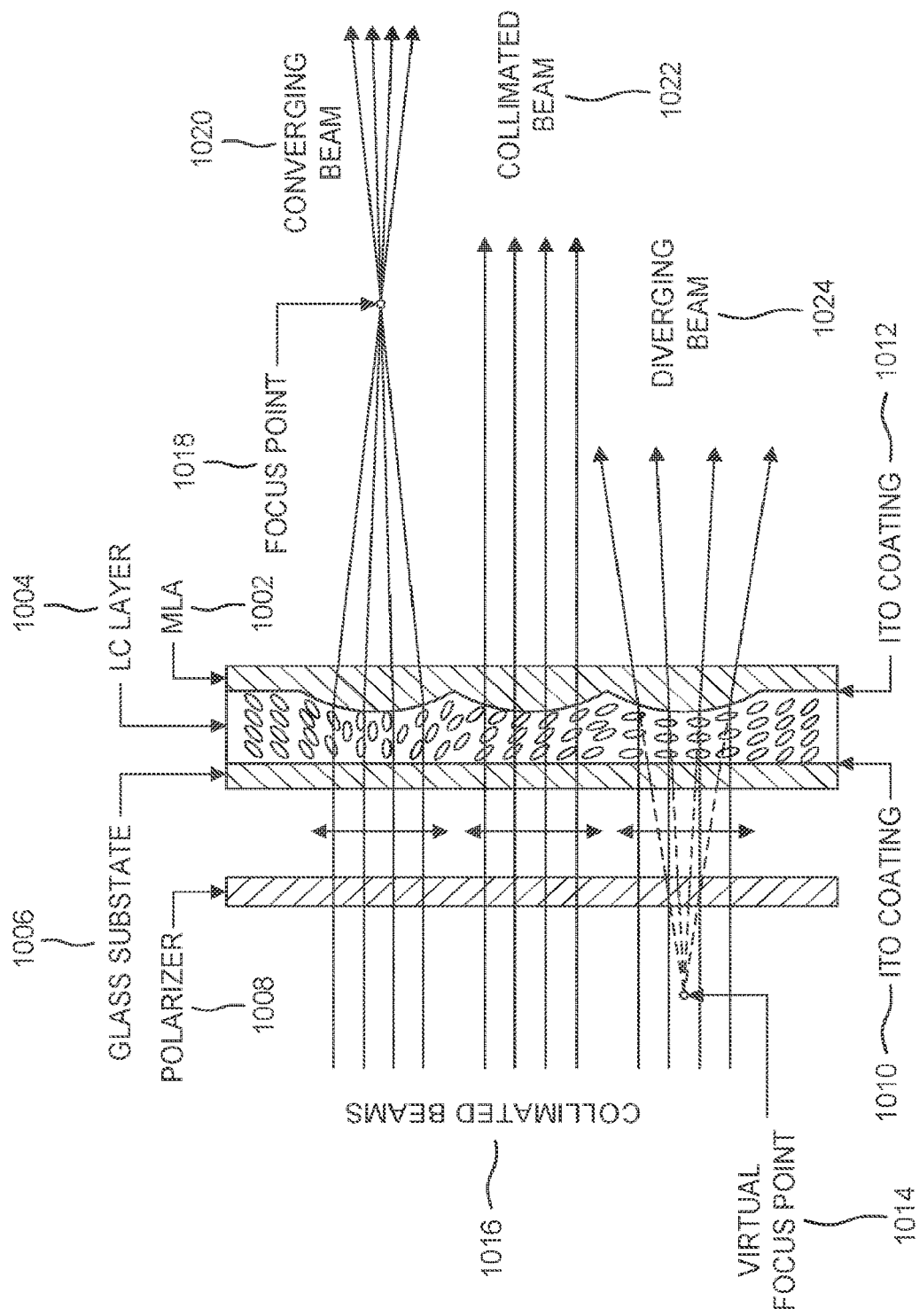
FIG. 10 is an illustration showing an example variable focal length microlens array according to some embodiments.

FIG. 10 is an illustration showing an example variable focal length microlens array according to some embodiments. FIG. 10 shows the structure and functioning of a varifocal microlenses. There is a LC layer 1004 located between a glass substrate 1006 and a microlens array (MLA) 1002. Both bounding material interfaces have transparent conductive indium tin oxide (ITO) pattern coatings 1010, 1012, which act as anode and cathode for the LC layer active adjustment. If voltage is applied, an electric field turns the LC molecules, and the material refractive index changes to a linear polarization direction. For some embodiments, the amount of index change is in the order of ~0.2 with nematic liquid crystal materials and with low voltages in the range of 0-12 V. For some embodiments, the LC material refractive index (~1.5) is set to be close to the refractive index of the MLA material.

FIG. 10 shows three example beams of collimated light 1016 that first hit a polarizer component 1008, which transmits only linearly-polarized light. Beams may be made to focus and become a converging beam 1020; to diverge as a diverging beam 1024; or to remain unchanged as a collimated beam 1022 by adjusting the LC layer refractive index with an applied voltage. If the LC index is adjusted to match the MLA index, the interface disappears such that beam collimation is not affected. If the index is adjusted to be below or above the MLA index value, the beam will refract, and a real focus point 1018 or virtual focus point 1014 will be created in front or behind the structure.

When a voltage is applied to LC material, the crystals align to a specific direction dictated by the created electric field over the LC material layer. Without voltage the crystals may be in either a random orientation or some other ordered orientation made by preparing the material with different techniques. Voltage levels affect the amount of orientation and the voltage level may be used for tuning the material optical properties. If electrodes on both sides of the LC material layer are patterned in such a way that local electric fields may be adjusted, the local crystal orientations in otherwise homogenous LC layer may be adjusted. With suitable electrode designs one may create, e.g., the LC microlenses by adjusting the refractive index with gradual adjustment of the electric field over some area on the LC layer.

For some embodiments, an angle of diffusion may be altered if a viewer's eyes are being tracked. For some embodiments, if the angle of diffusion is altered, light emission intensity of µLEDs, for example, may be increased in order to compensate for the larger spread of light and to keep the same irradiance on a certain point in the viewing window. For some embodiments, the number of light sources, for example, may be increased or decreased if the angle of diffusion is altered.

FIG. 10 is a schematic presentation of focus tunable microlenses based on LC material. The basic idea is that an electric field is locally adjusted over three different microlens shapes fixed in the other bounding layer around an LC material layer. In the topmost case, the LC refractive index is tuned (by orienting the liquid crystals) to be smaller than the index of the lens material and a collimated beam is focused to a certain point. In the middle case pictured, the LC material has the same refractive index as the microlens, making the optical interface disappear and light is transmitted without changes to the collimation. In the bottom case presented, the LC material refractive index is tuned to a higher value than the lens material, effectively making a negative focal length lens that makes the incoming beam to diverge. The journal article by L. Commander, S. Day, & D. Selviah; *Variable Focal Length Microlenses,* 177:1-6 OPTICS COMMUNICATIONS 157-170 (2000) discusses this idea in more detail.

Journal articles H. Chen, et al., *A Low Voltage Liquid Crystal Phase Grating with Switchable Diffraction Angles,* 7 NATURE SCIENTIFIC REPORTS, Article No. 39923 (2017) ("Chen") and Y. Ma, et al., *Fast Switchable Ferroelectric Liquid Crystal Gratings with Two Electro-Optical Modes,* 6:3 AIP ADVANCES, Article No. 035207, (2016) describe using liquid crystal materials in switchable or adjustable diffraction gratings. Liquid crystal materials also may be used in diffusers. The switchable gratings are used in splitting light beams into multiple child beams that propagate to different directions according to the grating equation, where the main optical parameter is the grating period. This parameter may be affected by the LC grating electrode design that needs to be fine enough to induce required high density variating refractive index pattern to the LC material. Tunable diffusers are used for scattering light and typically they may be electrically switched between transparent and translucent states. These components are based on electrical tuning of LC material that has been modified to perform some particular change under applied electric field.

Journal articles A. Moheghi, et al., *PSCT for Switchable Transparent Liquid Crystal Displays,* 46:1 SID 2015 DIGEST (2015) and J. Ma, L. Shi, & D-K. Yang, *Bistable Polymer Stabilized Cholesteric Texture Light Shutter,* 3:2 APPLIED PHYSICS EXPRESS (2010) describe LC diffusers that are based on polymer stabilized cholesteric texture (PSCT) approach. In these components, the transparent/scattering material has been prepared in such a way that the texture includes liquid crystal material. According to journal articles R. Yamaguchi, et al, *Normal and Reverse Mode Light Scattering Properties in Nematic Liquid Crystal Cell Using Polymer Stabilized Effect;* 28:3 J. PHOTOPOLYMER SCI. AND TECH. 319-23 (2015) and G. Nabil Hassanein, *Optical Tuning of Polymer Stabilized Liquid Crystals Refractive Index;* 5(3): 3 J. Lasers, Optics & Photonics (2018), another tunable diffuser type uses polymer stabilized liquid crystals (PSLC) that have micrometer-sized LC droplets embedded in optically transparent polymer matrix with matched refractive index. If an electric field is applied to the PSLC material, the refractive index of the aligned droplets are changed, and the interfaces between the droplets and surrounding polymer start to refract light. This means that when the tunable diffuser is activated, light is scattered in all directions from the small LC particles embedded inside the material. For such material-based scattering, the light diffusing effect tends to be large, but transmission through the component is lowered because a large portion of the light is scattered back, and there tends to be no control over the scattered light angular distribution.

Some hybrid LC diffuser optical structures have been developed. PCT Patent Application No. WO2016140851 is understood to describe combining a switchable LC diffuser layer with a light diffusing surface structure. The diffusing surface is either a separately manufactured foil possibly laminated to the tunable part or the diffusing surface may be an integrated structure directly patterned to the outer surface of the LC diffuser. The diffusion property of the static diffusion surface is increased or decreased by switching on and off the tunable diffuser. U.S. Patent Application No. 2010/0079584, now U.S. Pat. No. 9,462,261 is understood to describe a hybrid structure where a combination of lenticular microlenses and LC diffuser layer is used in switching an autostereoscopic display between 2D and 3D display modes. This switching is done by diffusing the angular distribution of the multiview display by switching on the LC diffuser. PCT Patent Application No. WO2005011292 is also understood to describe switching between 2D and 3D display modes. Electrically tunable LC diffusers that may be switched between transparent and translucent states have been widely utilized, e.g., in volumetric displays based on sequential image projection to multiple switchable screens as understood to be described in PCT Application Nos. WO02059691 and WO2017055894. Such components scatter light uniformly to all directions. This feature may be useful when the components are used in volumetric displays such that the voxels are visible from all directions. However, such volumetric 3D images are not able to create occlusion properly, making them look translucent and somewhat unnatural.

There are several methods of making light diffusing components. Light scattering structures may be based on, e.g., material internal scattering, diffraction, or surface scattering. Diffraction and surface scattering methods may be used to create surface structures that produce a specific angular light distribution. For many material-based diffusion methods, the structures are more difficult to manufacture because the light scattering particles are suspended in some medium or the material has a fixed internal structure that diffuses light.

U.S. Patent Application No. 2015/0056561, now U.S. Pat. No. 9,568,885, is understood to describe a surface scattering-based diffuser. Their light shaping diffusers (LSDs) use surface relief structures that are replicated from a holographically-recorded master. These pseudo-random and non-periodic structures may diffuse light to some very specific angular distributions. These diffusion patterns may be designed by making the microstructures with specific slope distributions that manipulate incoming light and change its direction on a very small scale. Such structures may be used for accurate diffusion angular control and efficient light transmission through the component because light is not wasted due to backscattering.

For some embodiments, an optical image display structure may include a tunable light diffusion component. Some embodiments of a method may include diffusing light with a tunable light diffusion component. For some embodiments, the optical image display structure may include a 3D multiview display device. Some embodiments of the method may include displaying multiview 3D images with the 3D multiview display device. For some embodiments, the tunable light diffusion component may be a surface effect liquid crystal (SELC) diffuser. The diffuser may be an angularly-selective diffusing component, which may be activated without mechanical movement. An SELC diffuser scatters light from an optical interface surface, which may be between, e.g., a birefringent material and a substrate material that has very small-scale surface features. An SELC diffuser's liquid crystal material is used for altering the light polarization direction or material refractive index, which cause a light beam to either transmit or scatter at the designed interface surface. Some material-based diffusers (such as polymer dispersed liquid crystals (PDLC) and polymer stabilized cholesteric textures (PSCT)) may produce the same light distribution in both the vertical and horizontal directions due to material internal scattering. Use of optical interface surface scattering may allow higher transmission efficiencies and enable the use of components in 3D displays that may tune scattering properties selectively for a particular light propagation direction.

The SELC diffuser may be used in many different types of 3D displays and may improve functionality and/or performance over other structures. In addition to 3D displays, SELC diffusers may be used, for example, to control illumination patterns created with an LED lamp. The SELC diffuser may be adjusted electronically to diffuse light evenly over a large area or to project a spotlight. SELC diffusers may be used, e.g., in security/privacy glass windows that may be switched between transparent mode (to allow light to pass through the glass windows) and translucent mode (to block light from passing through the glass windows). Further examples of uses for SELC diffusers include optical measurement devices that use specific adjustable illumination patterns, photographic effects that may create an artificial bokeh-effect over the lens aperture, and optical communication modules in which the tunable diffusers may be used as switches between optical channels.

For some embodiments, light is generated on a layer containing individually-addressable pixels which may form, e.g., a μLED matrix. A microlens array (MLA) may be used to collimate the emitted light into multiple beams that are used to create multiple views in either the horizontal or vertical direction. An SELC diffuser located between the light emitting devices and the MLA may be used for selective diffusion of light beams in the two orthogonal directions to increase the image FOV and enable use of the display structure in a mobile device, which may be handheld. A polarizer sheet located between the emitters and the diffuser may be used to linearly polarize the emitted light.

For some embodiments, the polarizer may be laminated as a foil, e.g., on the MLA or on the first substrate of the SELC diffuser, making the structure more compact and robust. The cross-shaped pattern of sources and the use of microlenses instead of lenticular sheets enables rotation of a multiview image direction. Such a feature may be used by mobile devices if the display mode is changed from portrait to landscape.

The electrically controlled diffuser component may be used for light directional modification with typically thin optical layers without moving parts. Use of optical interface surface scattering enables use of components that may tune scattering properties selectively for different light propagation directions unlike many material-based diffusers that produce the same light distribution, e.g., to both horizontal and vertical directions.

For some embodiments, diffusing surface shape features of the diffuser may be made as uniform structures over the whole interface surface or may be arranged as different array patterns with specific local properties. See FIGS. 10 and 11A for examples of such diffuser patterns. If a uniform distribution is used over the whole surface, the electrode design may be straight-forward, and uniform optical functionality may be obtained over the whole optical aperture of the diffuser.

An SELC diffuser may be used as a tunable diffuser component with several different types of 3D displays, such as the examples understood to be described in U.S. Pat. No. 9,462,261 and PCT Patent Applications Nos. WO2005011292 and WO2017055894. SELC diffusers may be used to remove "picket-fence" effects in 2D displays by fading out pixel spacing, which may be used with a head mounted VR/AR/MR device. The ability to tune diffusion enables adjusting the fine balance between image uniformity and resolution. Use of an SELC diffuser enables use of a multiview 3D display without super accurate alignment of two optical layers because the SELC diffuser may be used to make small alignment adjustments. For some embodiments, an active diffuser control device may perform an on/off function to activate diffusers if the display mode changes, which may have a very low switching speed requirement. If different color light emitters in the display are arranged with a corresponding layout, the SELC diffuser may be able to diffuse together different color emissions at the viewing window, thereby reducing (or eliminating for some embodiments) optical- or rendering-based methods for color combination. An SELC diffuser may be used with a mobile device to switch between portrait and landscape modes. Such a feature may be used to reduce image processing (which may include image rendering) and associated components, such as light emitting components. As the number of emitter components is lower, there may be less electrical contacts to the small light emitting μLEDs and less control electronics may be used. Furthermore, the cross-shaped source pattern may allow more space for electrical wiring and controller components on a source module sub-assembly.

For some embodiments, a Surface Effect Liquid Crystal (SELC) diffuser may be used as an electrically-tunable optical component that is capable of angularly-selective light diffusion. For some embodiments, light may be scattered by an optical interface surface located between a birefringent material and a substrate material that has very small scale surface features. For some embodiments, liquid crystal material may be used for altering the light polarization direction and/or material refractive index, which may cause a light beam to transmit or scatter at the interface. Use of optical interface surface scattering may allow higher transmission efficiencies and enable the use of components in 3D displays that may tune scattering properties selectively for different light propagation directions. Some material-based diffusers (such as polymer dispersed liquid crystals (PDLC) and polymer stabilized cholesteric textures (PSCT)) may produce the same light distribution in both the vertical and horizontal directions due to material internal scattering.

Figure 11A:
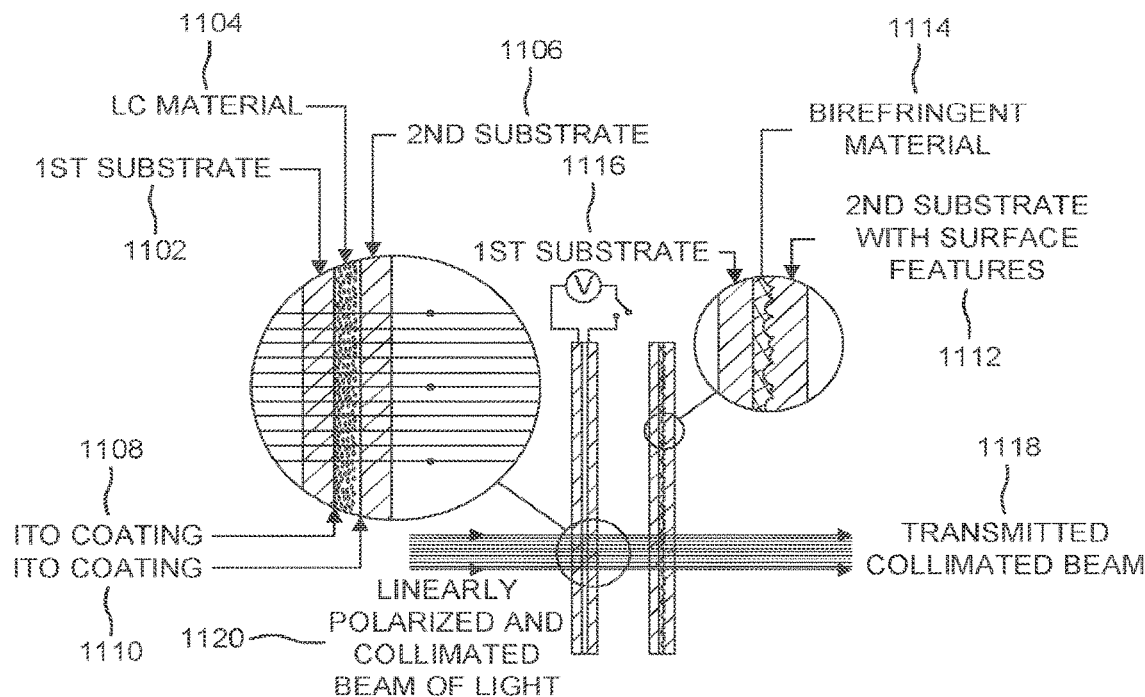
FIG. 11A is an illustration showing an example two-component SELC diffuser in a light beam transmission state according to some embodiments.
Figure 11B:
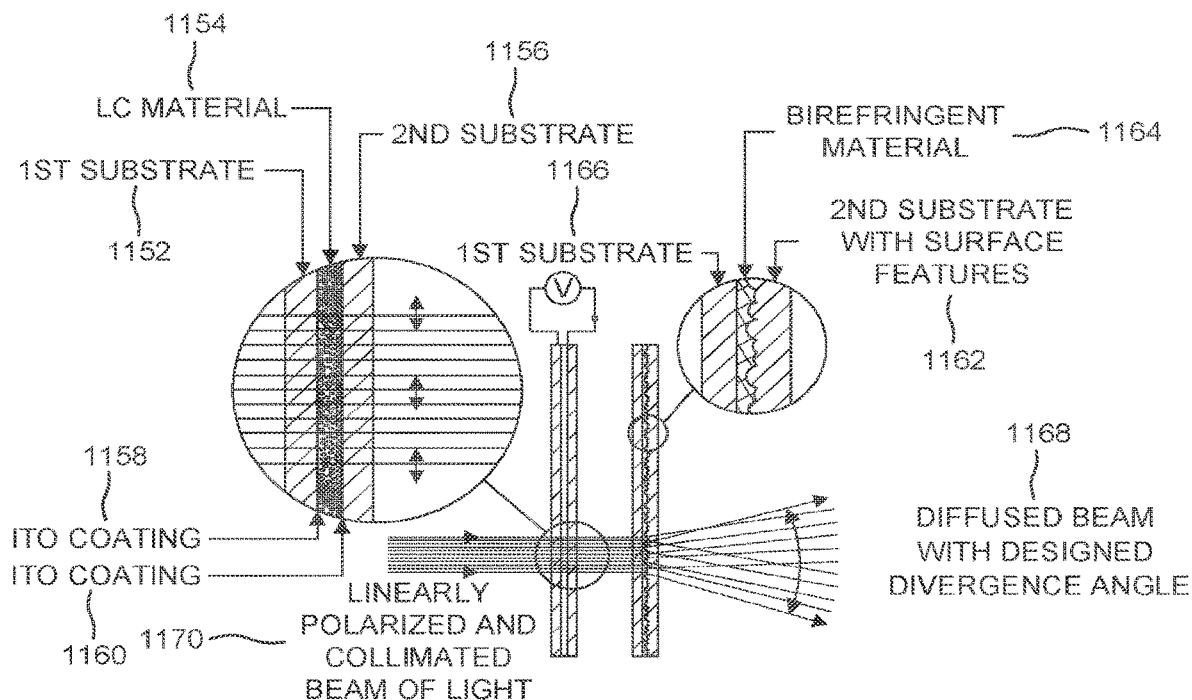
FIG. 11B is an illustration showing an example two-component SELC diffuser in a light beam diffusion state according to some embodiments.

FIG. 11A is an illustration showing an example two-component SELC diffuser in a light beam transmission state according to some embodiments. FIG. 11B is an illustration showing an example two-component SELC diffuser in a light beam diffusion state according to some embodiments.

FIGS. 11A and 11B show an example electrically tunable optical component called a surface effect liquid crystal (SELC) diffuser structure and its functionality. The example structure has two optical sub-components, one active and one passive. The active sub-component may be a thin layer of LC material 1104, 1154 used to selectively rotate polarization of light located between two substrates 1102, 1106, 1152, 1156 that may be, e.g., a glass or polymer foil. Both substrates 1102, 1106, 1152, 1156 may have transparent indium-tin-oxide (ITO) coatings 1108, 1110, 1158, 1160 and electrodes. The first sub-component may be used as a tunable retarder for rotating the direction of polarization of linearly polarized light 1120, 1170 by 90°, which may be enabled with a voltage applied to the electrodes, causing an electric field over the LC material 1104, 1154. Polarization rotation may be activated by switching the voltage on or off. A second passive sub-component may have two or more materials, one of which may be highly birefringent 1114, 1164, and the materials may be connected to each other with a common optical interface surface. The birefringent material's internal structure orientation and refractive indices may be matched to the non-birefringent material 1112, 1162 in such a way that in one incident light polarization direction, the refractive indices are the same and a collimated beam 1118 is transmitted, and in the orthogonal direction, there is a difference that causes light refraction and generation of a diffused beam with a designed divergence angle 1168. This interface surface may have a surface microstructure with a designed slope distribution. The structure may be one- or two-directional with a specific rotational orientation with respect to the birefringent material's two optical axes. For some embodiments, the second passive sub-component may be composed of a birefringent/non-birefringent material interface with designed surface features used to selectively transmit or diffuse a light beam based on polarization. For some embodiments, the surface may be patterned into sub-regions (not shown).

As the passive sub-component birefringent material refractive index may be the same as the non-birefringent material index at some specific light polarization direction, the interface between these two materials may be transparent and a light beam with correct linear polarization orientation may be transmitted without scattering. However, if the beam polarization direction is rotated, the birefringent material refractive index may be different, and an index difference between the two materials may appear over the interface surface. For some embodiments, the surface microstructure may become visible, and the light may be refracted from the small surface features. In the tunable SELC diffuser structure shown in FIG. 11A, the linearly polarized beam is transmitted through the active component without alteration and the beam hits the second passive component structured interface surface in the direction where there is no refractive index difference between the birefringent material and second substrate. In this case, the beam is transmitted. FIG. 11B shows a case where voltage is applied to the active component rotating the beam polarization direction by 90°. In this second case the rotated beam experiences a different refractive index inside the birefringent material of the passive sub-component and the surface structured interface becomes visible making the beam to scatter.

For some embodiments, an example device may include a diffuser configured to change a direction of diffusion of a light beam upon application of a voltage to the diffuser. For some embodiments, the example device may further include a light field display structure configured to generate one or more collimated light beams incident upon the diffuser. For some embodiments, a method of using the example device may include changing a direction of diffusion of a light beam upon application of a voltage to a diffuser.

For some embodiments, a further example device may include a liquid crystal grating configured to diffuse a light beam into two or more diffused light beams. For some embodiments, a method of using the further example device may include diffusing a light beam into two or more diffused light beams upon application of a voltage to a liquid crystal grating.

For some embodiments, a multi-view three-dimensional optical display may include a selective directional diffuser configured to be selectively activated without mechanical movement, wherein the angularly-selective diffuser comprises at least one surface effect liquid crystal (SELC) diffuser configured to receive and selectively directionally diffuse one or more linearly polarized and collimated beams of light in response to an applied electric field.

Some embodiments of a light field (LF) display device may include a SELC diffuser that includes a liquid crystal (LC) material layer sandwiched between a first substrate and a second substrate such that at least one of the LC material layer and the first and second substrates is/are configured to perform an angularly-selective diffusion of the light, such as the examples shown in FIGS. 11A and 11B. For some embodiments, an optical element may include: a first layer comprising an electrically adjustable liquid crystal capable of altering a polarization state of light passing through the first layer depending upon the state of electrical adjustment; and a second layer comprising a birefringent material in a layer parallel to the first layer including surface structures designed to give alternate diffusion characteristics to beams, such that the second layer is configured to scatter, according to a first angular pattern, light incident on the second layer when the polarization state of the light is in a first polarization state, and such that the second layer is configured to scatter, according to a second angular pattern, light incident on the second layer when the polarization state of the light is in a second polarization state.

For some embodiments, an LF display device may execute a process including: emitting a light beam from one or more light emitting devices; polarizing the light beam into a linearly polarized light beam; passing the light beam through a liquid crystal (LC) material; passing the light beam through a birefringent material; and applying a voltage to the LC material to alter a light polarization configuration state of the LC material, such that altering the light polarization configuration state switches from a first polarization state to a second polarization state; and such that the first polarization state causes the light beam to diffuse in a first direction upon passing through the birefringent material and the second polarization state causes the light beam to diffuse in a second direction upon passing through the birefringent material. For some embodiments, the SELC diffuser may include a liquid crystal (LC) material layer sandwiched between a first substrate and a second substrate such that the LC material layer is configured, in conjunction with the first and second substrates, to cause, responsive to an applied voltage, an angularly-selective diffusion of light. An example of such an operation is shown in FIGS. 11A and 11B.

Figure 12A:
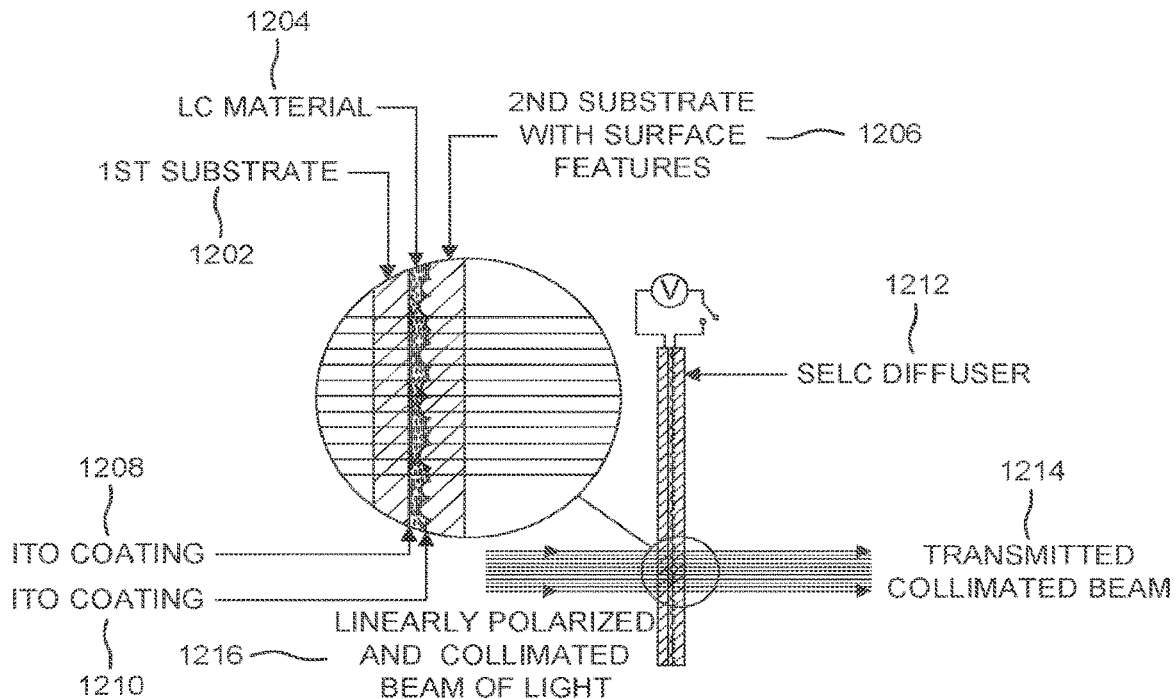
FIG. 12A is an illustration showing an example single-component SELC diffuser in a light beam transmission state according to some embodiments.
Figure 12B:
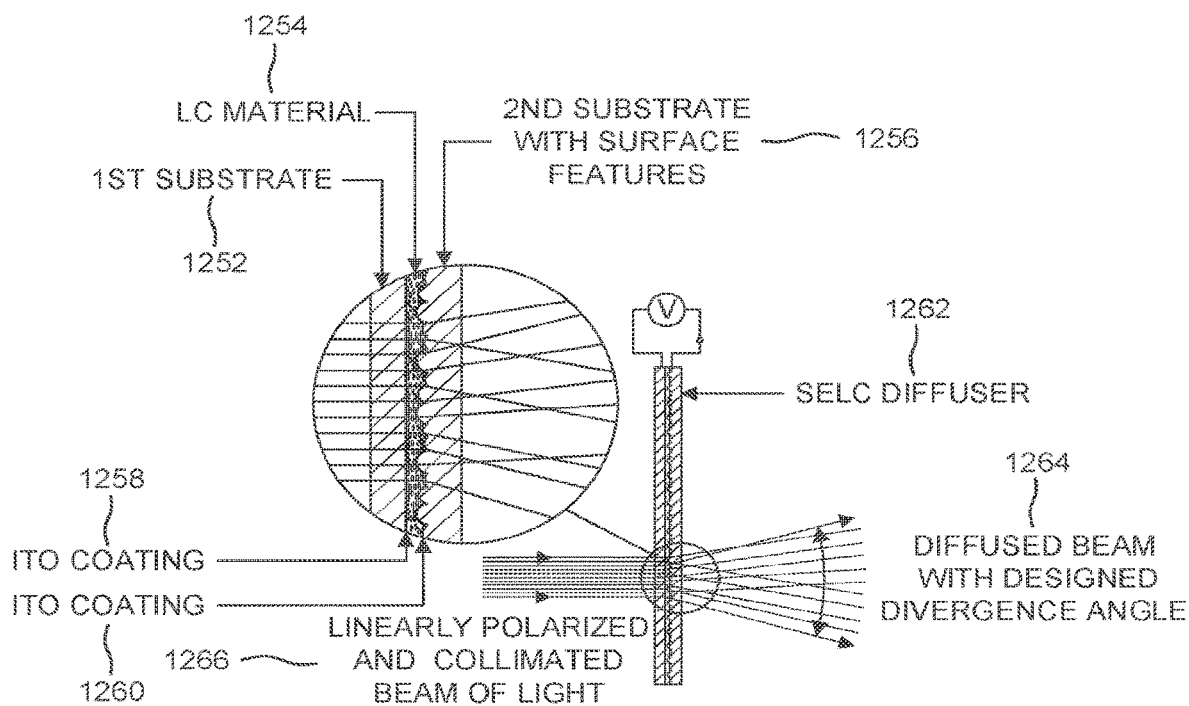
FIG. 12B is an illustration showing an example single-component SELC diffuser in a light beam diffusion state according to some embodiments.

FIG. 12A is an illustration showing an example single-component SELC diffuser in a light beam transmission state according to some embodiments. FIG. 12B is an illustration showing an example single-component SELC diffuser in a light beam diffusion state according to some embodiments. FIGS. 12A and 12B show an example optical structure and functionality of a SELC diffuser 1212, 1262. In this structure, one active component is used for switching the light diffusion on or off, thereby causing a linearly polarized and collimated beam of light 1266, 1216 to become a diffused beam with a designed divergence angle 1264 or a transmitted collimated beam 1214, respectively. For some embodiments, a layer of liquid crystal material 1204, 1254 may be located between a thin glass substrate 1202, 1252 and a second substrate 1206, 1256 that has small optical surface features. The LC material 1204, 1254 refractive index may be adjusted to the second substrate material index. For example, nematic liquid crystals may have a refractive index of ~1.5, which is close to the refractive index of 1.49 of polymethyl methacrylate (PMMA) optical polymer material. Transparent ITO electrodes may be coated with an ITO coating 1208, 1210, 1258, 1260 on both sides of the LC material 1204, 1254, such as is shown in FIGS. 12A and 12B. For some embodiments, the ITO electrodes may be large because the ITO electrodes may be used to uniformly tune LC material's refractive index over the whole surface area. For some embodiments, the electrodes may be made in a fine pattern that supports local modulation of the material refractive index over some parts of the surface. These patterns may be, e.g., asymmetric hole-patterned electrodes that create non-uniform electric fields that modify the material refractive index over a non-uniform LC material thickness. Electrodes, for example, may be patterned on top of the microscopic optical shapes or may be applied separately on the flat side of a thin substrate layer (e.g., a polymer foil) used in optical shape manufacturing. Manufacturing of the electrodes and optical shapes may be made with roll-to-roll processing, which may enable covering large surface areas and achieving lower costs in high volumes.

In the SELC diffuser 1262 component structure example shown in FIG. 12B, the surface microstructure between LC material 1254 and second substrate 1256 is one directional, which means that the shapes form linear grooves in one direction. An electric field over the LC layer may be used for tuning the refractive index of the LC material. If the material index is the same as the refractive index of the second substrate, light may be transmitted. If a voltage is applied and the LC material's refractive index is tuned to a higher value, the structured surface may become visible, and the light may be scattered in one direction. As a result, by applying a voltage over the LC material, a well collimated beam may be modified into a beam that is diffused in one direction but remains collimated in the other direction, such as is shown in FIG. 12B.

Figure 13A:
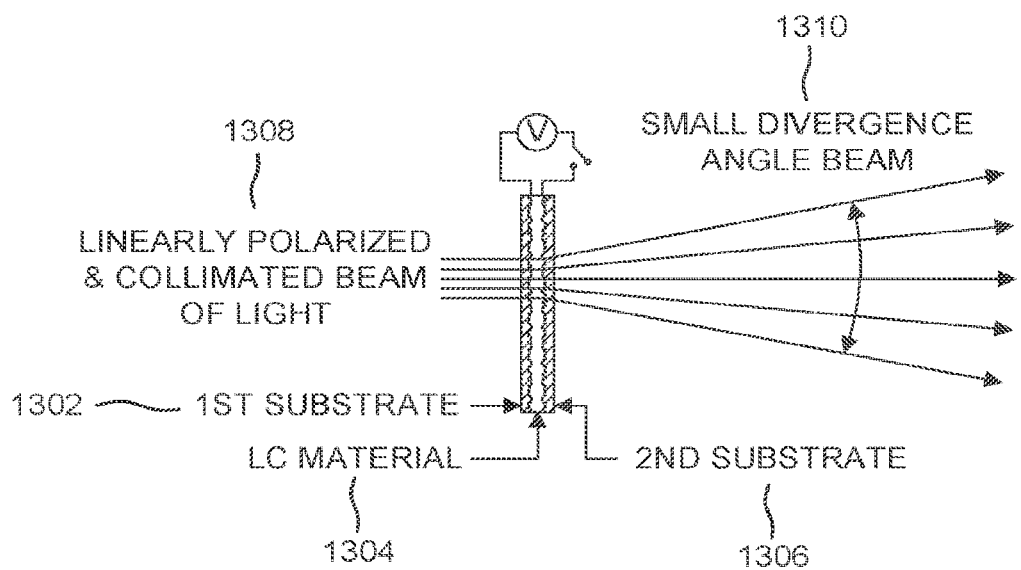
FIG. 13A is an illustration showing an example SELC diffuser with a smaller divergence angle according to some embodiments.
Figure 13B:
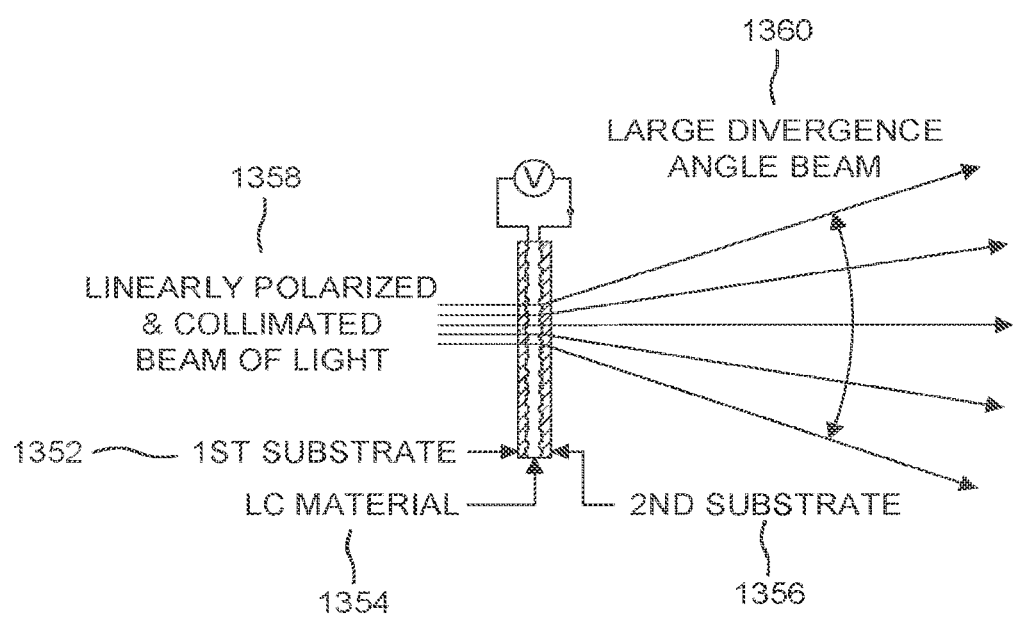
FIG. 13B is an illustration showing an example SELC diffuser with a larger divergence angle according to some embodiments.

FIG. 13A is an illustration showing an example SELC diffuser with a smaller divergence angle according to some embodiments. FIG. 13B is an illustration showing an example SELC diffuser with a larger divergence angle according to some embodiments. In FIG. 13A, a voltage is not applied to the LC material 1304 sandwiched between first 1302 and second 1306 substrates within the diffuser, and a small divergence angle beam 1310 is created from a linearly polarized and collimated beam of light 1308. In FIG. 13B, a voltage is applied to the LC material 1354 sandwiched between first 1352 and second 1356 substrates within the diffuser, and a large divergence angle beam 1360 is created from a linearly polarized and collimated beam of light 1358.

For some embodiments, a device may include a diffuser configured to change an angle of divergence of a light beam upon application of voltage to the diffuser. For some embodiments, a method executed by the device may include changing an angle of divergence of a light beam upon application of a voltage to a diffuser.

Figure 14B:
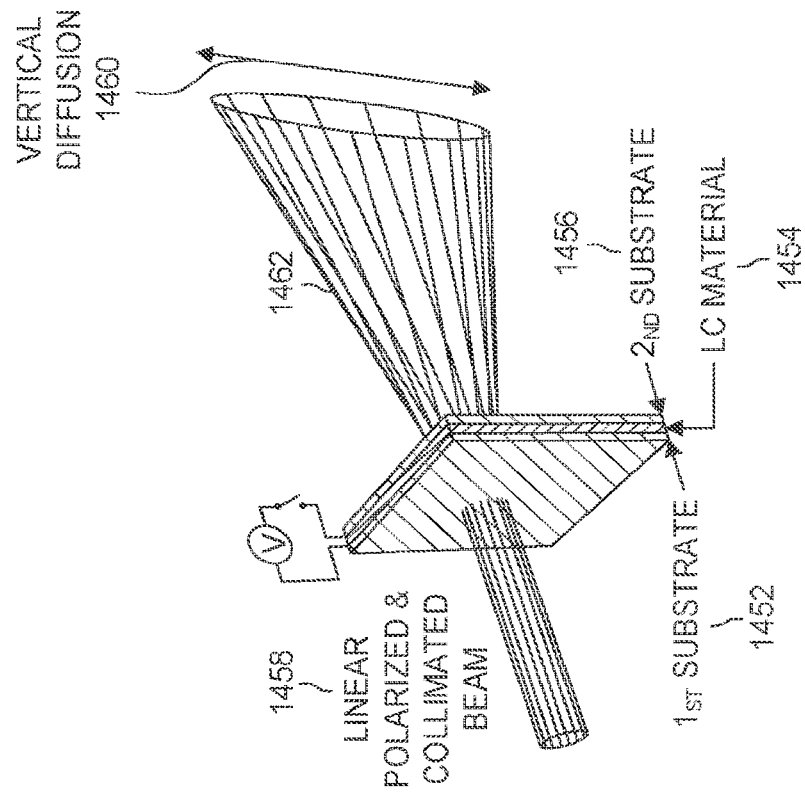
FIG. 14B is an illustration showing an example SELC diffuser with vertical diffusion enabled according to some embodiments.
Figure 14A:
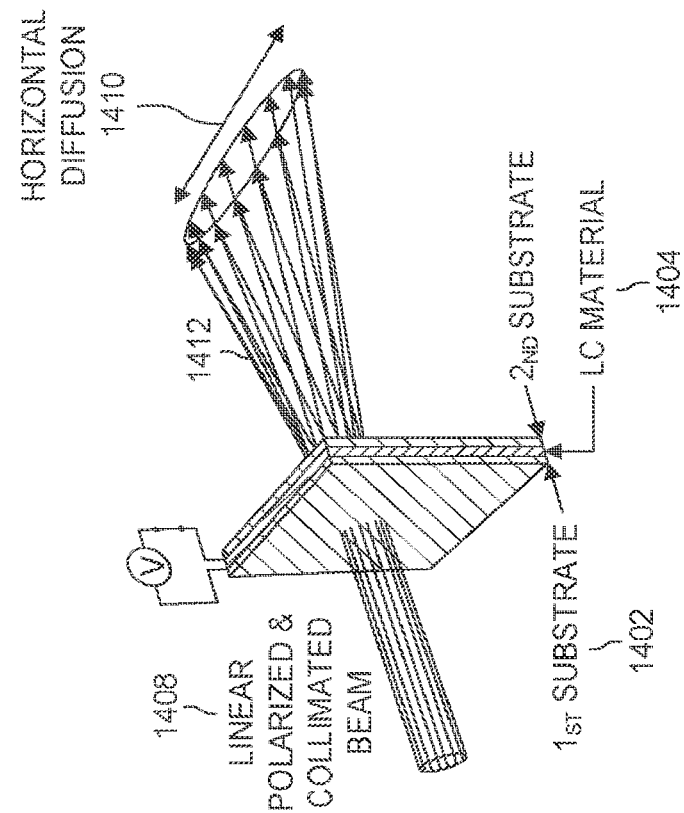
FIG. 14A is an illustration showing an example SELC diffuser with horizontal diffusion enabled according to some embodiments.

FIG. 14A is an illustration showing an example SELC diffuser with horizontal diffusion enabled according to some embodiments. FIG. 14B is an illustration showing an example SELC diffuser with vertical diffusion enabled according to some embodiments. For some embodiments, a single SELC diffuser component may have more than one light diffusing surface structure. In one example component structure, liquid crystal material 1404, 1454 is located between two different material substrates 1402, 1406, 1452, 1456 that have slightly different refractive indices that both may be reached with the tuning range of the LC material refractive index. For example, if an LC material refractive index may be tuned over the range of 0.02, optical polymer materials (e.g., Zeonex 330R and Zeonex E48R) may be used as the two substrates 1402, 1406, 1452, 1456 because they have refractive indexes of 1.51 and 1.53 respectively at 589 nm light wavelength. With such materials, the first substrate interface is transparent if the LC material index is tuned to a value of 1.51, and the second substrate interface has a refractive index difference of 0.02. The situation is reversed if the LC refractive index is tuned to a value of 1.53 by applying a voltage to the electrodes patterned on the two substrates. Such a diffuser with two different microstructures may be used as an angularly-selective tunable diffuser. If the first interface has a different slope distribution than the second, some embodiments, e.g., may make the diffused beam divergence smaller or larger by applying voltage to the component, as shown in FIGS. 13A and 13B. FIGS. 14A and 14B show, for some embodiments, two orthogonal linear microstructures used for switching the direction of diffusion of a linear polarized and collimated beam 1408, 1458 from horizontal diffusion 1410 of light rays 1412 to vertical diffusion 1460 of light rays 1462 by applying a voltage to the LC material.

Some embodiments of an LF display structure may include two controllable diffusers, such that one or more of the diffusers is configured to be selectively activated without mechanical movement. One or more of the diffusers may be configured to diffuse light in response to an applied electric field. For some embodiments of the LF display with two layers of diffusers, the second layer may be configured to diffuse light in a horizontal direction when the polarization state of the light is in a first polarization state, and the second layer may be configured to diffuse in a vertical direction when the polarization state of the light is in the second polarization state. FIGS. 14A and 14B show an example of switching from a first polarization state in FIG. 14A to a second polarization state in FIG. 14B. For some embodiments, an LF display structure may include a plurality of light emitting elements and collimating microlenses capable of producing collimated beams of light and a directionally controllable diffuser capable of switching between a first state wherein light is diffused in a first direction and a second state wherein light is diffused in a second direction.

The light scattering optical surface features may be manufactured, e.g., as a polycarbonate sheet with optical shapes made from UV-curable material in roll-to-roll process or as a foil with embossed structures. Surface shapes used may be flat, tilted facets (prisms) or continuous curved surfaces with different curvatures in two directions. If one-directional surface features similar to, e.g., lenticular microlenses are used, the component may be used for adjusting the light diffusion properties in two orthogonal directions separately as shown in the example of FIGS. 11A and 11B. These structures also may be manufactured by very high volume extrusion process. Individual optical feature sizes and pattern fill-factors may have an effect on the achievable beam divergence modulation and the amount of image contrast-reducing stray light that is introduced into the system. This means that high quality optics manufacturing methods may be used for producing the master, which is replicated for high volume production.

One manufacturing method for making diffusing surface microstructures is composite holographic diffuser replication. Light shaping diffuser (LSD) structures may have fine-tuned surface slope distributions that may modify collimated beams into angular distributions that make, e.g., linear, elliptic, or rectangular illumination patterns. Beam intensity profiles may be modified, e.g., into "top-hat" patterns for higher projected single beam spatial uniformity or into Gaussian beams for higher combined beam bundle illumination uniformity.

For some embodiments, diffusing surface shape features of the diffuser may be made as uniform structures over the whole interface surface or may be arranged as different array patterns with specific local properties. If a uniform distribution is used over the whole surface, the electrode design may be straight-forward, and uniform optical functionality may be obtained over the whole optical aperture of the diffuser. If local variations are introduced to the microstructure and/or to the electrode design, variations to light modulation may be made inside the component optical aperture. This feature may be made, e.g., by creating an interlaced matrix of tunable diffuser squares that modify incident beam divergence differently in two orthogonal directions. Such a device may enable separate control over light beam sections, enabling tuning of a single beam internal structure together with other possible optical features arranged into a mosaic pattern.

SELC diffusers are able to selectively tune light beam divergence in different angular directions. Many material-based scattering diffusers modify beam divergence in all directions at the same time. Electrically-controlled angularly selective diffusion may be used with 3D displays that use fine control over multiple beams. Integral imaging based multiview or light field displays have spatial and angular domains such that multiple interlaced beams may be used together to create multiple different images. To fulfill the field-of-view and image uniformity requirements with an optical display structure, light diffusing surfaces may be used. A tunable diffuser structure may be used, e.g., to improve single image uniformity, to calibrate image properties for different viewing distances, to create volumetric images, to make the transition between neighboring views smoother, to rotate the display of a mobile device, or to obtain image parallax in two directions.

An LF display, e.g., implementing an SELC diffuser, may be used in many different types of displays, such as, e.g., an HMD, a volumetric 3D display, and screen-based 3D displays. In some embodiments, certain examples of LF display might be considered or described as a holographic display. The SELC diffuser may be used in many different types of 3D displays and may improve functionality and/or performance over other structures. In addition to 3D displays, SELC diffusers may be used, for example, to control illumination patterns created with an LED lamp. The SELC diffuser may be adjusted electronically to diffuse light evenly over a large area or to project a spotlight. The spotlight shape may be adjusted to be a circle or an ellipse in two different directions, and this adjustment may be done without any mechanical movement. SELC diffusers may be used, e.g., in security/privacy glass windows that may be switched between transparent mode (to allow light to pass through the glass windows) and translucent mode (to block light from passing through the glass windows). Further examples of uses for SELC diffusers include optical measurement devices that use specific adjustable illumination patterns, photographic effects that may create an artificial bokeh-effect over the lens aperture, and optical communication modules in which the tunable diffusers may be used as switches between optical channels.

For some embodiments, a light beam may be emitted from a light emitting device, and the horizontal diffusion spread of the light beam may be altered by altering a horizontal light diffusion parameter (or similarly, a vertical light diffusion parameter), such as the horizontal (or vertical) size of an aperture, the full-width-half-measure (FWHM) value of a light scatter distribution pattern in angular coordinates, or the voltage value used by control electronics to achieve a particular FWHM scatter value. For some embodiments, the full-width-half-measure (FWHM) value of a light scatter distribution pattern in angular coordinates may describe an optical functionality of a component. For some embodiments, the voltage value used by control electronics to achieve a particular FWHM scatter value may describe a device system level control value.

For some embodiments, the horizontal light diffusion parameter may include a setting for whether or not to apply a voltage to an LC material that is part of a diffuser, such as the example shown in FIGS. 13A and 13B. For some embodiments, the horizontal diffusion parameter may set a control voltage applied to a horizontal SELC diffuser and LC grating layer, for example, shown in FIG. 21, or the horizontal diffusion parameter may set the target amount of diffusion in the horizontal direction to be produced by the horizontal SELC diffuser and LC grating layer. For some embodiments, the horizontal diffusion parameter may indicate the amount of voltage to apply to a horizontal SELC diffuser and LC grating layer.

For some embodiments, a light beam may be emitted from a light emitting device, and the vertical diffusion spread of the light beam may be altered by altering a vertical light diffusion parameter, such as the vertical size of an aperture. For some embodiments, the vertical light diffusion parameter may include a setting for whether or not to apply a voltage to an LC material that is part of a diffuser, such as the example shown in FIGS. 13A and 13B. For some embodiments, the vertical diffusion parameter may set a control voltage applied to a vertical SELC diffuser and LC grating layer, for example, shown in FIG. 21, or the vertical diffusion parameter may set the target amount of diffusion in the vertical direction to be produced by the vertical SELC diffuser and LC grating layer. For some embodiments, the vertical diffusion parameter may indicate the amount of voltage to apply to a vertical SELC diffuser and LC grating layer.

For some embodiments, a diffuser may be configured to switch between diffusing in a horizontal direction to diffusing in a vertical direction light emitted by a light emitting device. For some embodiments, a diffuser may be configured to switch between diffusing in a vertical direction to diffusing in a horizontal direction light emitted by a light emitting device.

For some embodiments, an example device may include a diffuser configured to change a shape of a light beam upon application of a voltage to the diffuser. For some embodiments, a method executed by the example device may include changing a shape of a light beam upon application of a voltage to a diffuser. For some embodiments, an example device may include a diffuser configured to change an orientation of a light beam upon application of voltage to the diffuser. For some embodiments, a method executed by the example device may include changing an orientation of a light beam upon application of a voltage to a diffuser. For some embodiments, an example device may include a diffuser configured to diffuse light in a single coordinate plane. For some embodiments, a method executed by the example device may include diffusing light in a single coordinate plane. For some embodiments, an example device may include a diffuser configured to receive a selection selected from the group consisting of a horizontal plane and vertical plane and to diffuse light only in the selected plane. For some embodiments, a method executed by the example device may include receiving a selection selected from the group consisting of a horizontal plane and vertical plane; and diffusing light only in the selected plane.

Figure 15:
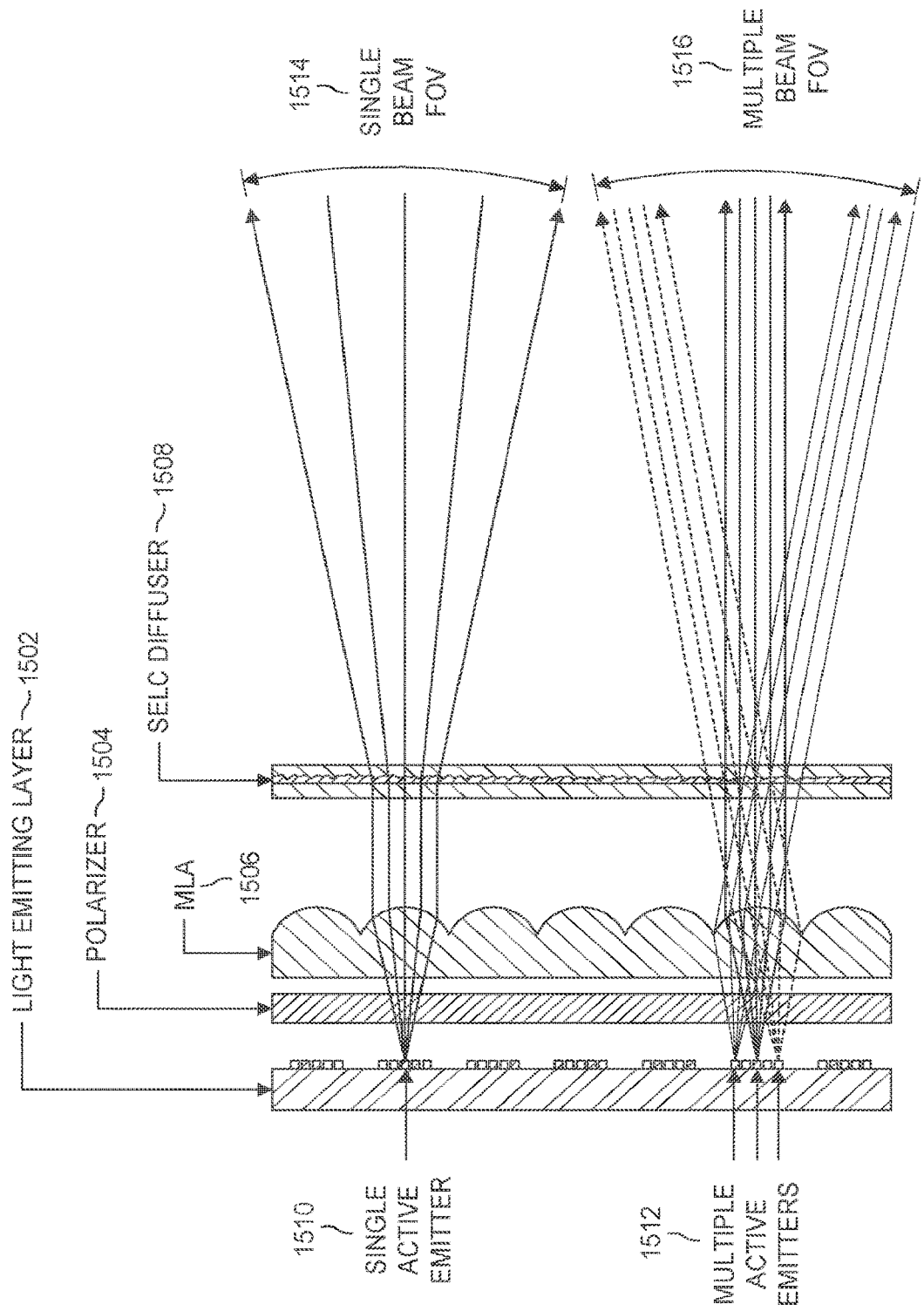
FIG. 15 is an illustration showing an example 3D light field optical display structure according to some embodiments.

FIG. 15 is an illustration showing an example 3D light field optical display structure according to some embodiments. For some embodiments, a multiview 3D display structure may include an SELC diffuser. The 3D display may use an angularly-selective diffusing component (such as the SELC diffuser, for example), which may be activated without mechanical movement. FIG. 15 shows schematically an optical display structure and its functionality. Light may be generated on a layer 1502 containing individually-addressable pixels. A single active emitter 1510 may be used to generate a single beam FOV 1514. Multiple active emitters 1512 may be used to generate a multiple beam FOV 1516. Light emitting components may be, e.g., a μLED matrix, an OLED display, or an LCD display with backlight. A microlens array (MLA) 1506 may be used in collimating the emitted light into multiple beams that are used in creation of multiple views either in horizontal or vertical direction. A SELC diffuser 1508 placed in front of the MLA 1506 may be used for selective diffusion of view light beams in the two orthogonal directions. An example tunable diffuser structure is explained in more detail in relation to FIGS. 12A and 12B. A polarizer sheet 1504 may be placed between the emitters attached to the light emitting layer 1502 and the MLA 1506 to make the light linearly polarized. For some embodiments, the polarizer 1504 may be laminated as a foil, e.g., on the MLA 1506 or on the first substrate of the SELC diffuser 1508, making the structure more compact and robust. For some embodiments, the light collimating structures may be two-directional microlenses that may be manufactured, e.g., as a hot embossed polymer sheet.

Figures 16A, 16B:
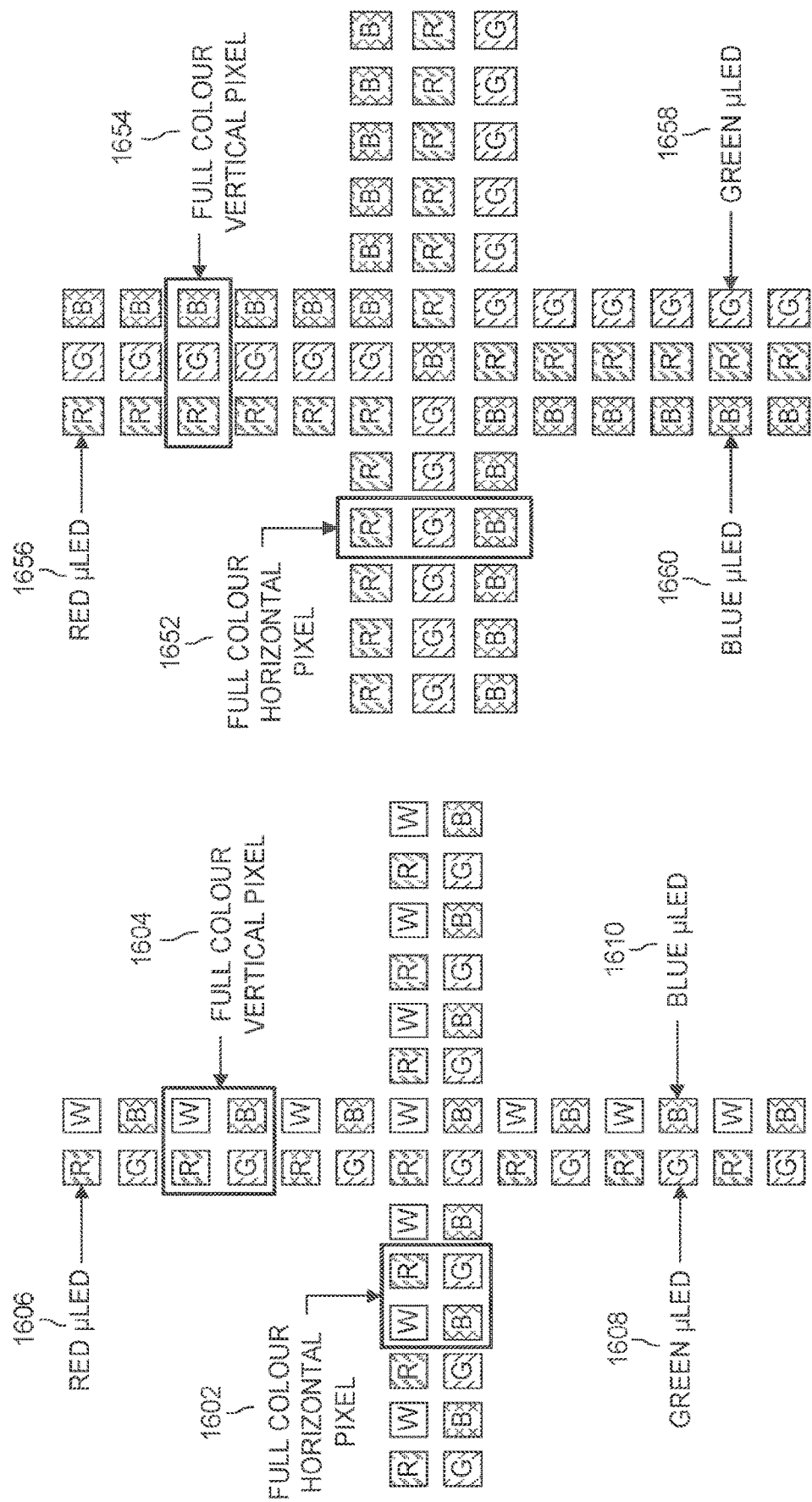
FIG. 16A is an illustration showing an example light emitter matrix layout for a full-color image with four sub-pixels for each full-color beam according to some embodiments.
FIG. 16B is an illustration showing an example light emitter matrix layout for a full-color image with three sub-pixels for each full-color beam according to some embodiments.

FIG. 16A is an illustration showing an example light emitter matrix layout for a full-color image with four sub-pixels for each full-color beam according to some embodiments. FIG. 16B is an illustration showing an example light emitter matrix layout for a full-color image with three sub-pixels for each full-color beam according to some embodiments. FIGS. 16A and 16B each show an example of light emitter patterns that may be used together with the display optical structure for some embodiments. Both patterns have example cross-shaped layouts of such that different color μLEDs may be placed into horizontal and vertical arrays. These two array directions may be used in creating view beams in two orthogonal directions. With FIG. 16A, a full-color pixel contains one red, one green, one blue, and one white emitter, whereas with FIG. 16B, the layout contains only three different colors. The white emitter may be used, for example, with high dynamic range (HDR) images by boosting some image highlights with an additional white light emission. The white component may be made, e.g., by coating a UV or blue μLED chip with a phosphor coating. The red, green, and blue colors may be made by transforming the emission of a UV or blue chip with a quantum dot (QD) coating for a specific emission spectra. For some embodiments, a pixel 1602, 1604, 1652, 1654 may include a set of one or more light emitting devices 1606, 1608, 1610, 1656, 1658, 1660. For some embodiments, a pixel 1602, 1604 that includes red 1606, blue 1610, green 1608, and white light emitting devices, the light emitting devices may be arranged in a 2×2 square arrangement, such as the example shown in FIG. 16A. For some embodiments, a pixel that includes red, blue, green, and white light emitting devices, the light emitting devices may be arranged in a 1×4 line arrangement. For some embodiments, e.g., horizontal resolution may be increased by changing the grouping of light emitting elements in such a way that a first group of four sub-pixels starting from a red sub-pixel is used and then a next group of four sub-pixels is activated starting from a white sub-pixel. Such an example method in accordance with some embodiments allows better angular resolution for the 3D image as the full-color pixel positional shift may be made with half full-color pixel width intervals. For some embodiments, the light emitting elements may be configured in a plus-shaped pattern, such as the examples shown in FIGS. 16A and 16B. For example, one or more rows may be configured to emit light in a horizontal direction and one or more columns may be configured to emit light in a vertical direction. Some embodiments of an LF display structure may include a set of light emitting elements configured in a plus-shaped pattern or cross-shaped pattern, such as the examples shown in FIGS. 16A and 16B.

FIG. 17 is a schematic perspective view illustrating an example 3D display in portrait and landscape modes according to some embodiments. The example optical display structure may project several view beams from each display projector cell segmented by the microlens apertures. For some embodiments, views may be created either in the horizontal or in the vertical direction, but not in both directions at the same time. A stereoscopic effect may be created by projecting two different images, one to each eye, at any given point in time. For some embodiments, a first image may be projected in the horizontal view direction to one eye and a second image may be projected in the horizontal view direction to the other eye. For some embodiments, in a 3D display application, a display may be capable of multiple views. During portrait mode, there may be multiple horizontal views 1702 but to save power, distinct vertical views may not be rendered and the vertical elements may not be addressed. The SELC diffuser may spread common views vertically. If the display is rotated, the diffusion may be switched to an orthogonal direction to generate multiple views in landscape mode 1704 or multiple views in portrait mode 1702, as applicable, and the active/idle display elements may be swapped. For some embodiments, other applications of addressable, angular control of diffusion may be used. In FIG. 17, the arrows show different view directions. To aid clarity, light rays have not been drawn in FIG. 17. For example, on the left side of the FIG. 17, light rays spread in the vertical direction showing vertical diffusion, but view directions are from different angles in a horizontal plane as shown.

For some embodiments, view projection directions are the same directions as the directions determined by the viewer's two eyes because only eye convergence is used for the 3D perception. If eye convergence is used only for creating the 3D image perception, then retinal focus cues and the super-multiview condition may be used such that there is more than one view image entering a single eye pupil. In that respect, a multiview image, e.g., may not be projected towards the two eyes because two different views are sufficient to create the autostereoscopic effect. However, more than one view per eye may be used for making the eyeboxes around each eye larger allowing more tolerance to eye movements.

The cross-shaped pattern of sources and the use of microlenses instead of lenticular sheets enables rotation of a multiview image direction. Such a feature may be used by mobile devices if the display mode is changed from portrait to landscape. Such a feature may be used to reduce image processing (which may include image rendering). Compared with a full-parallax display (which may have a full matrix of emitters for each projector cell), less light sources may be used for each projector cell for some embodiments. As the number of emitter components is lower, there may be less electrical contacts to the small light emitting chips and less control electronics may be used. Furthermore, the cross-shaped source pattern may allow more space for electrical wiring and controller components on a source module sub-assembly.

As the light collimating optics in the display structure create well-collimated beams from each separate source component, the view beams may have a narrow FOV in both directions. Without any diffusing components, this may mean that if the user's eye pair is not positioned exactly at the aligned vertical location with respect to the display, the image may not be visible at all. For some embodiments, the view beam FOV may be increased by selectively diffusing the beams in one direction, which may be orthogonal to the direction in which the multiple views are created. The FOV increase may allow tolerance in vertical positioning of the eyes, enabling a device to compensate for a user holding the display device by hand as well as for natural eye and head movements of the user without losing the image. For many material scattering-based diffusers, the FOV is not able to be increased in only one direction. As a result, such diffusers are not able to provide vertical eye position tolerance by increasing the FOV in only the vertical direction. Contrarily, though, an SELC diffuser is able to provide one-direction diffusion and to switch between transparent and scattering modes for some embodiments.

For some embodiments, an LF display apparatus, such as a smart phone, may include a sensor configured to detect an orientation of the display such that the apparatus is configured to switch between selectively operating the first controllable diffuser to diffuse in the first direction to selectively operating the second controllable diffuser to diffuse in the second direction responsive to a detected change in the orientation of the display. Some embodiments may include a directionally controllable diffuser that is configured to diffuse in the vertical direction such that only a single vertical view is generated if the apparatus is in a portrait orientation. For some embodiments, responsive to a rotation of the apparatus, the directionally controllable diffuser may be enabled to diffuse in a rotated direction such that only a single view is generated in the direction of diffusion if the display orientation changes from portrait to landscape.

The diffuser functionality shown in FIGS. 14A and 14B may be used with a 3D multiview display structure. For some embodiments, two separate stacked SELC diffuser components with orthogonal orientations may be used for two or three display modes. For some embodiments, an orientation of an LF display device may be detected and horizontal and vertical light diffusion parameters may be selected based on the detected orientation. For example, if an LF display device detects that the orientation has switched between portrait and landscape modes, the LF display device may select horizontal and vertical light diffusion parameters such that light beams are diffused horizontally in landscape mode and vertically in portrait mode or vice versa.

Figure 18:
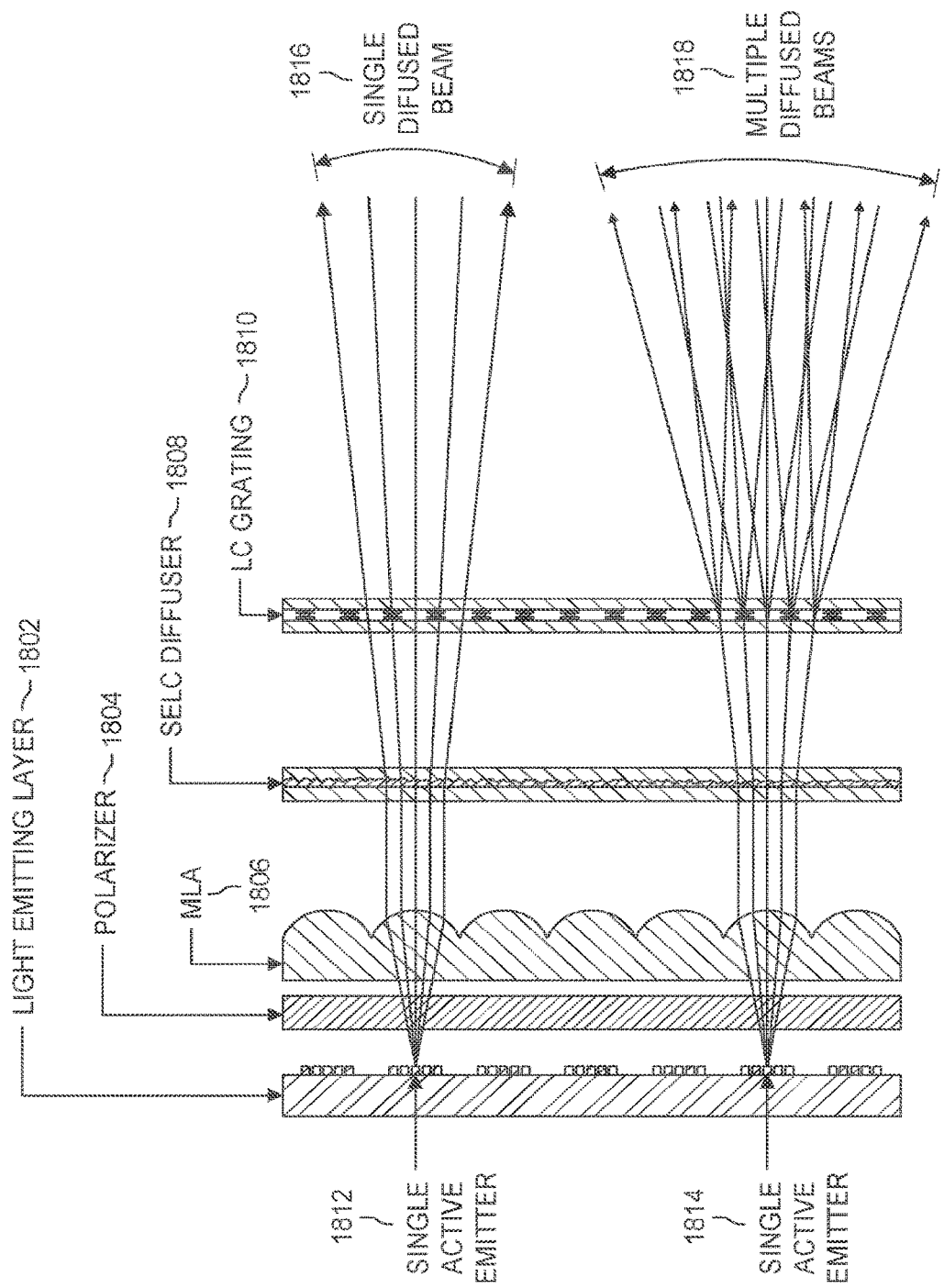
FIG. 18 is an illustration showing an example 3D display structure with tunable LC grating according to some embodiments.

FIG. 18 is an illustration showing an example 3D display structure with tunable LC grating according to some embodiments. Due to the limited tuning range of the LC material, light scattering effect at the SELC diffuser 1808 internal surface structure may become low. For some embodiments, if the beam divergence increase is not adequate with a single SELC structure, several components may be stacked for an amplified effect that may be under angular control. For some embodiments, diffusion in one direction may be increased by adding an LC grating 1810 to the diffuser stack 1808. FIG. 18 shows schematically one example of such a multiview 3D display structure with a single active emitter 1812, 1814. The well-ordered fine grating lines induced to the LC material layer split the diffused beam 1816 into several sub-beams 1818 that combine and create a wider FOV beam. For some embodiments, the individual diffused beam sections may have designed intensity profiles in order to reach a homogenous combined beam angular distribution. One example of such a profile is the Gaussian distribution that allows multiple beams to be combined with a "top-hat"-type overall intensity distribution.

For some embodiments, an apparatus may include: an array of one or more sets of light emitting devices 1812, 1814 as part of a light emitting layer 1802, a polarizer layer 1804, a microlens array (MLA) 1806, one or more diffusers 1808, and one or more gratings 1810. For some embodiments, at least one of the diffusers is a surface effect liquid crystal (SELC) diffuser. For some embodiments, at least one of the gratings includes liquid crystal (LC) material, such as the example LC grating 1810 shown in FIG. 18.

For some embodiments, a multiview 3D display uses spatial multiplexing such that the image rendering may be made by showing a series of different viewpoint 2D images to the different directions with the view beams created in the projector cells. The display device may be used as a multiview 3D display with multiple views or as a typical 2D display. The 2D display mode may be activated by showing the same image in each direction at the same time with the same hardware that is used for 3D images. For some embodiments, both diffuser directions may be activated to widen the FOV. For some embodiments, the diffuser structures are thin and close to the emitters, and spatial resolution of the 2D display surface is maintained. The diffusers may be used in removing "picket-fence" effects by fading out pixel spacing. This feature may be used if the display is used in a head mounted VR/AR/MR device. The switching speed requirement for the SELC diffuser may be low for switching image modes in a mobile device.

For some embodiments, active synchronization between the diffuser and the light emitters is not performed because switching may be activated with a motion sensor in the mobile device. Such a motion sensor may be used to select from horizontal and vertical light beams the correct source row orientation. Because only one of these rows is used at a given time, the source drive electronics may be less complex.

For some embodiments, neither the light emitters nor the MLA needs to be accurately aligned with the SELC diffuser. Slight variations in the horizontal and vertical directions may be allowed because the diffusing surface has a continuous microstructure. However, if the microstructure is a tiled varying type, alignment may be used. Slight variations in the depth direction may be allowed because the SELC diffuser component scatters light, and this function does not require accurate location. Very loose tolerances offer cost savings in the manufacturing process, and the display may be made robust against environmental factors, like temperature changes. This latter feature may be used with mobile devices that are used in varying environments.

Optical materials refract light with different wavelengths to different angles (color dispersion). This means that if three colored pixels (e.g., red, green, and blue) are used, the different colored beams are tilted and focused to somewhat different directions and distances from the refractive features. As the colored sub-pixels may be spatially separated, there may also be small angular differences to the colored beam projection angles. These angular differences may be compensated for in the optical structure by using a hybrid layer such that, e.g., diffractive features are used for the color correction. If different color light emitters in the display are arranged with a corresponding layout, the SELC diffuser may be able to diffuse together different color emissions at the viewing window, thereby reducing (or eliminating for some embodiments) optical- or rendering-based methods for color combination.

The SELC diffusers may be used for 3D image fine tuning if it is used with continuous control instead of switching between two modes. It may be used for example blending the different views together more smoothly in a case where the viewer is closer to the display or further away and the view beam angular distributions will need to be adjusted for more homogenous distribution. For some embodiments, a mosaic diffuser with local tuning option may be used in diffusing together neighboring view beams, such as if there is pixel-level redundancy in the 3D image content, which is a common feature of multiview and LF images. Observer eye positions also may be actively detected in the device with a tracking module and images projected to only those directions where eyes are located and FOV expanded with the SELC diffuser. This may save some energy as the light is concentrated better and mobile device battery life would be extended.

Several display manufacturers have been developing products for switching between 2D and 3D display modes in devices that utilize basic lenticular sheet or microlens based multiview devices. Some of these systems use switchable LC diffusers, such as, e.g., example systems understood to be described in U.S. Pat. No. 9,462,261 and PCT Patent Application No. WO2005011292. An SELC diffuser offers angular tuning, which may be utilized for switching between the 2D and 3D display modes. U.S. Pat. No. 9,250,446 is understood to describe a tilted lenticular sheet. For example, the one-directional switchable diffusion property of an SELC diffuser may be combined with a tilted lenticular sheet to achieve better 2D image mode resolution. Optical efficiency may be increased and energy consumption reduced with a surface-based diffuser component with better light transmission than material-based scattering components.

One possible 3D display method utilizing the SELC diffuser component is a projector-based device utilizing angular selectivity. For volumetric displays understood to be described in PCT Patent Application Nos. WO2017055894 and WO2017055894, a series of LC diffusers are used as switchable screens together with an image projector. As the SELC diffuser may be used for separate control over orthogonal diffusion directions, a switchable diffuser panel may scatter an image and another panel diffuses another image with crossed polarization and diffusion directions. Such a device may be used to increase the overall volumetric 3D image refresh rate as two sub-images may be shown simultaneously instead of sequential timing. And as the surface-based diffuser component may be designed with better light transmission than the material-based scattering components, optical efficiency may be increased and energy consumption reduced.

For some embodiments, an apparatus may include two or more diffusers (such as SELC diffusers) such that a first diffuser is configured to scatter light displaying a first image with a first diffusion direction, such that a second diffuser is configured to scatter light displaying a second image with a second diffusion direction, and such that the first diffusion direction is orthogonal to the second diffusion direction.

If the SELC diffuser is combined with a mosaic lens, some new functionalities and/or performance benefits may be achieved. As the diffuser functioning is based on a surface effect, different diffusing patterns may be fitted together with mosaic lenses. This combination allows better control over projected beam section angular range and, e.g., the voxels located on the display surface may be created without fixed optical structures allowing higher spatial resolution both on the display surface and on virtual focal planes.

A patterned SELC diffuser may be used in an augmented/ mixed reality (AR/MR) headset for improving image contrast. Diffuser surface with locally varying and tunable light scattering properties may selectively diffuse the real world image sections on top of which the artificial image content is projected. This may improve overall image quality by diffusing natural world bright features like specular reflections and glare that may lower image contrast considerably. For some embodiments, at least one SELC diffuser may be configured to diffuse light to reduce glare for an image projected by an array of one or more sets of light emitting devices.

Figure 19:
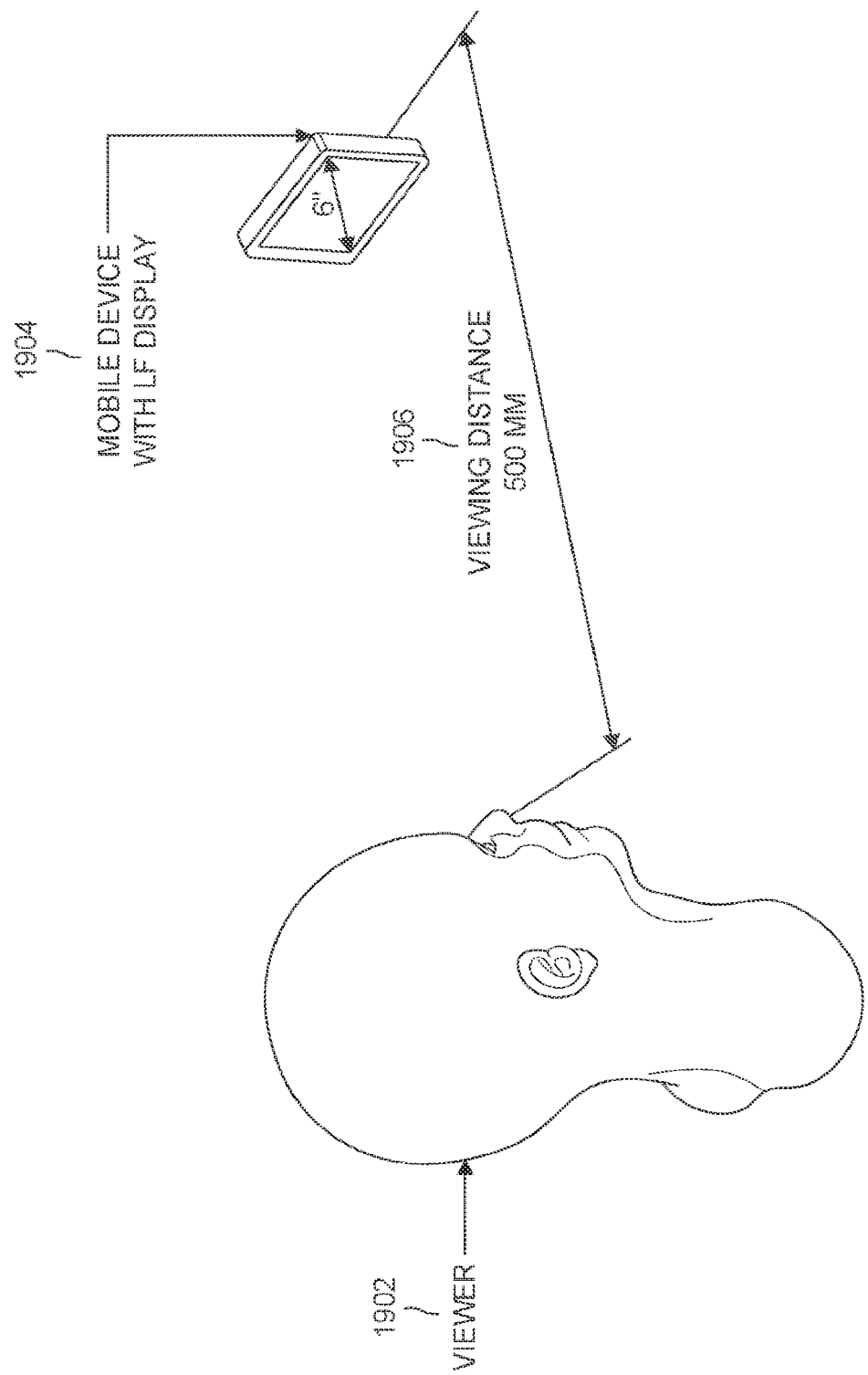
FIG. 19 is a schematic perspective view illustrating an example mobile device viewing configuration according to some embodiments.

FIG. 19 is a schematic perspective view illustrating an example mobile device viewing configuration according to some embodiments. For some embodiments, an example multiview 3D display may use an SELC diffuser component. FIG. 19 shows a mobile device with 6" multiview 3D display 1904 that is placed at a viewing distance 1906 of 500 mm away from a viewer 1902. The display is able to project 13 different views both in horizontal and vertical directions separately. The mobile device may be rotated by 90°, e.g., for changing the image mode from portrait to landscape (see FIG. 17). In both modes, only one set of 13 views is created for each multiview 3D image in the eye pair direction in order to create the stereoscopic effect. Use of 13 views may enable rotation of the device for different viewpoints in one direction to obtain a better 3D experience. Two orthogonally-stacked SELC diffusers with LC gratings are used for selectively expanding the FOV of the narrow view beams in the two orthogonal directions to relatively wide viewing windows that allow hand-held use of the device as well as adjustments for natural head and eye movements.

Figure 20:
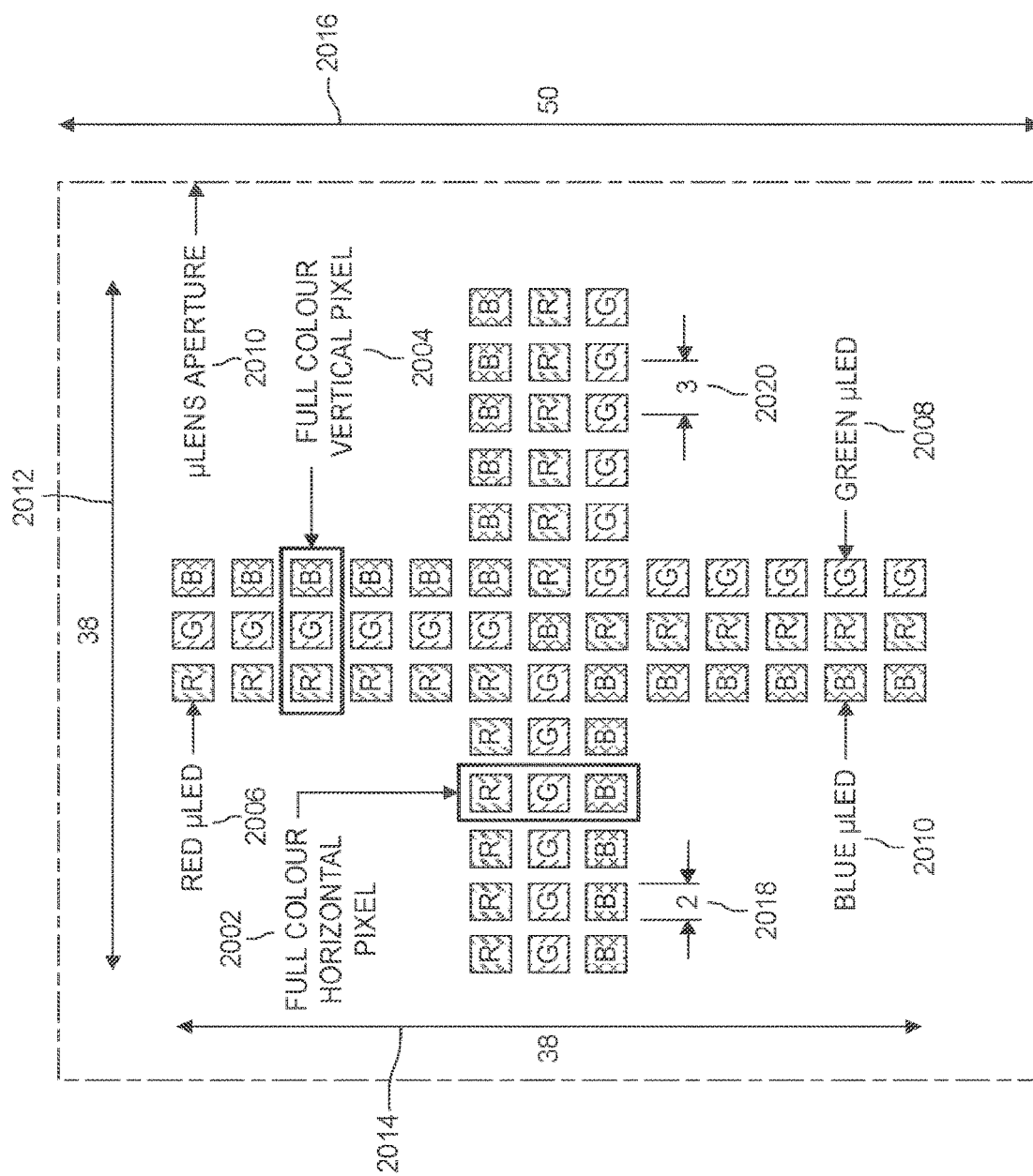
FIG. 20 is an illustration showing an example µLED pattern layout according to some embodiments.

FIG. 20 is an illustration showing an example µLED pattern layout according to some embodiments. FIG. 20 shows the layout and measurements (in µm) of the µLED arrays that are used as sources in an example display layout. For some embodiments, the example arrays have 23 red ("R") 2006, green ("G") 2008, and blue ("B") 2010 light source components arranged into a cross-shaped (or plus-shaped) pattern. Individual component size 2018 is 2 µm×2 µm, and the pitch 2020 is 3 µm. Total footprint of the source pattern is 38 µm×38 µm (2012, 2014). The µLEDs are bonded to a 42 µm×42 µm substrate (or 50 µm×50 µm (2016) substrate for some embodiments) that contains electrical contacts for the individual sources for a source module. The extremely small light emitting components may be bonded to a sub-assembly that may be made with higher accuracy manufacturing methods than methods used in the assembly of the whole display. Layout of the three different color components enables projection of 13 full-color image beams (which each may correspond to a full-color horizontal or vertical pixel 2002, 2004) in both vertical and horizontal directions separately with high angular resolution depending on the display image mode.

Figure 21:
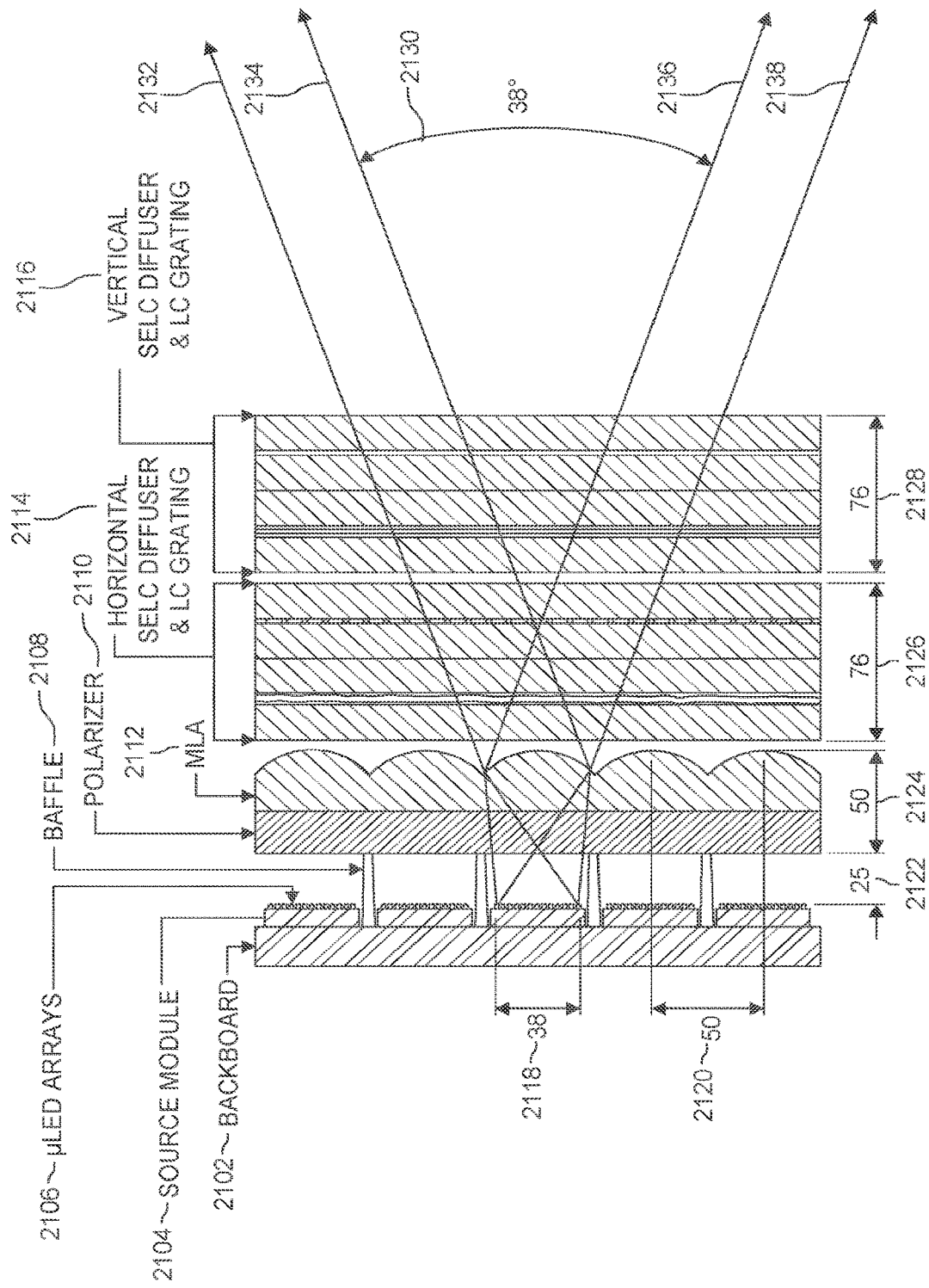
FIG. 21 is an illustration showing an example display optics structure according to some embodiments.

FIG. 21 is an illustration showing an example display optics structure according to some embodiments. FIG. 21 shows schematically the structure and measurements (in µm) of an example optical display. For some embodiments, a 22 µm thick linear polarizer sheet 2110 may be laminated to a ~28 µm thick polycarbonate microlens sheet 2112 made with hot embossing. The microlenses may have rectangular 50 µm×50 µm sized apertures, and the rotationally-symmetric aspheric lens shapes may have a 35 µm radius and a −0.8 conic constant. The 50 µm thick 2124 polarizer-microlens sheet may be positioned 25 µm (2122) from the µLED arrays 2106 that are assembled to a common backboard 2102, which may include one or more sub-assemblies (or source modules) 2104. Such sub-assemblies, for example, may have a layout as shown in FIG. 16A, 16B, or 20 or another layout. The backboard 2102 may contain electrical contacts for the source modules 2104. An opaque hot-embossed plastic baffle aperture sheet 2108 may be used as an accurate spacer between the lenses and sources as well as for stray light suppression between display projector cells formed by a single source module and a microlens. A source module may be 38 µm (2118) wide, for example, as shown. Together the sources and microlenses form a multiview display structure that is able to project 13 full-color beams from each projector cell to a total FOV (field-of-view) 2130 of 380 in both vertical and horizontal directions. For some embodiments, a 6" diagonal display may contain a 1500×2660 array of 50 µm pitch size 2120 projector cells, which corresponds to a 2.95"×5.24" display and 508 pixels per inch (PPI). Some current high quality 2D displays on a mobile phone have a resolution of ~500 PPI.

For some embodiments, a one-dimensional array of 13 full-color pixels may create 13 different views inside a total FOV of 38°. A single view beam may have a FOV of ~3.4° full width at half maximum (FWHM), which means that the beam has a width of ~30 mm at viewing distance of 500 mm. Due to single projected view beams being visible in one direction to only one eye at any given time, a stereoscopic 3D image may be created with such a display structure. Because the views projected from display edges overlap with the views projected from the display center, there is a small varying offset inside each projector cell between the source module and microlens locations over the display surface. At the display center, the offset is 0, and the source module may be centered to the microlens. At the extreme edge in the wider direction, the offset is 7.5 µm. At other locations between the center and the edge, the offset may be selected linearly between these two values. The total width of the viewing window is ~350 mm between the extreme view beam projection directions shown in FIG. 21.

For some embodiments, two orthogonally-oriented sets 2114, 2116 of SELC diffusers and LC gratings laminated together may be located between the microlenses (MLA) 2112 and a user. As shown in FIG. 21, the two orthogonally-oriented sets of SELC diffusers and LC gratings laminated together may be used for selectively diffusing the projected beams in the two orthogonal directions. For some embodiments, the whole optical display structure may have a thickness of less than 1 mm, even with a 0.5 mm thick protective glass top layer, which may be considered as "adequately thin", e.g., for a mobile phone device. Slight variations in any of the three dimensions between the multiview display structure and the diffusing layers may be allowed because the diffuser components have a continuous microstructure. For some embodiments, only rotational positioning between the different display structures is determined. For some embodiments, rotational positioning between the different display structures have larger tolerances because the positioning only effects the diffusion direction. Because diffusers are used to expand in one direction the FOV of image beams, the colors emitted from neighboring μLEDs may be mixed together when the light beams are diffused. As a result, special color combination methods are not used for some embodiments. Diffusion properties may be used to even out variations between source component intensities and exact locations of light sources in relation to the microlenses. As a result, a uniform overall image may be generated.

For some embodiments, SELC diffuser components may be constructed from two thin Zeonex E48R polymer substrates and a layer of liquid crystal material, which may have a refractive index matched to the substrate refractive index (~1.53 @ 589 nm wavelength). The tuning range of the LC material refractive index may be ~0.02 in one light polarization direction. Both of the polymer sheets may have transparent ITO electrode coatings, and the LC material may be located between the two layers. The polymer sheets may have two different one-dimensional surface microstructures that follow surface shape slope distributions common to two different optical shapes. The polymer sheets may both have 5 μm aperture widths with different surface shape parameters. For some embodiments, the first respective optical shape may have a 2.75 μm radius, and the second optical shape may have a 0.75 μm radius and a −1 conic constant. These surface structures diffuse light beams in one direction if the voltage is applied to the electrodes and a refractive index difference is created between the LC material and surrounding foils. If the voltage is turned off, there is no refractive index difference, and the material interfaces are transparent to incoming beams. A switchable LC diffraction grating having the same structure than what is described in Chen is laminated to the SELC diffuser forming together one ~76 μm thick 2126, 2128 tunable directional diffuser component. For some embodiments, a display structure may have two diffuser components stacked side by side with orthogonal orientations for selective diffusion of beams in the vertical and horizontal directions.

With a refractive index difference of 0.02 for the two optical interface surfaces between the LC material and both polymer substrates, the SELC diffuser surface microstructure shape slope distributions may be able to modify a well-collimated beam into an ~8° FWHM (full-width-half-maximum) divergence diffused beam with a near-Gaussian intensity profile. The diffuser component grating may be able to diffract an incoming beam light energy evenly (~33% each) into three orders (−1, 0 and +1) such that the first order (−1, +1) beams are tilted by ~6° on both sides of the zeroth (0) order beam. These three near-Gaussian beam sections fuse together to form one diffused view beam that is wider than the individual diffused beam sections in the diffraction direction. The combination of SELC diffuser and LC grating may be able to modify divergence of one well-collimated beam into a diffused beam that has ~18° FWHM divergence.

Using this divergence value, a single full-color beam created with one full-color pixel inside one display projector cell may be able to cover a ~160 mm high viewing window at the display viewing distance. The total viewing window size of 160 mm×350 mm may be "adequate", e.g., for a hand-held mobile device as this window size may be able to compensate for some shaking of the hand as well as small eye and head movements.

For some embodiments, an apparatus may include a backboard and one or more baffles, such that an array of one or more sets of light emitting devices is mounted to the backboard, each set of light emitting devices corresponds to a respective baffle, and each baffle separates at least in part the respective set of light emitting devices from the rest of the array of one or more sets of light emitting devices. FIG. 21 shows an example of such an apparatus.

For some embodiments, an apparatus may be configured such that at least one of the diffusers is configured to diffuse in a horizontal direction light emitted by at least one of the light emitting devices, and at least one of the diffusers is configured to diffuse in a vertical direction light emitted by at least one of the light emitting devices. FIG. 21 shows an example of such an apparatus.

FIG. 21 presents schematically the structure of an example 3D multiview display that may be used in, e.g., a mobile phone device. Light is emitted from an array of μLEDs 2106 and is linearly polarized with a polarizing component 2110 attached to a microlens array (MLA) 2112. The MLA 2112 collimates the emitted and polarized light into beams that hit a stack of liquid crystal (LC)-based components 2114, 2116. Two of the components are SELC diffusers and two are LC gratings. One SELC diffuser is used for diffusing light in the vertical direction only and the other in horizontal direction only. The same applies also to the LC gratings. The LC gratings may enhance the diffusion of light in either direction if a wider scatter distribution is used, but the SELC diffusers may be operated without the LC gratings in some embodiments. Emitted image beams 2132, 2134, 2136, 2138 show single pixel view directions for the edge rays emitted from two different light sources. The example emitted image beams 2132, 2134, 2136, 2138 are shown without any diffusion.

The display device in FIG. 21 may be operated in three modes. In the first mode, the first SELC diffuser is "off," and the second SELC diffuser is "on." The LC layer inside the second SELC twists the direction of polarization such that the interface between the birefringent LC material and the linearly structured substrate layer becomes diffusing. Light is diffused only in the vertical direction with respect to a mobile device display that is viewed in portrait mode. In the horizontal direction, light is not diffused because the incident linearly polarized light hits an interface between the LC material and substrate inside the first SELC diffuser such that the LC material and the substrate have matching refractive indices in the horizontal direction. For this reason, the display is able to produce different images for different horizontal directions. As a result, a 3D stereoscopic image may be created for the viewer. This use case is pictured on the left side of FIG. 17 in which, e.g., 13 views, are generated in portrait mode 1702.

In the second mode, the first SELC diffuser is "on," and the second SELC diffuser is "off." Light is diffused only in the horizontal direction with respect to a mobile device display that is viewed in portrait mode. In the vertical direction, light is not diffused because the second SELC internal interface between the birefringent LC layer and the linearly structured substrate is now optically transparent.

The display is able to produce different images for different vertical directions. In this case, the viewer is unable to see a 3D image if the phone is used in portrait mode. However, if the phone is rotated by 90 degrees to landscape mode, the different images become visible to the viewer, and a 3D image is seen. This use case is pictured on the right of FIG. 17 in which, e.g., 13 views, are generated in landscape mode 1704.

In the third mode, both SELC diffusers are "on." Light is scattered in both vertical and horizontal directions because the LC layers twist the direction of polarization of light incident on both diffusers such that the internal interfaces have refractive index differences and light in scattered. In this case, the display is unable to produce different images in either the vertical or horizontal direction, but the mode may be used with a 2D image instead of a stereoscopic 3D image. Certain combinations of SELC diffuser(s), LC grating(s), and μLED activation may be used to limit the angular range of light emitted in the 2D mode for some embodiments. This feature may be used, e.g., in a privacy mode such that only a single viewer sees the image.

Some embodiments of an LF display structure may include a display (which may include one or more light emitting elements); a first controllable diffuser overlaying the display, the first controllable diffuser being selectively operable to diffuse light in a first direction; and a second controllable diffuser overlaying the display, the second controllable diffuser being selectively operable to diffuse light in a second direction substantially perpendicular to the first direction. For some embodiments, at least one of the first and second controllable diffusers may include a surface effect liquid crystal (SELC) diffuser. For some embodiments, at least one of the at least one LC grating and the first and second controllable diffusers may include a birefringent material. For some embodiments, a grating may include birefringent material.

To test the structure's optical functionality, a set of simulations was performed with optical simulation software OpticsStudio 17. The described optical display structure was placed at 500 mm away from a detector surface and four different cases were simulated. In the first three cases, three sources were used positioned at the center and at the two horizontal extremes of the cross-shaped source pattern. These tests were done to model optical properties of the multiview optics and to see the selective diffusion properties of the tunable diffuser components. In the last simulation case, a horizontal row of 13 sources was used. In this case, both the vertical and horizontal diffusers were activated to show the width and height of the viewing window that may be created with a single projector cell in a selected direction. All of the simulated sources had a green 550 nm central wavelength and 20 nm spectral width, and the sources were positioned in a single projector cell structure. Simulation results are presented in FIGS. 22A-22D, which shows irradiance distributions as 2D maps of a 500 mm×500 mm detector area at a 500 mm viewing distance. The same information is shown as irradiance profiles in FIGS. 23-25.

Figure 22:
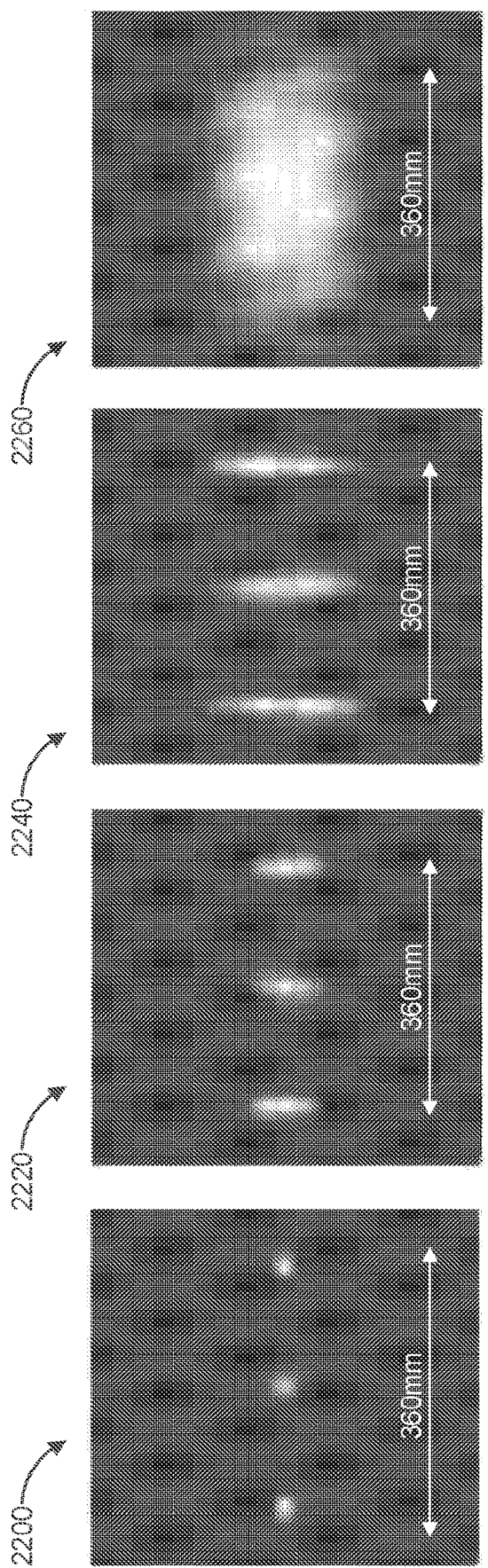
FIG. 22A is an illustration showing an example simulated irradiance distribution without diffusers according to some embodiments.
FIG. 22B is an illustration showing an example simulated irradiance distribution with SELC diffusers according to some embodiments.
FIG. 22C is an illustration showing an example simulated irradiance distribution with SELC diffusers and grating according to some embodiments.
FIG. 22D is an illustration showing an example simulated irradiance distribution with horizontal and vertical diffusers activated according to some embodiments.

FIG. 22A is an illustration showing an example simulated irradiance distribution without diffusers according to some embodiments. The first distribution image 2200 of FIG. 22A shows that when the diffusers are not activated, the three active sources show up as three separate spots inside the viewing window.

FIG. 22B is an illustration showing an example simulated irradiance distribution with SELC diffusers according to some embodiments. The second 2D distribution image 2220 of FIG. 22B shows how the beams are diffused in the vertical direction when the vertical SELC diffuser is activated.

FIG. 22C is an illustration showing an example simulated irradiance distribution with SELC diffusers and grating according to some embodiments. The third 2D distribution image 2240 presented in FIG. 22C shows how the activated vertical LC grating increases the diffusion further in the vertical direction. The horizontal distributions remained the same in FIGS. 22B and 22C, showing the angularly-selective diffusion property of the system.

FIG. 22D is an illustration showing an example simulated irradiance distribution with horizontal and vertical diffusers activated according to some embodiments. The second 2D distribution image 2260 of FIG. 22D shows the angular beams diffuse together in both the horizontal and vertical directions.

Figure 23:
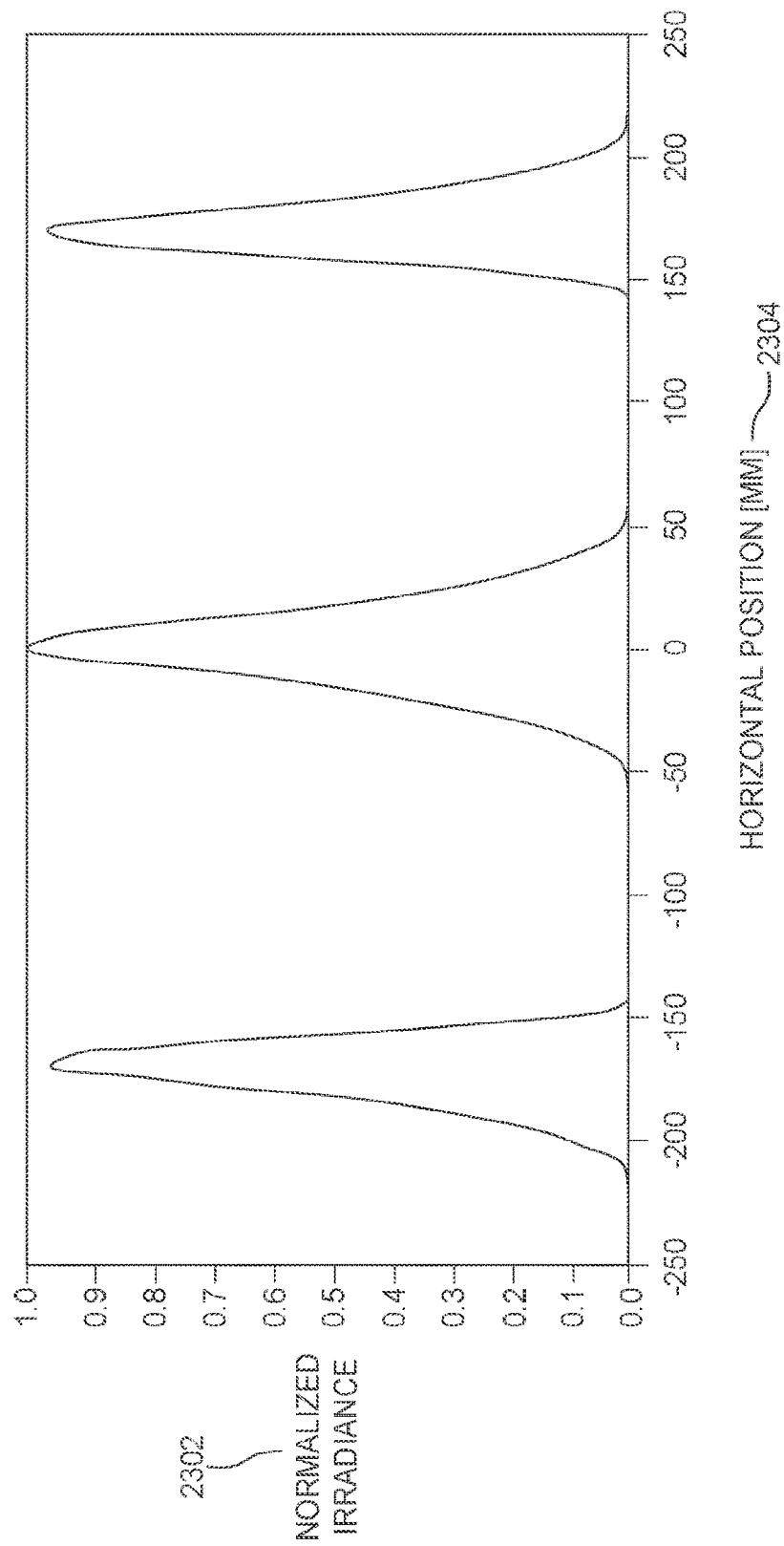
FIG. 23 is a graph showing an example horizontal irradiance distribution for deactivated horizontal diffusers and gratings according to some embodiments.

FIG. 23 is a graph showing an example horizontal irradiance distribution for deactivated horizontal diffusers and gratings according to some embodiments. An irradiance distribution of three sources at a viewing window with a horizontal diffuser and grating is shown as a graph of normalized irradiance 2302 vs. horizontal position 2304. In FIG. 23, the diameter of these spots is around 25 to 30 mm full width at half maximum (FWHM), and these spots have near-Gaussian distribution profiles. FIG. 23 corresponds to the optical display structure shown in FIG. 22A.

Figure 24:
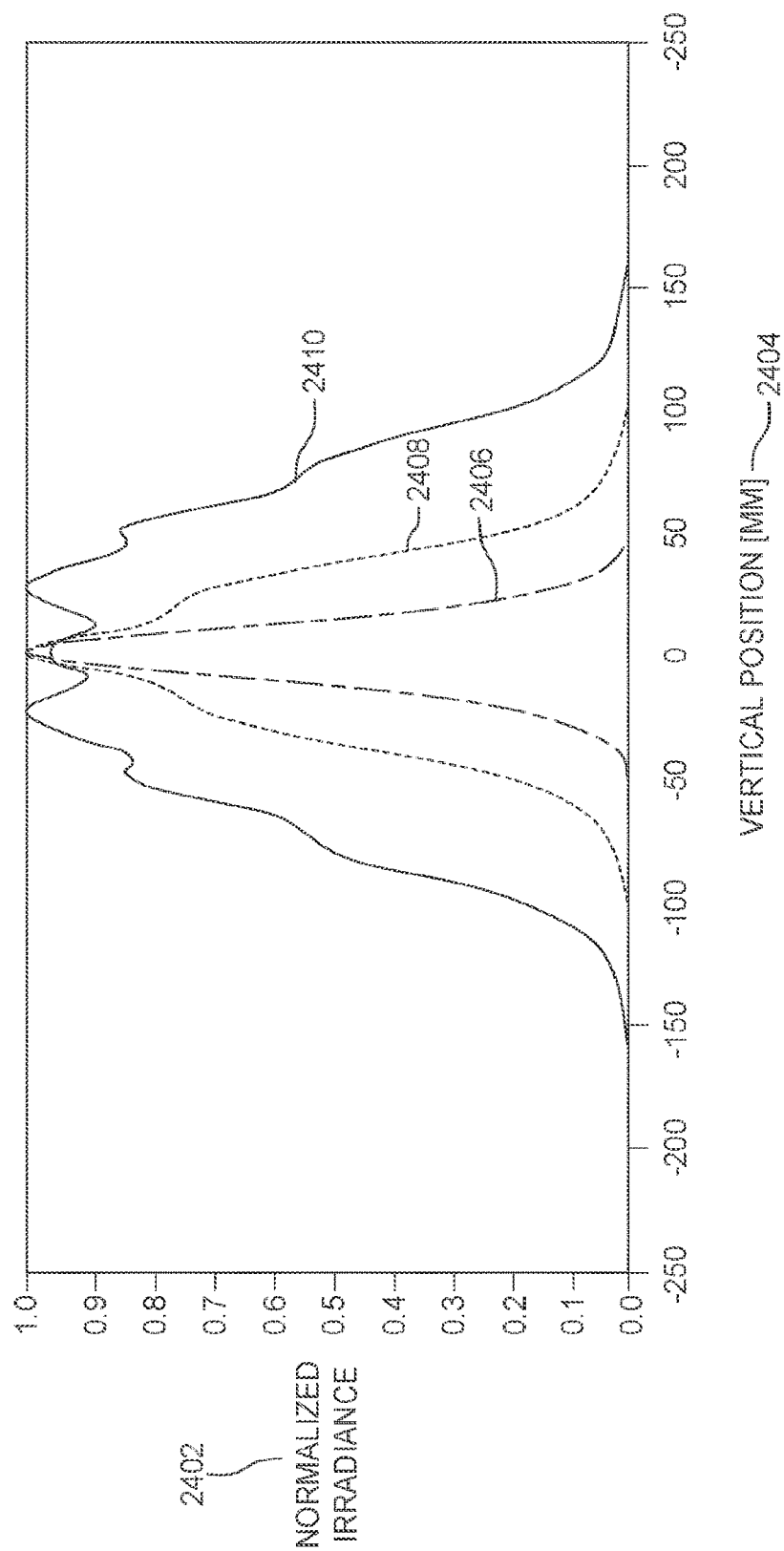
FIG. 24 is a graph showing example vertical irradiance distributions for three configurations according to some embodiments.

FIG. 24 is a graph showing example vertical irradiance distributions for three configurations according to some embodiments. An irradiance distribution of a single central source at a viewing window with three configurations is shown as a graph of normalized irradiance 2402 vs. horizontal position 2404. The first trace 2406 corresponds to a configuration with no diffuser or grating. The second trace 2408 corresponds to a configuration with a diffuser but no grating. The third trace 2410 corresponds to a configuration with a diffuse and a grating. FIG. 24 presents a comparison of three simulated irradiance profiles in the vertical direction when the vertical diffuser and grating are activated separately. FIG. 24 corresponds to the optical display structures shown in FIGS. 22B, 22C, and 22D. These profiles were taken from the vertical central lines of the FIGS. 22A, 22B, and 22C distributions. The graphs show that when the SELC diffuser is activated, the view beam width increases from ~25 mm FWHM to ~70 mm at the viewing window. This means that the tolerance for eye pupil positioning in the vertical direction has increased by approximately three times. When the grating is activated together with the SELC, the width is increased to ~160 mm, which is over six times larger than the original beam width and allowing much larger relative vertical positional shifts between the display and viewer eyes. This comparison shows that a considerable increase in view beam FOV may be achieved with the presented optical structure, thereby improving the ease of use.

The profiles in FIG. 24 show irradiance distributions normalized to peak value of 1. However, if the beam is diffused and the same light energy is spread over a larger surface area at the viewing window, the peak irradiance values also drop in relation to the increased beam width, and the user may see a dimmer picture. For some embodiments, the μLEDs may be driven with higher current to compensate and to increase the total light output.

This feature may also be used, for example, in the case of a mobile phone that has a front-facing camera that may locate the viewer's eyes. If the viewer's eyes are positioned right at the projected centerline of the display, the SELC diffuser and/or the LC grating may not be activated, and the µLEDs may be driven with lower current. This mode may save energy and extend the usage time of the battery-operated device. For some embodiments, the use of two different beam width modifying layers may enable the use of three (for example) viewer eye position zones for adjusting display power consumption accordingly.

Figure 25:
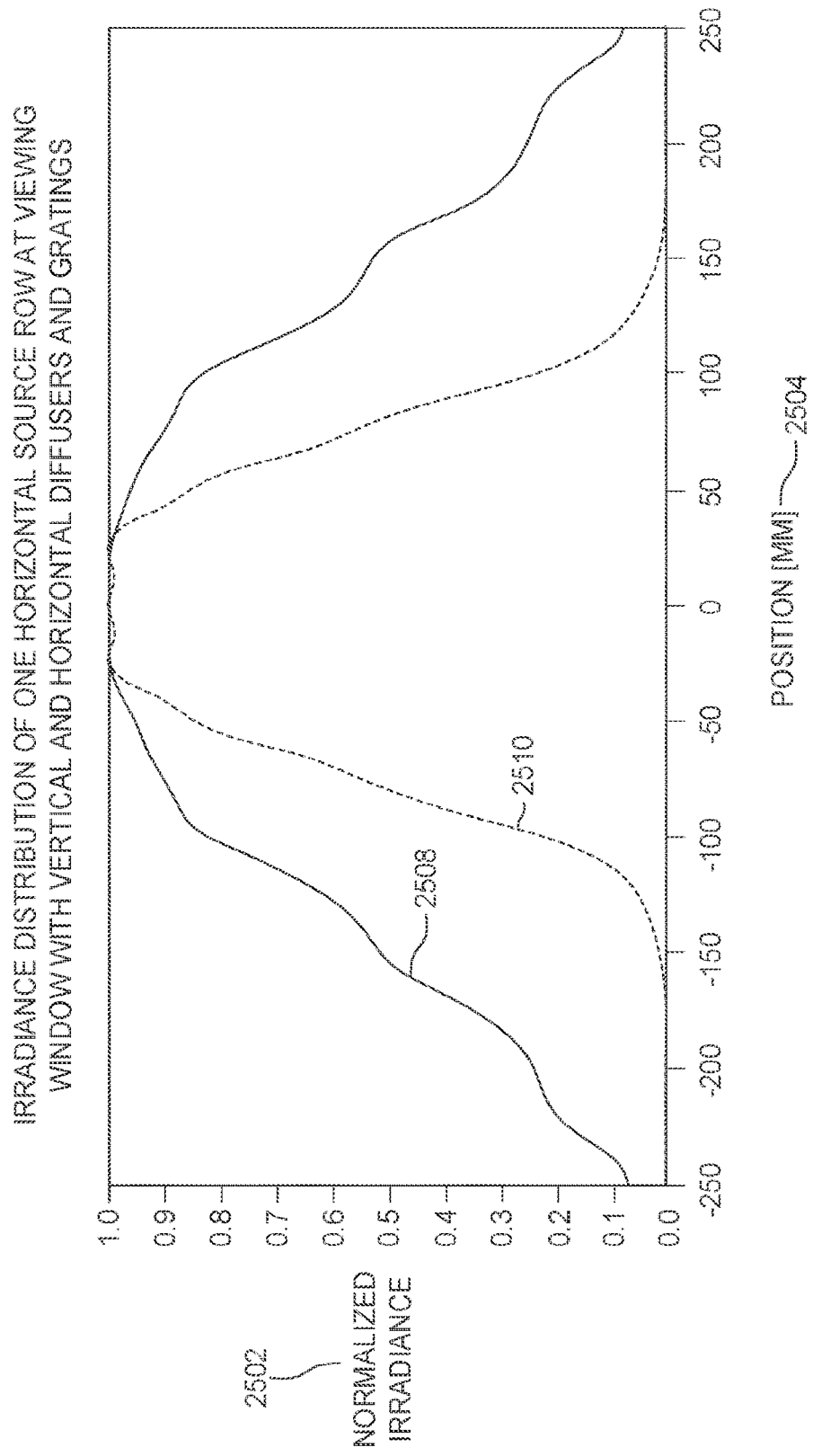
FIG. 25 is a graph showing example irradiance distributions for a horizontal row of light sources with horizontal and vertical diffusers and gratings according to some embodiments.

FIG. 25 is a graph showing example irradiance distributions for a horizontal row of light sources with horizontal and vertical diffusers and gratings according to some embodiments. An irradiance distribution of one horizontal source row at a viewing window with vertical and horizontal diffusers and gratings is shown as a graph of normalized irradiance 2502 vs. horizontal position 2504. FIG. 25 shows simulated irradiance profiles taken from the 2D distribution shown in FIG. 22D. These profiles show the width and height of the viewing window that may be achieved by activating a horizontal row of 13 sources together with horizontal and vertical diffusers. This ~160 mm×350 mm sized window may be covered by all projector cells in the display matrix. When both of the horizontal and vertical diffusers are activated at the same time, the angular resolution of the view beams is lost as the beams are diffused together. This feature may be used for showing images with the display in a 2D mode. As the viewing window still has a limited size, the 2D image is visible only to a single user and the optical structure functions as an effective privacy filter. Due to the fact that the µLEDs are placed in a cross-shaped pattern, the orientation of this viewing window may be freely rotated by 90° if the display device is rotated, e.g., from landscape to portrait mode.

For some embodiments, independent horizontal and vertical light diffusion parameters may be selected such that one or more diffusers perform simultaneous horizontal and vertical diffusion. For some embodiments, a first set of one or more diffusers may be configured to perform horizontal diffusion and a second set of one or more diffusers may be configured to perform vertical diffusion. The first and second set of diffusers may be stacked in parallel, for example, such that light beams are diffused for simultaneous horizontal and vertical diffusion.

For some embodiments, a smaller number of source components may be used for manufacturing a display. For some embodiments, a cross-shaped µLED pattern may contain a total of 69 active source components, which is ~59% less than a source module using a full array (13×13=169 components). Use of a cross-shaped µLED pattern may enable the use of a less complex electrical layout because there are less µLEDs than a full array and less of the substrate surface is occupied by µLEDs. As a result, cost may be reduced.

A cross-shaped arrangement may mean that a lower number of images are generated for each 3D multiview image if the views are created only in one direction. As a result, image processing requirements (such as rendering and display timing) may be lower. Having only a one-directional multiview parallax image at any given time may be considered adequate by a user for many use cases and may enable a lower cost 3D system to be used on more devices.

For some embodiments, an optical image display structure may include a tunable light diffusion component. Some embodiments of a method may include diffusing light with a tunable light diffusion component. For some embodiments, the optical image display structure may include a 3D multiview display device. Some embodiments of the method may include displaying multiview 3D images with the 3D multiview display device. For some embodiments, an SELC diffuser may be used, for example, to control the illumination pattern created with a LED lamp. The SELC diffuser may be adjusted electronically to diffuse light evenly over a large area or to project a spotlight. SELC diffusers may be used, e.g., in security/privacy glass windows that may be switched between transparent mode (to allow light to pass through the glass windows) and translucent mode (to block light from passing through the glass windows). Because SELC diffusers have surface effects, some SELC diffusers may be designed to have different angular scattering and spectral selectivity properties in comparison with material scattering-based diffusers, many of which scatter light uniformly over an angular range. For some embodiments, SELC diffusers may be used as tunable diffusers with many types of 3D displays.

Many of the optical components of SELC diffusers may be produced with large scale manufacturing methods, e.g., nanoimprinting, making them low cost in high volumes. Some diffusers with surface microstructures and designed slope distributions are available in large sheet format. Similar structures and manufacturing methods may be used to manufacture tunable diffuser structures. Wafer-level manufacturing using UV-curable optical materials and glass wafers may be able to be used for the accuracy requirements of small screen sizes.

LC-based components typically use linearly polarized light, which may lower optical efficiency and increase power consumption. Because LCDs are typically polarization-dependent devices, light propagation controlling components may be used in 3D displays without a high cost in efficiency. With recent developments ("Shang") in using cholesteric LCs (instead of the more common nematic phase crystals) that may be used, e.g., for beam diffusion without polarization dependence, enabling increasing of the component transmittance for display panels based on OLEDs or µLEDs.

For some embodiments, high quality goggleless 3D displays use small scale light sources, such as, e.g., µLEDs, to obtain very small view beam sizes and a high level of collimation. For some embodiments, the active optoelectronic layers (e.g., light emitters, SELC diffuser, and/or LC grating) may be controlled to operate in synchronization.

For some embodiments, the SELC diffuser may be segmented so that different portions have different degrees of diffusion. Such a segmentation may be used to generate a spatially-adaptive directional density. In such a device, some spatial regions of an image may be reproduced with different views of fine angular differences, and other spatial regions may be reproduced with coarse angular density of views.

A conventional display device operating with such content may have a uniform angular view density, which is equal in all spatial areas. As a result, redundant views may be generated and displayed in areas with coarse angular densities. With an SELC diffuser, spatial areas with coarse angular densities may be produced using a single view and a high level of diffusion so that light in all viewing directions is produced via diffusion rather than displaying of redundant narrow views. As a result, the displayed image may be more uniform than an image composed of several discrete, narrow beams. With an SELC diffuser, discrete narrow beams may be used for some embodiments if the content shows significant variation between views such that uniformity tolerance is masked by the content variation. Thus, use of a spatially-patterned SELC diffuser may improve display quality and reduce bandwidth for displaying redundant views.

Figure 26:
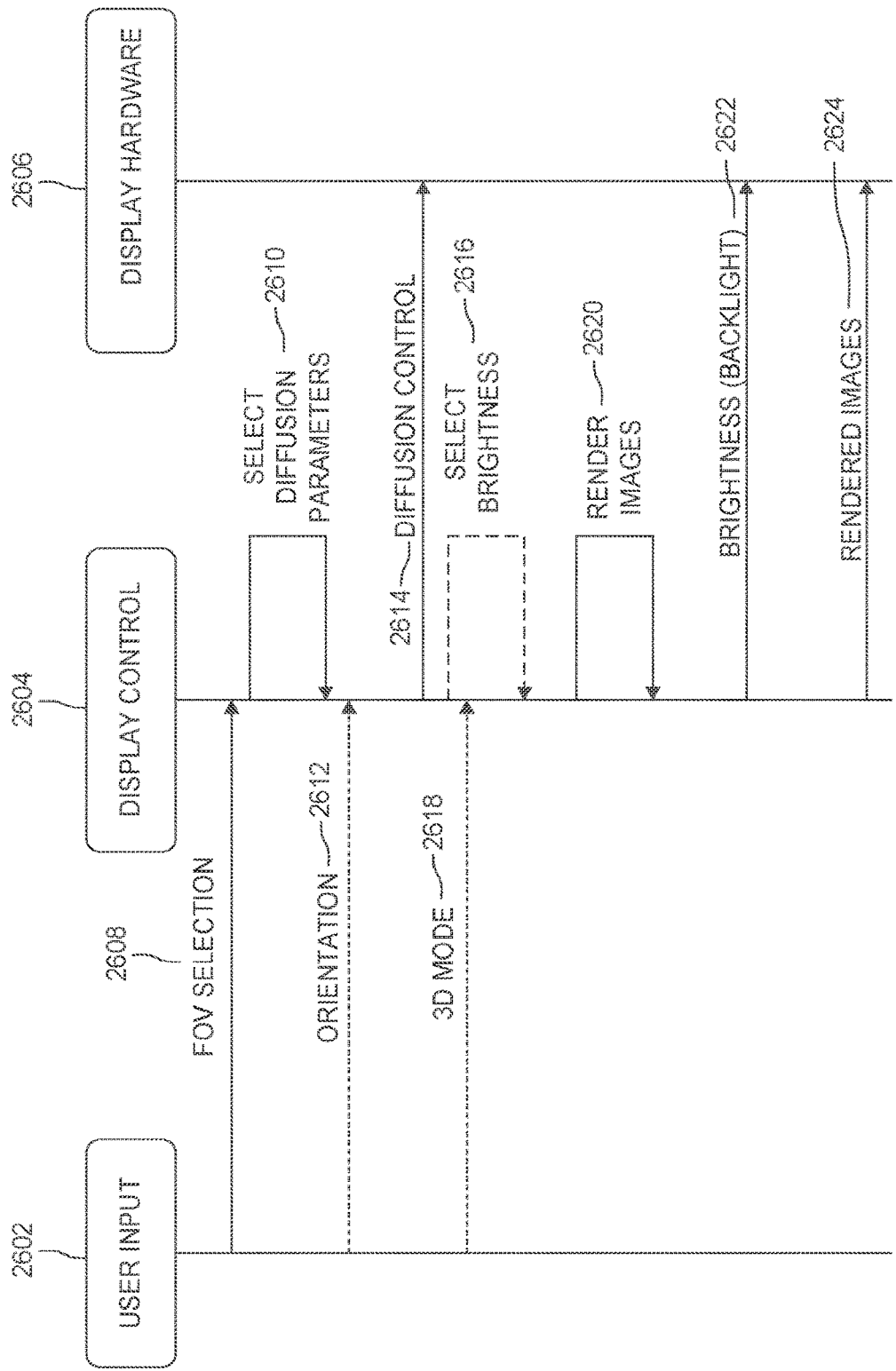
FIG. 26 is a message sequencing diagram illustrating an example process for processing and displaying a 3D image according to some embodiments.

FIG. 26 is a message sequencing diagram illustrating an example process for processing and displaying a 3D image according to some embodiments. For some embodiments, a process may be executed that includes a display control 2604 receiving 2608 a field of view (FOV) selection from a user input 2602. For some embodiments, a display control 2604 may be used, e.g., in activating a privacy setting such that an image is visible to a limited FOV or a power savings mode such that the light is directed from the pixels only towards the user eyes. The user may also switch the display between 2D and 3D display modes. In 2D display mode, for example, only a few of the light emitting components behind each pixel are used together with the activated diffuser because there is no need to have directional control over pixel images for some embodiments.

The process may further include the display control 2604 selecting 2610 diffusion parameters based on the FOV selection. The process may further include the display control 2604 selecting independent horizontal and vertical light diffusion parameters based on the FOV selection. For example, if a wide angle FOV is selected by the user, the display control 2604 may select a larger lens aperture height. If, for example, the user selects a narrower angle FOV, the display control may select a smaller lens aperture height. The process may further include the display control 2604 receiving 2612 an orientation from the user. The process may further include the display control 2604 sending 2614 diffusion control information (such as horizontal and vertical light diffusion parameters) to the display hardware 2606. The process may further include the display control 2604 receiving 2618 a 3D mode setting (such as a selection indicating either 2D or 3D mode) from the user input 2602. The process may further include the display control 2604 selecting 2616 brightness settings. The process may further include the display control 2604 rendering 2620 images. The process may further include the display control 2604 sending 2622 brightness information, such as backlight information, to the display hardware 2606. The process may further include the display control 2604 sending 2624 the rendered images to the display hardware 2606, which may be optical hardware of an LF display device.

For some embodiments, the process may include emitting a light beam from a light emitting device and adjusting the brightness of the emitted light beam based on the FOV selection. For example, the brightness may be adjusted to keep the images seen by a user at a similar brightness level. If a wider FOV is selected, the brightness may be raised, whereas if a narrower FOV is selected, the brightness may be decreased. Such changes in brightness may be made due to a wider FOV having more light dispersion than a narrower FOV. For some embodiments, adjusting the brightness may include adjusting the current and/or voltage level to one or more light emitting devices, such as micro light-emitting diodes (µLEDs).

For some embodiments, selecting the independent horizontal and vertical light diffusion parameters may be based on the 2D/3D mode selection. For example, a diffuser may be set to pass light without diffusion (or very little diffusion) in both the horizontal and vertical dimensions, such as is shown in FIG. 12A, if a 2D mode is selected. In 3D mode, for example, a diffuser may be enabled to diffuse light in the horizontal and/or vertical dimensions to enable a 3D image to be displayed.

For some embodiments, an apparatus may include a processor and may be configured to perform the process. For some embodiments, the display control may include a processor that executes the display control portions of the process. For some embodiments, the display hardware may include a processor that executes the display hardware portions of the process. For some embodiments, one or more processors may be used to execute one or more portions of the process.

Figure 27:
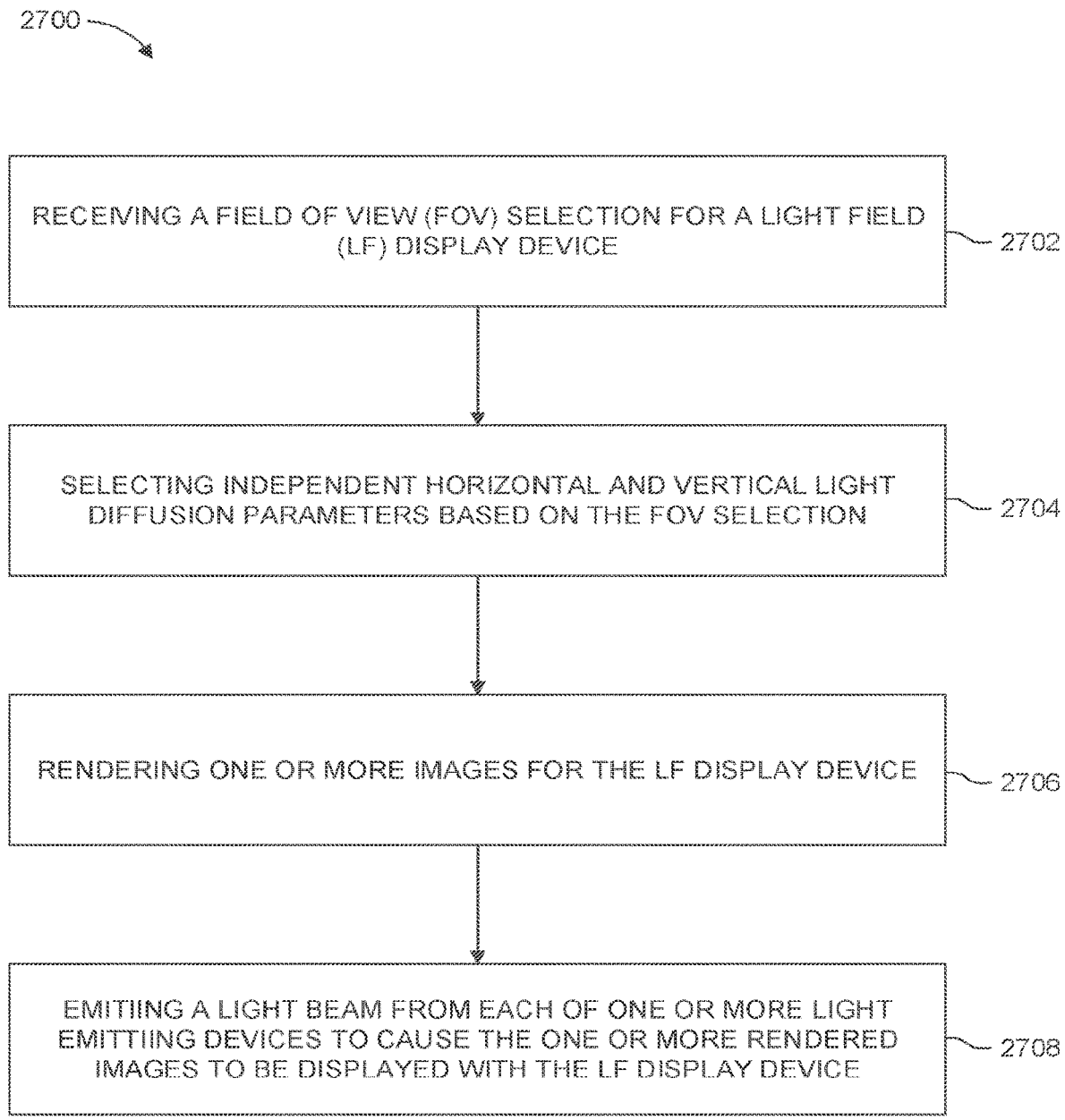
FIG. 27 is a flowchart illustrating an example process for processing and rendering a 3D image according to some embodiments.

FIG. 27 is a flowchart illustrating an example process for processing and rendering a 3D image according to some embodiments. For some embodiments, a process 2700 may be executed that includes receiving 2702 a field of view (FOV) selection for a light field (LF) display device. For some embodiments, the process 2700 may further include selecting 2704 independent horizontal and vertical light diffusion parameters based on the FOV selection. For some embodiments, the process 2700 may further include rendering 2706 one or more images for the LF display device. For some embodiments, the process 2700 may further include emitting 2708 a light beam from each of one or more light emitting devices to cause the one or more rendered images to be displayed with the LF display device. For some embodiments, an apparatus may include a processor and may be configured to perform the process. For some embodiments, an apparatus may include a processor and may be configured to control one or more light emitting devices to emit light. For some embodiments, the apparatus may be configured to control a light diffuser, such as an SELC diffuser.

Figure 28:
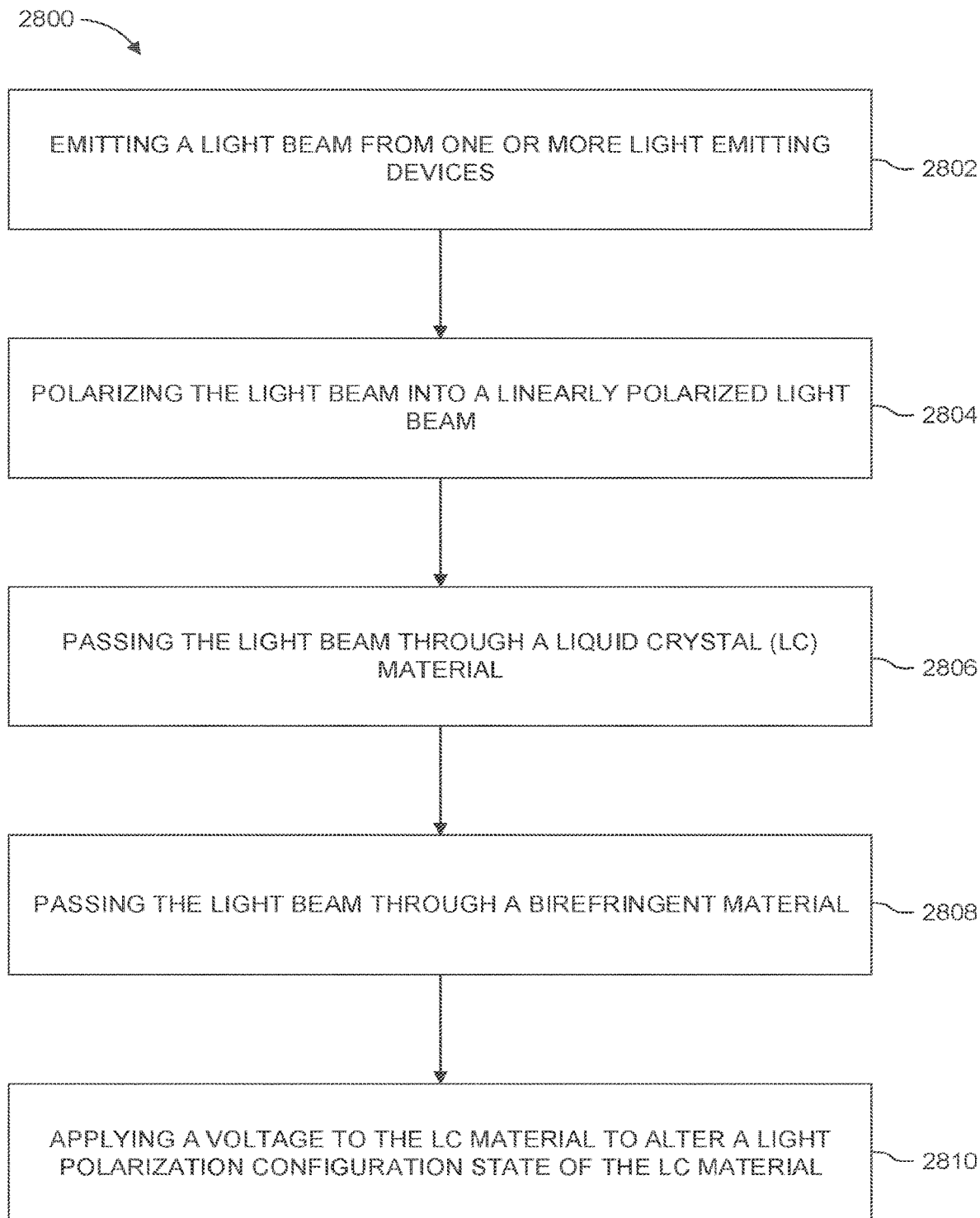
FIG. 28 is a flowchart illustrating an example process for processing and rendering a 3D image according to some embodiments.

FIG. 28 is a flowchart illustrating an example process for processing and rendering a 3D image according to some embodiments. For some embodiments, an example process may include emitting a light beam from one or more light emitting devices. For some embodiments, the example process may further include polarizing the light beam into a linearly polarized light beam. For some embodiments, the example process may further include passing the light beam through a liquid crystal (LC) material. For some embodiments, the example process may further include passing the light beam through a birefringent material. For some embodiments, the example process may further include applying a voltage to the LC material to alter a light polarization configuration state of the LC material. For some embodiments of the example process altering the light polarization configuration state may switch from a first polarization state to a second polarization state. For some embodiments of the example process, the first polarization state may cause the light beam to diffuse in a first direction upon passing through the birefringent material and the second polarization state may cause the light beam to diffuse in a second direction upon passing through the birefringent material.

While the methods and systems in accordance with some embodiments are discussed in the context of virtual reality (VR), some embodiments may be applied to mixed reality (MR)/augmented reality (AR) contexts as well. Also, although the term "head mounted display (HMD)" is used herein in accordance with some embodiments, some embodiments may be applied to a wearable device (which may or may not be attached to the head) capable of, e.g., VR, AR, and/or MR for some embodiments.

An example method in accordance with some embodiments may include: determining horizontal and vertical light diffusion parameters based on a field of view (FOV) selection; sending horizontal and vertical light diffusion parameters to optical hardware of a light field (LF) display device; rendering one or more images for the LF display device; and sending the one or more rendered images to the LF display device.

For some embodiments of the example method, determining horizontal and vertical light diffusion parameters may include selecting horizontal and vertical light diffusion parameters.

For some embodiments of the example method, the horizontal light diffusion parameters may be independent of the vertical light diffusion parameters.

In some embodiments, the example method may include receiving a FOV selection for the LF display device.

For some embodiments of the example method, horizontal may be orthogonal to vertical, and horizontal and vertical may be relative to the LF display in an x-y plane.

In some embodiments, the example method may include: emitting a light beam from a light emitting device of the LF display device; and altering a horizontal angle of diffusion of the emitted light beam based on one or more horizontal light diffusion parameters.

For some embodiments of the example method, altering the horizontal angle of diffusion of the emitted light beam based on one or more horizontal parameters may include: determining if one of the horizontal parameters is within a threshold range; and activating a diffuser to increase the horizontal angle of diffusion of the emitted light beam if one of the horizontal parameters is within the threshold range.

In some embodiments, the example method may include: emitting a light beam from a light emitting device of the LF display device; and altering vertical diffusion spread of the emitted light beam based on one or more vertical light diffusion parameters.

In some embodiments, the example method may include: emitting a light beam from a light emitting device of the LF display device; and adjusting brightness of the emitted light beam based on the FOV selection.

For some embodiments of the example method, selecting independent horizontal and vertical light diffusion parameters may select horizontal and vertical light diffusion parameters that activate respective horizontal and vertical diffusers for simultaneous horizontal and vertical diffusion.

In some embodiments, the example method may include: detecting an orientation of the LF display device; and detecting an orientation of a user, wherein selecting the horizontal and vertical light diffusion parameters may be further based on at least one of the orientations of the LF display device and the orientation of the user.

In some embodiments, the example method may include receiving a 2D/3D mode selection, wherein selecting the independent horizontal and vertical light diffusion parameters is further based on the 2D/3D mode selection.

For some embodiments of the example method, one of the horizontal and vertical light diffusion parameters may indicate whether to apply a voltage to a portion of one or more diffusers.

For some embodiments of the example method, one of the horizontal and vertical light diffusion parameters may indicate an amount of voltage to apply to a portion of one or more diffusers.

For some embodiments of the example method, one of the horizontal light diffusion parameters may indicate a target amount of diffusion to be caused in a horizontal direction.

For some embodiments of the example method, one of the vertical light diffusion parameters may indicate a target amount of diffusion to be caused in a vertical direction.

An example apparatus in accordance with some embodiments may include: a processor; and a non-transitory computer-readable medium storing instructions that are operative, when executed by the processor, to perform any of the embodiments of the example methods.

An additional example method in accordance with some embodiments may include: determining horizontal and vertical light diffusion parameters based on a field of view (FOV) selection; rendering one or more images for the light field (LF) display device; and emitting a light beam from each of one or more light emitting devices of the LF display device to cause the one or more rendered images to be displayed by the LF display device using the horizontal and vertical light diffusion parameters.

For some embodiments of the additional example method, determining horizontal and vertical light diffusion parameters may include selecting horizontal and vertical light diffusion parameters.

For some embodiments of the additional example method, the horizontal light diffusion parameters may be independent of the vertical light diffusion parameters.

In some embodiments, the additional example method may further include receiving a FOV selection for the LF display device.

For some embodiments of the additional example method, horizontal may be orthogonal to vertical, and horizontal and vertical may be relative to the LF display in an x-y plane.

In some embodiments, the additional example method may include altering horizontal angle of diffusion of at least one of the emitted light beams based on the horizontal light diffusion parameter.

For some embodiments of the additional example method, altering the horizontal angle of diffusion of the emitted light beam may be based on one or more horizontal parameters including: determining if one of the horizontal parameters is within a threshold range; and activating a diffuser to increase the horizontal angle of diffusion of at least one of the emitted light beams if one of the horizontal parameters is within the threshold range.

In some embodiments, the additional example method may further include altering vertical diffusion spread of at least one of the emitted light beams based on the vertical light diffusion parameter.

In some embodiments, the additional example method may further include adjusting brightness of at least one of the emitted light beams based on the FOV selection.

For some embodiments of the additional example method, determining horizontal and vertical light diffusion parameters may further include selecting independent horizontal and vertical light diffusion parameters, and the method may further include activating respective horizontal and vertical diffusers of the LF display device to simultaneously diffuse one or more of the light beams emitted using the independent horizontal and vertical light diffusion parameters for simultaneous horizontal and vertical diffusion.

In some embodiments, the additional example method may include: detecting an orientation of the LF display device, wherein selecting the independent horizontal and vertical light diffusion parameters may be further based on the orientation of the LF display device.

In some embodiments, the additional example method may include: receiving a 2D/3D mode selection, wherein selecting the independent horizontal and vertical light diffusion parameters may be further based on the 2D/3D mode selection.

For some embodiments of the additional example method, one of the horizontal and vertical light diffusion parameters may indicate whether to apply a voltage to a portion of one or more diffusers.

For some embodiments of the additional example method, one of the horizontal and vertical light diffusion parameters may indicate an amount of voltage to apply to a portion of one or more diffusers.

For some embodiments of the additional example method, one of the horizontal light diffusion parameters may indicate a target amount of diffusion to be caused in a horizontal direction.

For some embodiments of the additional example method, one of the vertical light diffusion parameters may indicate a target amount of diffusion to be caused in a vertical direction.

An additional example apparatus in accordance with some embodiments may include: a processor; and a non-transitory computer-readable medium storing instructions that are operative, when executed by the processor, to perform any of the embodiments of the additional example methods.

A further example apparatus in accordance with some embodiments may include: an array of light emitting devices; a polarizer layer; a microlens array (MLA); one or more diffusers; and one or more gratings.

For some embodiments of the further example apparatus, the array of light emitting devices may include one or more sets of light emitting devices.

For some embodiments of the further example apparatus, each of the one or more sets of light emitting devices may include a pixel.

In some embodiments, the further example apparatus may further include: a backboard; and one or more baffles, wherein the array of one or more sets of light emitting devices may be mounted to the backboard, wherein each set of light emitting devices of the array may correspond to a respective baffle, and wherein each baffle may separate at least in part the respective set of light emitting devices from the rest of the array of one or more sets of light emitting devices.

For some embodiments of the further example apparatus, wherein at least one of the one or more diffusers may be configured to diffuse in a horizontal direction light emitted by at least one of the light emitting devices, and wherein at least one of the one or more diffusers may be configured to diffuse in a vertical direction light emitted by at least one of the light emitting devices.

For some embodiments of the further example apparatus, at least one of the one or more diffusers may be configured to switch between diffusing in a horizontal direction to diffusing in a vertical direction light emitted by at least one of the light emitting devices.

For some embodiments of the further example apparatus, at least one of the one or more diffusers may be a surface effect liquid crystal (SELC) diffuser.

For some embodiments of the further example apparatus, the SELC diffuser may include a liquid crystal (LC) material layer sandwiched between a first substrate and a second substrate, the LC material layer configured to, in conjunction with the first and second substrates, selectively provide, responsively to an applied voltage, at least one of an angular directional adjustment or a horizontal and/or a vertical directional adjustment relative to a plane of the SELC diffuser.

For some embodiments of the further example apparatus, the SELC diffuser may include a liquid crystal (LC) material layer sandwiched between a first substrate and a second substrate, and the LC material layer and the first and second substrates have selected material properties that work in conjunction and cooperation to achieve a directional adjustment of a light beam.

For some embodiments of the further example apparatus, at least one of the diffusers may be configured to switch between a two dimensional display mode and a three dimensional display mode.

For some embodiments of the further example apparatus, a first SELC diffuser of the diffusers may be an SELC diffuser configured to scatter light displaying a first image with a first diffusion direction, a second SELC diffuser of the diffusers may be an SELC diffuser configured to scatter light displaying a second image with a second diffusion direction, and the first diffusion direction may be orthogonal to the second diffusion direction.

For some embodiments of the further example apparatus, at least one of the diffusers may be an SELC diffuser configured to diffuse light to reduce glare for an image projected by the array of light emitting devices.

For some embodiments of the further example apparatus, at least one of the gratings may include a liquid crystal material.

For some embodiments of the further example apparatus, at least one of the gratings may include a birefringent material.

For some embodiments of the further example apparatus, at least one of the one or more diffusers may be configured as a mosaic diffuser to diffuse together one or more neighboring light beams emitted by one or more of the light emitting devices.

An example optical element in accordance with some embodiments may include: a first layer including an electrically adjustable liquid crystal capable of altering the polarization state of light passing through said first layer depending upon the state of electrical adjustment; and a second layer including a birefringent material in a layer parallel to said first layer including surface structures designed to give alternate diffusion characteristics to beams, wherein light incident on said second layer in a first polarization state may be scattered according to a first angular pattern, and wherein light incident on said second layer in a second polarization state may be scattered according to a second angular pattern.

An example 3D display apparatus in accordance with some embodiments may include: an element providing directionally controllable diffusion including: a plurality of light emitting elements and collimating microlenses capable of producing collimated beams of light; and a directionally controllable diffusor capable of switching between a first state wherein light is diffused in a first direction and a second state wherein light is diffused in a second direction.

In some embodiments of the example 3D display apparatus, the diffusion may be in the vertical direction and the plurality of light emitting elements is configured so that only a single vertical view is generated if other views are not rendered, if corresponding light emitting elements are not powered, and if the display is in a portrait orientation.

In some embodiments of the example 3D display apparatus, responsive to a rotation of the display, the direction of diffusion may be rotated and the plurality of light emitting elements is configured so that only a single view is generated in the direction of diffusion if other views are not rendered, if corresponding light emitting elements are not powered, and if the display orientation changes from portrait to landscape.

In some embodiments of the example 3D display apparatus, said directional controllability of said diffuser may be patterned across said display allowing spatially varying diffusion directional characteristics.

Another additional example apparatus in accordance with some embodiments may include a diffuser configured to change a direction of diffusion of a light beam upon application of a voltage to the diffuser.

Some embodiments of another additional example apparatus may include a light field display structure configured to generate one or more collimated light beams incident upon the diffuser.

Another additional example method in accordance with some embodiments may include changing a direction of diffusion of a light beam upon application of a voltage to a diffuser.

Another additional example apparatus in accordance with some embodiments may include a diffuser configured to change a shape of a light beam upon application of a voltage to the diffuser.

Another additional example method in accordance with some embodiments may include changing a shape of a light beam upon application of a voltage to a diffuser.

Another additional example apparatus in accordance with some embodiments may include a diffuser configured to change an angle of divergence of a light beam upon application of voltage to the diffuser.

Another additional example method in accordance with some embodiments may include changing an angle of divergence of a light beam upon application of a voltage to a diffuser.

Another additional example apparatus in accordance with some embodiments may include a diffuser configured to change an orientation of a light beam upon application of voltage to the diffuser.

Another additional example method in accordance with some embodiments may include changing an orientation of a light beam upon application of a voltage to a diffuser.

Another additional example apparatus in accordance with some embodiments may include a liquid crystal grating configured to diffuse a light beam into two or more diffused light beams.

Another additional example method in accordance with some embodiments may include diffusing a light beam into two or more diffused light beams upon application of a voltage to a liquid crystal grating.

Another additional example apparatus in accordance with some embodiments may include a diffuser configured to diffuse light in a single coordinate plane.

Another additional example method in accordance with some embodiments may include diffusing light in a single coordinate plane.

Another additional example apparatus in accordance with some embodiments may include a diffuser configured to receive a selection selected from the group consisting of a horizontal plane and vertical plane and to diffuse light only in the selected plane.

Another additional example method in accordance with some embodiments may include: receiving a selection selected from the group consisting of a horizontal plane and vertical plane; and diffusing light only in the selected plane.

A multi-view three-dimensional optical display apparatus in accordance with some embodiments may include: a selective directional diffuser configured to be selectively activated without mechanical movement, wherein the selective directional diffuser may include at least one surface effect liquid crystal (SELC) diffuser configured to receive and selectively directionally diffuse one or more linearly polarized and collimated beams of light in response to an applied electric field.

An example apparatus in accordance with some embodiments may include: a display; a first controllable diffuser overlaying the display, the first controllable diffuser being selectively operable to diffuse light in a first direction; and a second controllable diffuser overlaying the display, the second controllable diffuser being selectively operable to diffuse light in a second direction substantially perpendicular to the first direction.

For some embodiments of the example apparatus, the display may be a multiview display.

For some embodiments of the example apparatus, at least one of the first and second controllable diffusers may include a surface effect liquid crystal (SELC) diffuser.

For some embodiments of the example apparatus, the SELC diffuser may include a liquid crystal (LC) material layer sandwiched between a first substrate and a second substrate, and at least one of the LC material layer and the first and second substrates may be configured to perform an angularly-selective diffusion of the light.

For some embodiments of the example apparatus, the apparatus may include at least one liquid crystal (LC) grating.

For some embodiments of the example apparatus, at least one of the at least one LC grating and the first and second controllable diffusers may include a birefringent material.

Some embodiments of the example apparatus may further include: a sensor configured to detect an orientation of the display, and the apparatus may be configured to switch between selectively operating the first controllable diffuser to diffuse in the first direction to selectively operating the second controllable diffuser to diffuse in the second direction responsive to a detected change in the orientation of the display.

For some embodiments of the example apparatus, at least one of the first and second controllable diffusers may be configured to be selectively activated without mechanical movement.

For some embodiments of the example apparatus, at least one of the first and second controllable diffusers may be configured to diffuse light in response to an applied electric field.

An example optical element in accordance with some embodiments may include: a first layer comprising an electrically adjustable liquid crystal capable of altering a polarization state of light passing through the first layer depending upon the state of electrical adjustment; and a second layer comprising a birefringent material in a layer parallel to the first layer including surface structures designed to give alternate diffusion characteristics to beams, such that the second layer may be configured to scatter, according to a first angular pattern, light incident on the second layer when the polarization state of the light is in a first polarization state, and the second layer may be configured to scatter, according to a second angular pattern, light incident on the second layer when the polarization state of the light is in a second polarization state.

For some embodiments of the example optical element, the second layer may be configured to diffuse light in a horizontal direction when the polarization state of the light is in the first polarization state, and the second layer may be configured to diffuse in a vertical direction when the polarization state of the light is in the second polarization state.

Some embodiments of the example apparatus may further include: a plurality of light emitting elements and collimating microlenses capable of producing collimated beams of light; and a directionally controllable diffuser capable of switching between a first state wherein light is diffused in a first direction and a second state wherein light is diffused in a second direction.

For some embodiments of the example optical element, the directionally controllable diffuser may be configured to diffuse in the vertical direction and the apparatus may be configured so that only a single vertical view is generated if the apparatus is in a portrait orientation.

For some embodiments of the example optical element, at least a portion of the plurality of light emitting elements may be configured in a plus-shaped pattern.

For some embodiments of the example optical element, responsive to a rotation of the apparatus, the directionally controllable diffuser may be enabled to diffuse in a rotated direction and the apparatus may be configured so that only a single view is generated in the direction of diffusion if the display orientation changes from portrait to landscape.

Some embodiments of the example apparatus may further include a three-dimensional (3D) display, such that said directional controllability of said diffuser may be patterned across the 3D display allowing spatially varying diffusion directional characteristics.

An example method in accordance with some embodiments may include: emitting alight beam from one or more light emitting devices; polarizing the light beam into a linearly polarized light beam; passing the light beam through a liquid crystal (LC) material; passing the light beam through a birefringent material; and applying a voltage to the LC material to alter a light polarization configuration state of the LC material, such that altering the light polarization configuration state switches from a first polarization state to a second polarization state, and such that the first polarization state causes the light beam to diffuse in a first direction upon passing through the birefringent material and the second polarization state causes the light beam to diffuse in a second direction upon passing through the birefringent material.

Some embodiments of the example method may further include: rendering one or more images for a light field (LF) display device; and sending the one or more rendered images to the LF display device.

Some embodiments of the example method may further include receiving a field of view (FOV) selection for the LF display device.

Some embodiments of the example method may further include adjusting brightness of the emitted light beam based on the FOV selection.

An example apparatus in accordance with some embodiments may include: an array of light emitting devices; a polarizer layer; a microlens array (MLA); one or more diffusers; and one or more gratings.

For some embodiments of the example apparatus, the array of light emitting devices may include one or more sets of light emitting devices.

For some embodiments of the example apparatus, each of the one or more sets of light emitting devices may include a pixel.

Some embodiments of the example method may further include: a backboard; and one or more baffles, such that the array of one or more sets of light emitting devices is mounted to the backboard, such that each set of light emitting devices of the array corresponds to a respective baffle, and such that each baffle separates at least in part the respective set of light emitting devices from the rest of the array of one or more sets of light emitting devices.

For some embodiments of the example apparatus, at least one of the one or more diffusers may be configured to diffuse in a horizontal direction light emitted by at least one of the light emitting devices, and such that at least one of the one or more diffusers may be configured to diffuse in a vertical direction light emitted by at least one of the light emitting devices.

For some embodiments of the example apparatus, at least one of the one or more diffusers may be configured to switch between diffusing in a horizontal direction to diffusing in a vertical direction light emitted by at least one of the light emitting devices.

For some embodiments of the example apparatus, at least one of the one or more diffusers may be a surface effect liquid crystal (SELC) diffuser.

For some embodiments of the example apparatus, the SELC diffuser may include a liquid crystal (LC) material layer sandwiched between a first substrate and a second substrate, the LC material layer may be configured, in conjunction with the first and second substrates, to cause, responsive to an applied voltage, an angularly-selective diffusion of light.

For some embodiments of the example apparatus, the SELC diffuser may include a liquid crystal (LC) material layer sandwiched between a first substrate and a second substrate, and the LC material layer and the first and second substrates may have selected material properties that work in conjunction to scatter a light beam.

For some embodiments of the example apparatus, at least one of the diffusers may be configured to switch between a 2D display mode and a 3D display mode.

For some embodiments of the example apparatus, a first SELC diffuser of the diffusers may be an SELC diffuser configured to scatter light displaying a first image with a first diffusion direction, a second SELC diffuser of the diffusers may be an SELC diffuser configured to scatter light displaying a second image with a second diffusion direction, and the first diffusion direction may be orthogonal to the second diffusion direction.

For some embodiments of the example apparatus, at least one of the diffusers may be an SELC diffuser configured to diffuse light to reduce glare for an image projected by the array of light emitting devices.

For some embodiments of the example apparatus, at least one of the gratings may include a liquid crystal material.

For some embodiments of the example apparatus, at least one of the gratings may include a birefringent material.

For some embodiments of the example apparatus, at least one of the one or more diffusers may be configured as a mosaic diffuser to diffuse together one or more neighboring light beams emitted by one or more of the light emitting devices.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus, comprising:
a display, configured to project light beams; and
a plurality of controllable diffusers, including at least one surface effect liquid crystal (SELC) diffuser containing an LC layer having an optical interface to a substrate, each configured to selectively diffuse at least one of the projected light beams according to a respective diffusion pattern, wherein a refractive index of the LC layer of the SELC diffuser depends on a polarization state of a passing light, the polarization state is induced by applying an electric field to the LC layer, and wherein:
in a first mode of operation, the SELC diffuser is configured to scatter a passing light when the light is in a polarization state corresponding to a refractive index of the LC layer that is different from the refractive index of the substrate, and
in a second mode of operation, the SELC diffuser is configured to not scatter a passing light when the light is in a polarization state corresponding to a refractive index of the LC layer that is substantially the same as the refractive index of the substrate.

2. The apparatus according to claim 1, wherein the display comprises an array of projection cells, each projection cell in the array comprises:
a source module, configured to emit light from one or more light emitting elements;
a polarizing component, configured to linearly polarize the emitted light; and
a microlens, configured to collimate the polarized light into a light beam,
wherein a collimated light beam, originated from a light emitting element of the source module, corresponds to a pixel viewing direction.

3. The apparatus according to claim 1, wherein the optical interface comprises microstructures and wherein when the SELC diffuser operates in the first mode, passing light is scattered in a direction according to an orientation of the microstructures.

4. The apparatus according to claim 1, wherein the optical interface comprises microstructures and wherein when the SELC diffuser operates in the first mode, passing light is scattered in a divergence angle according to a surface slope distribution of the microstructures.

5. The apparatus according to claim 1, wherein one or more of the plurality of the controllable diffusers comprises an LC grating, configured to enhance the diffusion of the at least one of the projected light beams.

6. The apparatus according to claim 5, wherein the LC grating comprises a birefringent material.

7. The apparatus according to claim 1, wherein at least one of the plurality of controllable diffusers comprises a birefringent material.

8. The apparatus according to claim 1, further comprising:
a sensor configured to detect an orientation of the display, and
responsive to a detected change in the orientation of the display, the apparatus is configured to switch between selectively operating the plurality of controllable diffusers to diffuse according to a diffusion pattern in a first direction and selectively operating the plurality of controllable diffusers to diffuse according to a diffusion pattern in a second direction, substantially perpendicular to the first direction.

9. A method, comprising:
projecting light beams from a display; and
selectively operating a plurality of controllable diffusers, including at least one surface effect liquid crystal (SELC) diffuser containing an LC layer having an optical interface to a substrate, to diffuse at least one of the projected light beams according to a respective diffusion pattern, comprising:
applying an electric field to the LC layer of the SELC diffuser to induce a polarization state of a passing light, wherein a refractive index of the LC layer depends on the induced polarization state,
operating the SELC diffuser in a first mode of operation, wherein the SELC diffuser is configured to scatter a passing light when the light is in a polarization state corresponding to a refractive index of the LC layer that is different from the refractive index of the substrate, and
operating the SELC diffuser in a second mode of operation, wherein the SELC diffuser is configured to not scatter a passing light when the light is in a polarization state corresponding to a refractive index of the LC layer that is substantially the same as the refractive index of the substrate.

10. The method according to claim 9, wherein the display comprises an array of projection cells, and wherein projecting the light beams from the display comprises projecting a light beam from a projection cell of the array by:
emitting light from a light emitting element of a source module;
linearly polarizing, by a polarizing component, the emitted light; and
collimating, by a microlens, the polarized light into a light beam, wherein the collimated light beam corresponds to a pixel viewing direction.

11. The method according to claim 9, wherein the optical interface comprises microstructures and wherein when the SELC diffuser operates in the first mode, passing light is scattered in a direction according to an orientation of the microstructures.

12. The method according to claim 9, wherein the optical interface comprises microstructures and wherein when the SELC diffuser operates in the first mode, passing light is scattered in a divergence angle according to a surface slope distribution of the microstructures.

13. The method according to claim 9, wherein one or more of the plurality of the controllable diffusers comprises an LC grating, and further comprising:

enhancing the diffusion of the at least one of the projected light beams using the LC grating.

14. The method according to claim 13, wherein the LC grating comprises a birefringent material.

15. The method according to claim 9, wherein at least one of the plurality of controllable diffusers comprises a birefringent material.

16. The method according to claim 9, further comprising:
detecting an orientation of the display, and
responsive to a detected change in the orientation of the display, switching between selectively operating the plurality of controllable diffusers to diffuse according to a diffusion pattern in a first direction and selectively operating the plurality of controllable diffusers to diffuse according to a diffusion pattern in a second direction, substantially perpendicular to the first direction.

\* \* \* \* \*